Aug. 23, 1966  G. A. LOCKE  3,268,649
TELEGRAPH MESSAGE PREPARATION AND SWITCHING CENTER
Filed Sept. 19, 1962  26 Sheets-Sheet 1

INVENTOR
GEORGE A. LOCKE
BY R. C. Terry
ATTORNEY

Aug. 23, 1966

G. A. LOCKE 3,268,649

TELEGRAPH MESSAGE PREPARATION AND SWITCHING CENTER

Filed Sept. 19, 1962

INVENTOR
GEORGE A. LOCKE

BY R.C. Terry

ATTORNEY

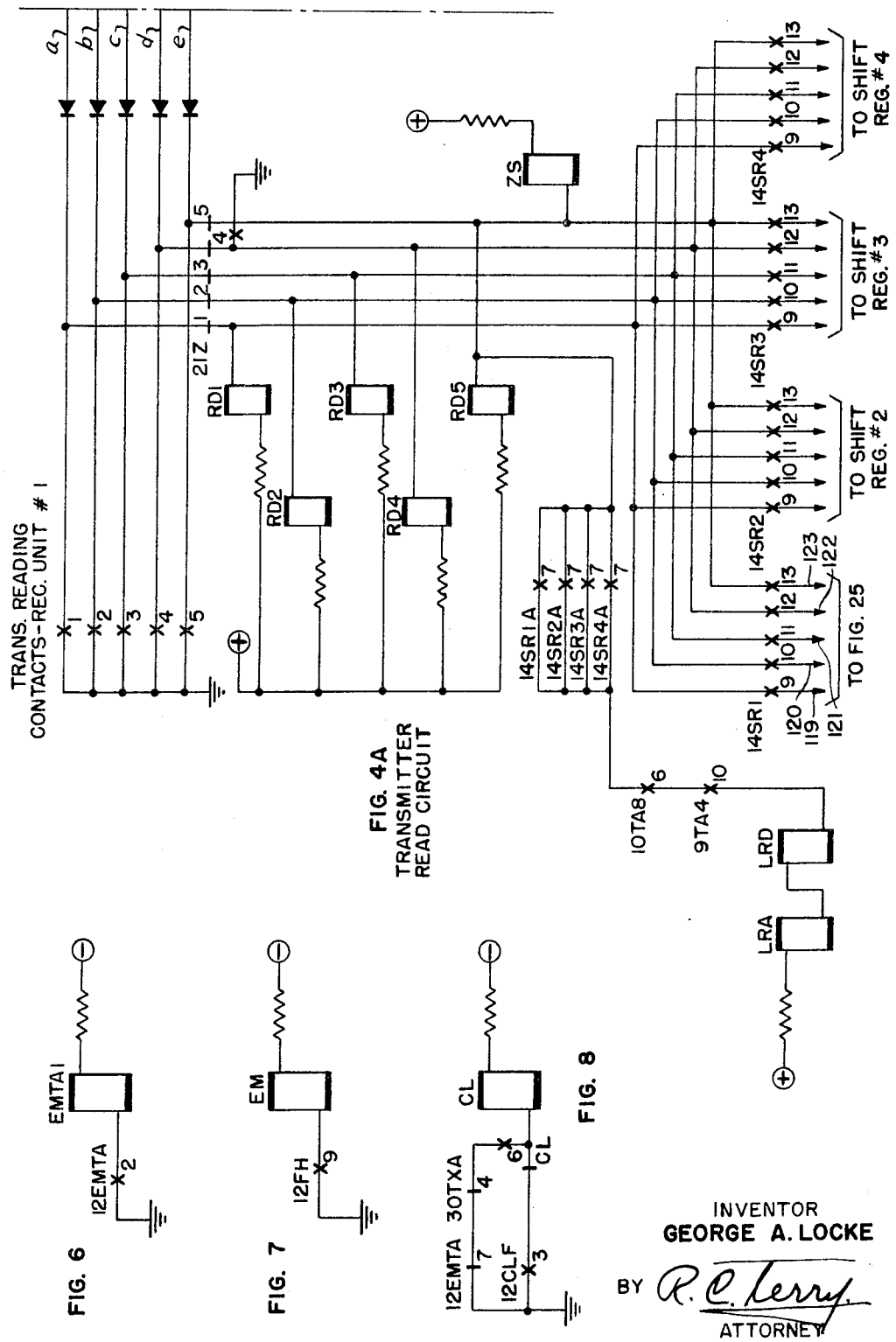

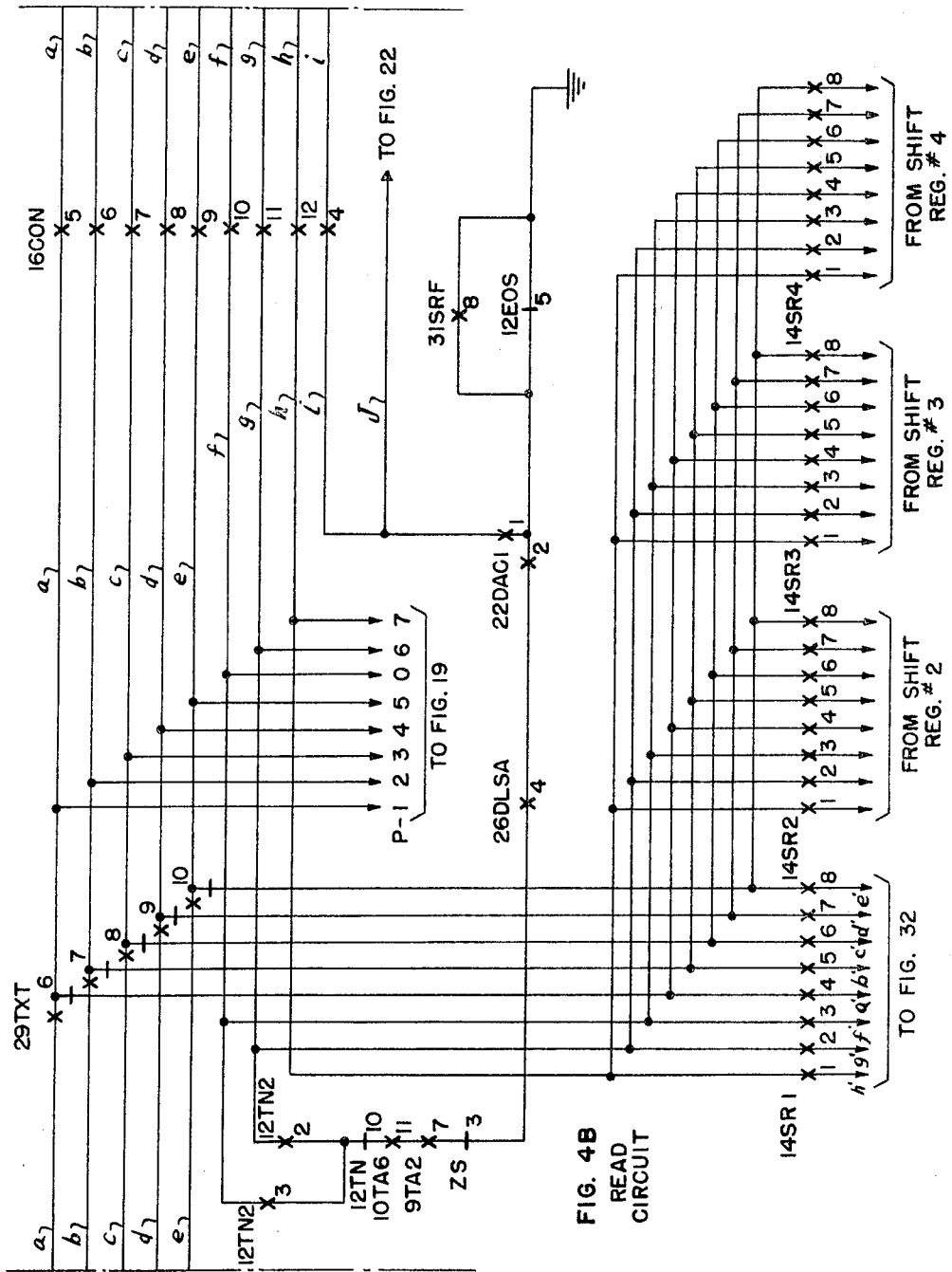

PUNCH MAGNET CONTROL

Aug. 23, 1966  G. A. LOCKE  3,268,649
TELEGRAPH MESSAGE PREPARATION AND SWITCHING CENTER
Filed Sept. 19, 1962  26 Sheets-Sheet 7

SENDING DECODER

INVENTOR
GEORGE A. LOCKE
BY R. C. Terry
ATTORNEY

SENDING READER

INVENTOR
GEORGE A. LOCKE
BY R.C. Terry
ATTORNEY

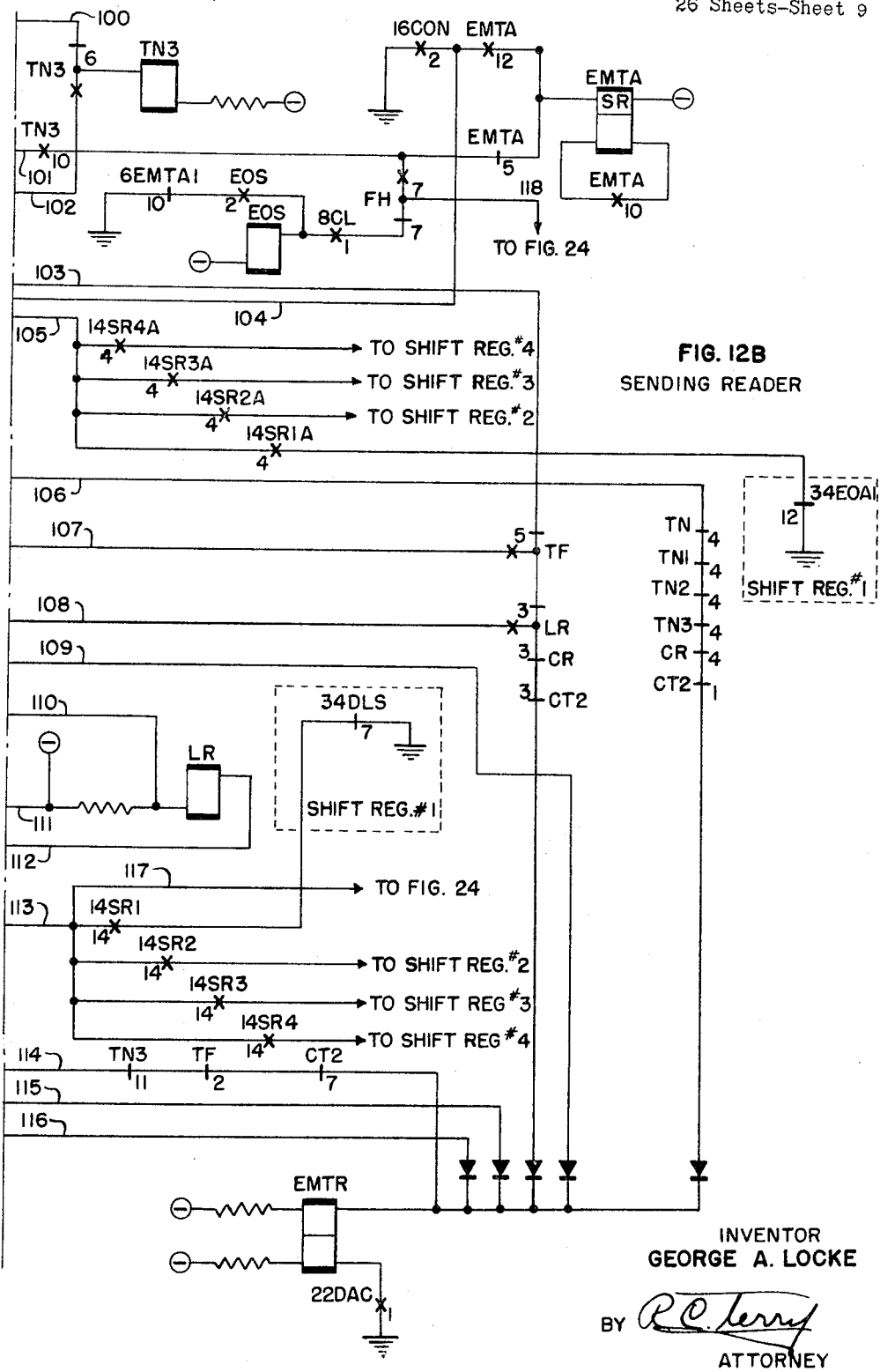

SHIFT REGISTER CONNECT

SEND UNIT SEARCH AND CONNECT

SEND UNIT SEARCH AND CONNECT

INVENTOR
GEORGE A. LOCKE
BY R. C. Terry
ATTORNEY

Aug. 23, 1966 G. A. LOCKE 3,268,649
TELEGRAPH MESSAGE PREPARATION AND SWITCHING CENTER
Filed Sept. 19, 1962 26 Sheets-Sheet 12
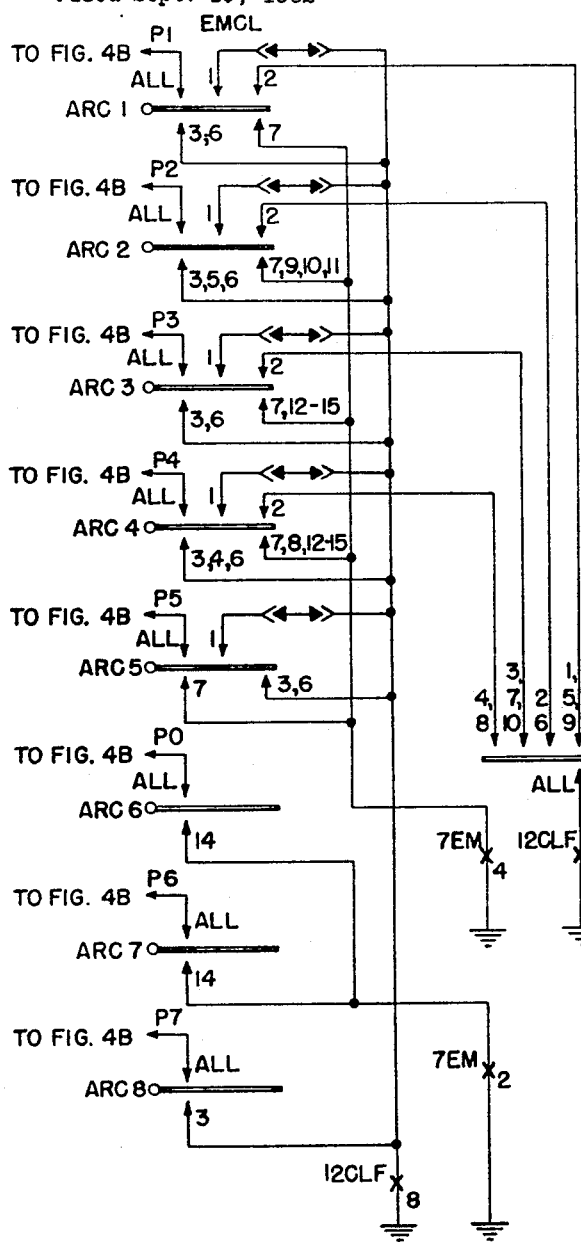
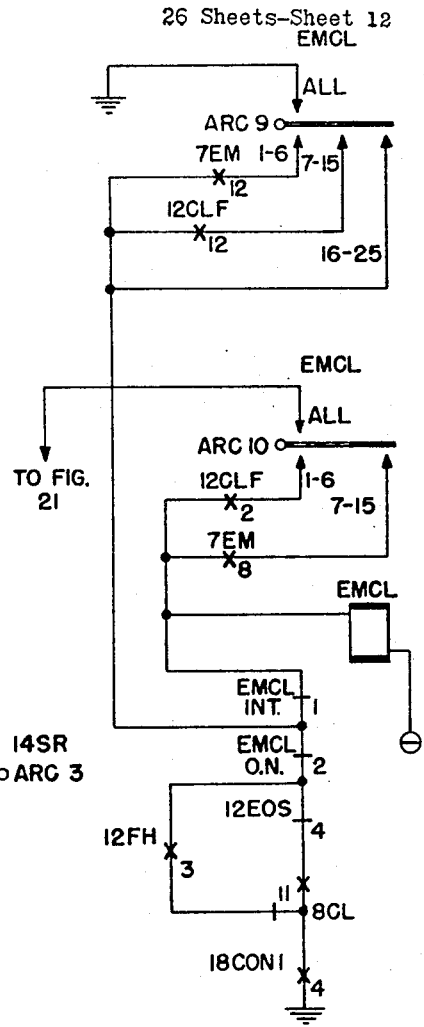
FIG. 19
S.O.M & E.O.M. GENERATOR
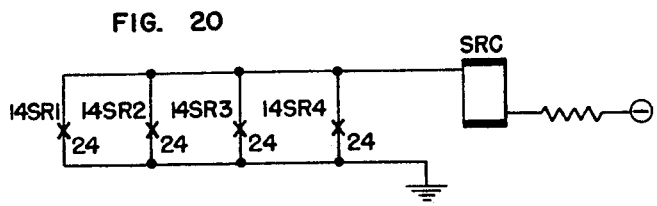
FIG. 20
INVENTOR
GEORGE A. LOCKE
BY R. C. Terry
ATTORNEY

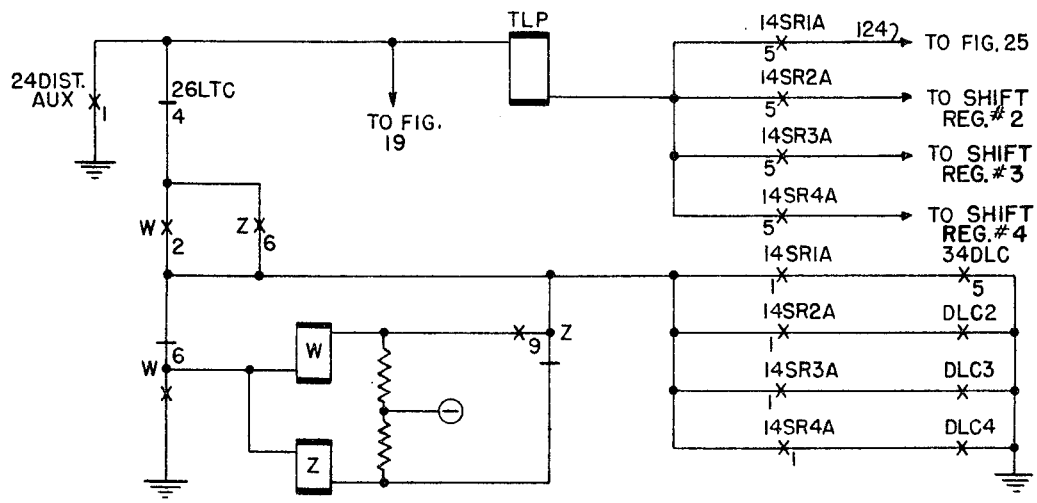
FIG. 21
TRANSLATOR-SHIFT REGISTER CONTROLS
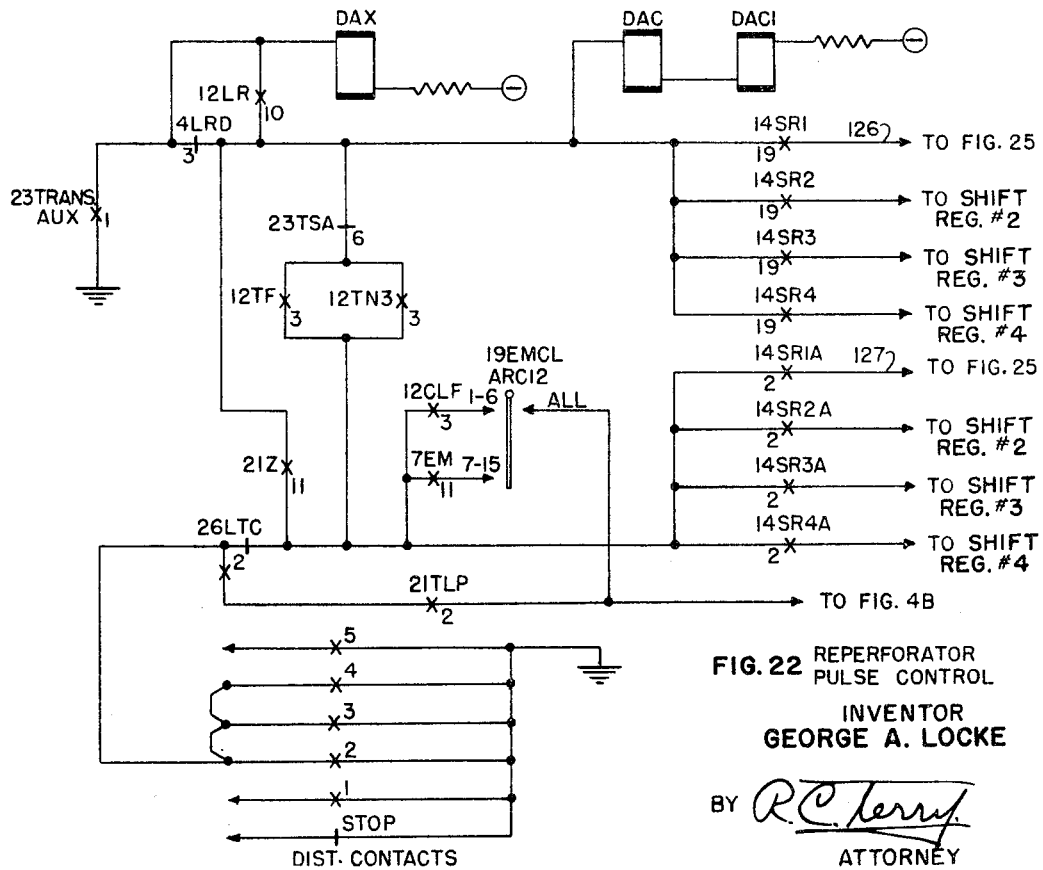
FIG. 22 REPERFORATOR PULSE CONTROL
INVENTOR
GEORGE A. LOCKE
BY R. C. Terry
ATTORNEY

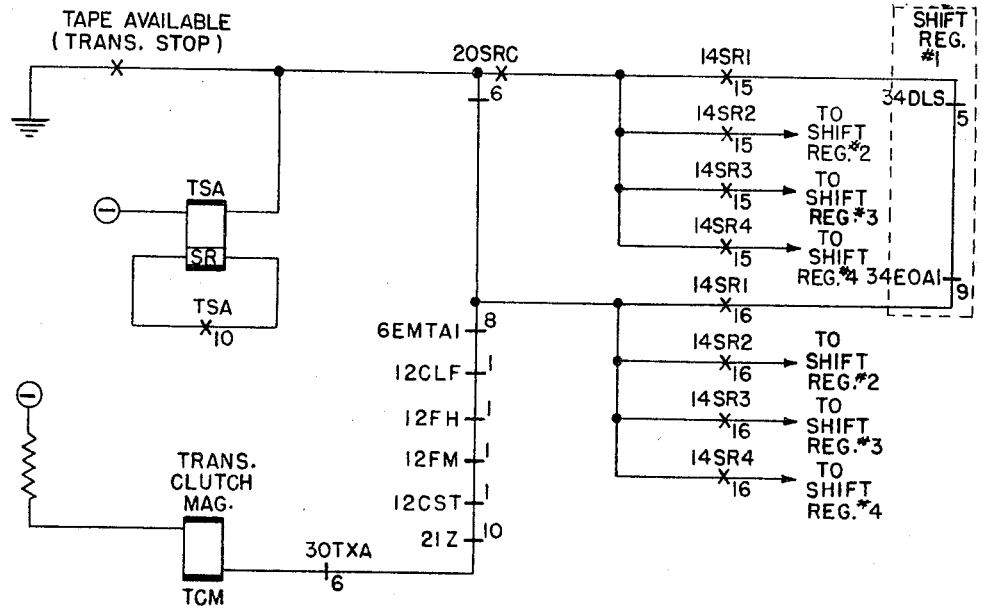

Aug. 23, 1966  G. A. LOCKE  3,268,649
TELEGRAPH MESSAGE PREPARATION AND SWITCHING CENTER
Filed Sept. 19, 1962  26 Sheets-Sheet 15
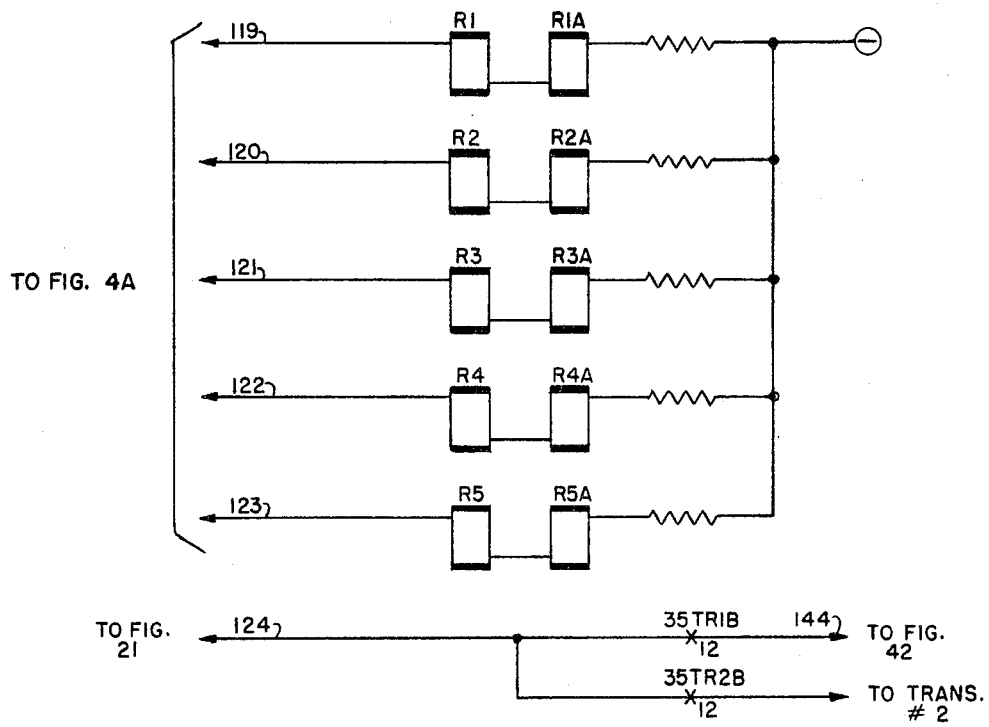
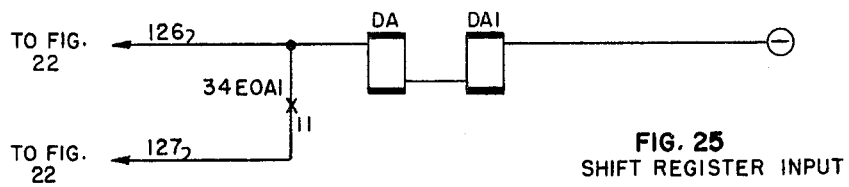
FIG. 25
SHIFT REGISTER INPUT
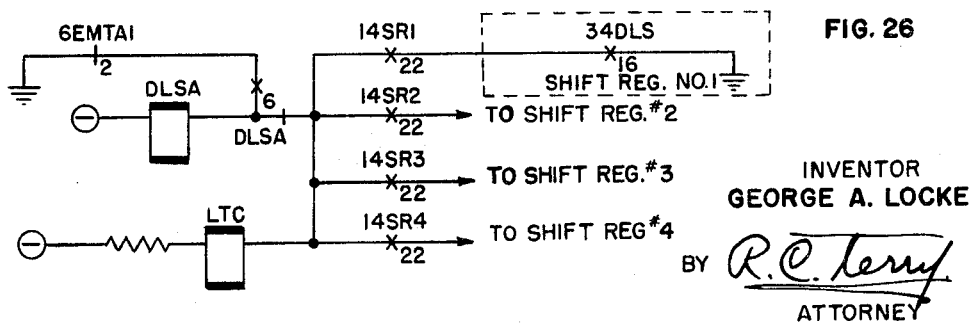
FIG. 26
INVENTOR
GEORGE A. LOCKE
BY R. C. Terry
ATTORNEY

SHIFT REGISTER STORAGE

FIG. 28 SHIFT REGISTER (LEVEL I)

INVENTOR
GEORGE A. LOCKE
BY R.C. Terry
ATTORNEY

Aug. 23, 1966  G. A. LOCKE  3,268,649
TELEGRAPH MESSAGE PREPARATION AND SWITCHING CENTER
Filed Sept. 19, 1962  26 Sheets-Sheet 18
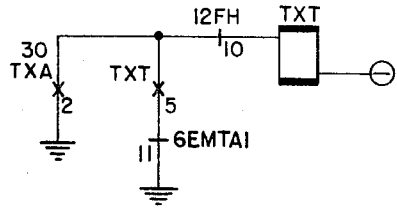
FIG. 29
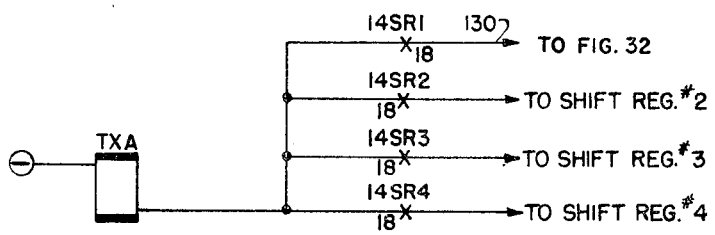
FIG. 30
SHIFT REGISTER RELEASE/TEXT CONTROL
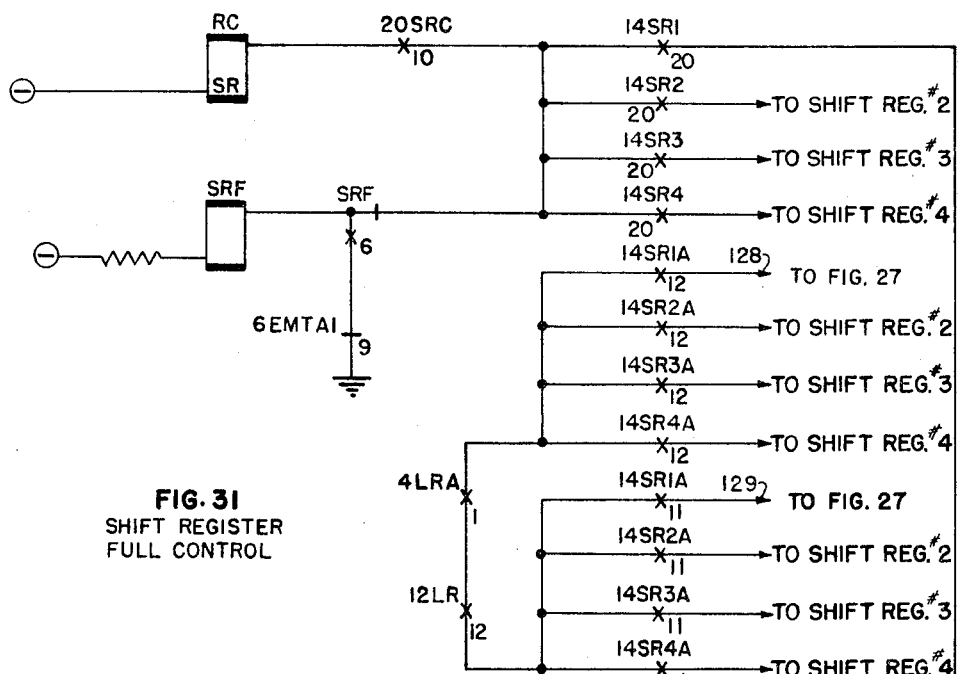
FIG. 31
SHIFT REGISTER
FULL CONTROL
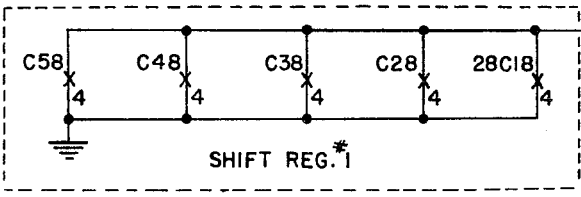
INVENTOR
GEORGE A. LOCKE
BY R. C. Terry
ATTORNEY Aug. 23, 1966  G. A. LOCKE  3,268,649
TELEGRAPH MESSAGE PREPARATION AND SWITCHING CENTER
Filed Sept. 19, 1962  26 Sheets-Sheet 19
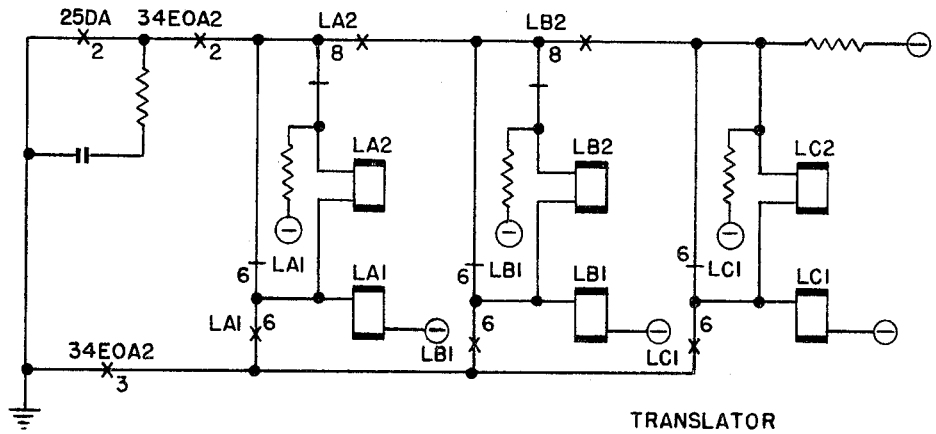
FIG. 33 TRANSLATOR DISTRIBUTOR CONTROL
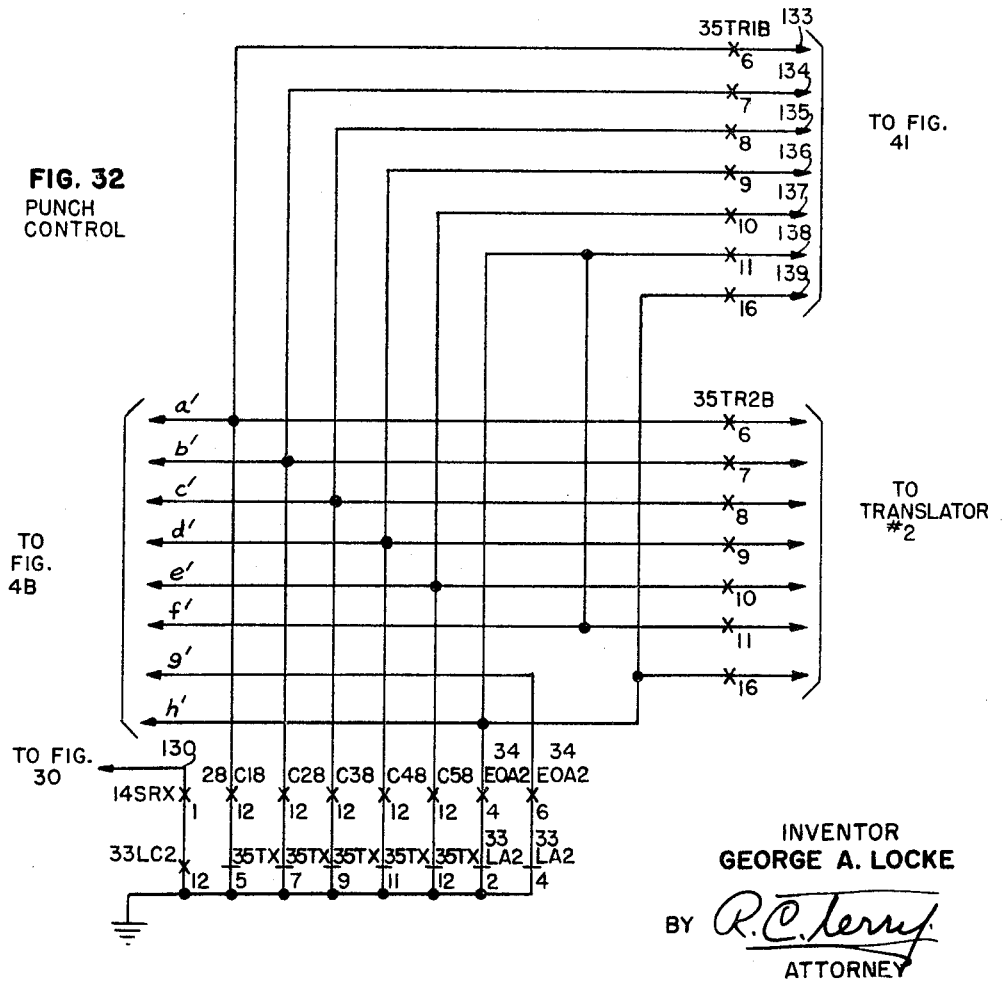
FIG. 32 PUNCH CONTROL
INVENTOR
GEORGE A. LOCKE
BY R.C. Terry
ATTORNEY

REGISTER READ

INVENTOR
GEORGE A. LOCKE
BY R.C. Terry
ATTORNEY

TRANSLATOR SEARCH AND CONNECT

SHIFT REGISTER/TRANSLATOR CONNECT

Aug. 23, 1966    G. A. LOCKE    3,268,649
TELEGRAPH MESSAGE PREPARATION AND SWITCHING CENTER
Filed Sept. 19, 1962    26 Sheets-Sheet 23

BID RECOGNITION CIRCUIT

FIG. 38    CITY AND SERVICE CODE RECOGNITION

CODE READING RELAY CIRCUIT

INVENTOR
GEORGE A. LOCKE
BY R. C. Terry
ATTORNEY

Aug. 23, 1966　　　G. A. LOCKE　　　3,268,649
TELEGRAPH MESSAGE PREPARATION AND SWITCHING CENTER
Filed Sept. 19, 1962　　　26 Sheets-Sheet 24
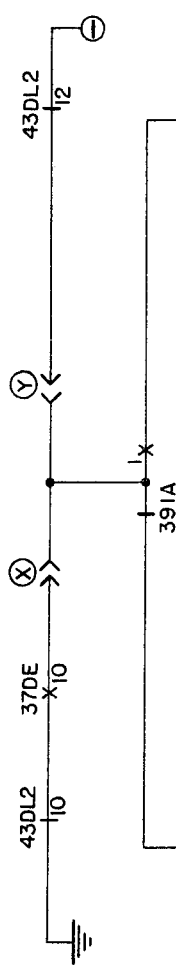
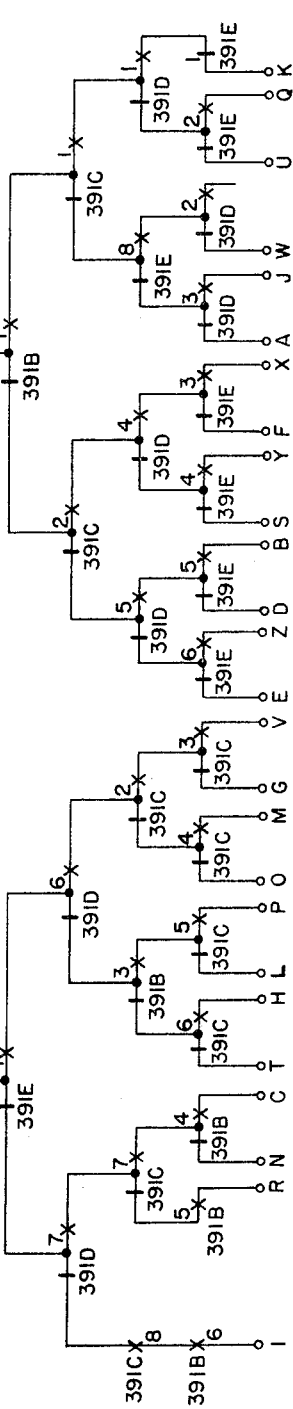
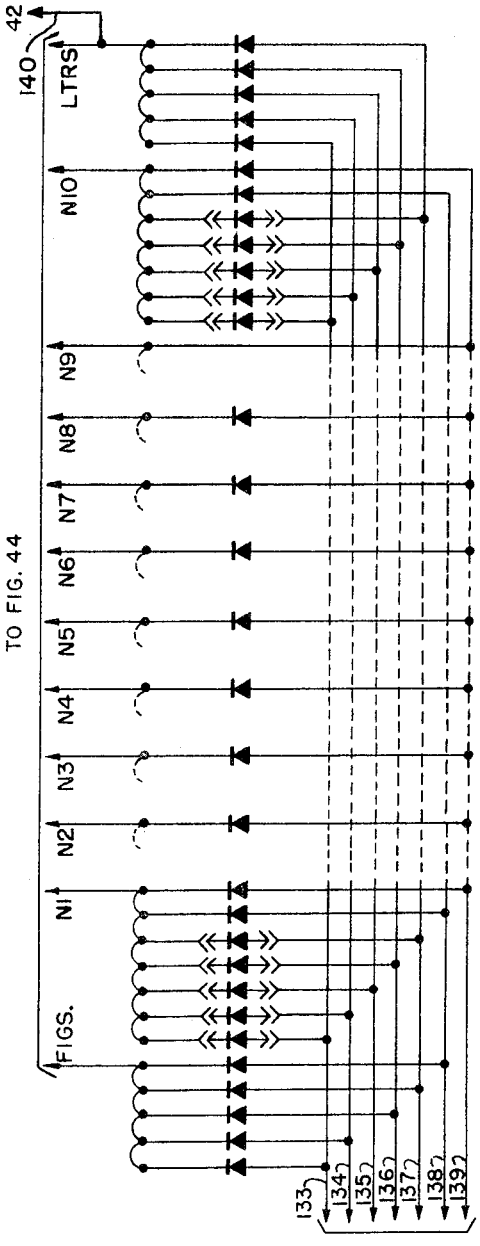
FIG. 40
CODE READING
FAN CIRCUIT
FIG. 41
DDD NUMBER GENERATOR
INVENTOR
GEORGE A. LOCKE
BY R. C. Terry
ATTORNEY

CHARACTER COUNTING CIRCUIT

INVENTOR
GEORGE A. LOCKE
BY R. C. Terry
ATTORNEY

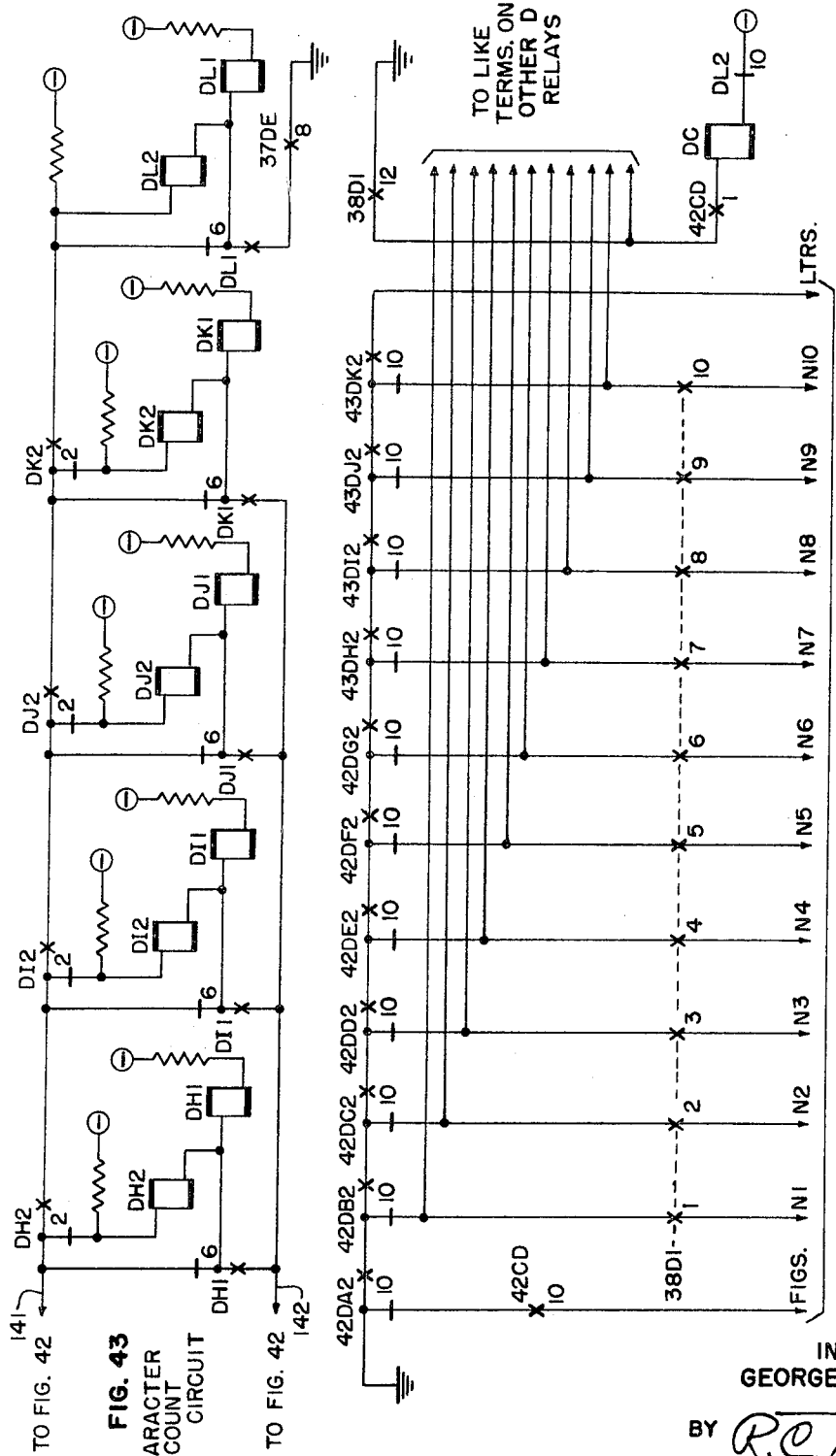

3,268,649
TELEGRAPH MESSAGE PREPARATION AND SWITCHING CENTER

George A. Locke, Glen Head, N.Y., assignor to Teletype Corporation, Skokie, Ill., a corporation of Delaware
Filed Sept. 19, 1962, Ser. No. 224,720
12 Claims. (Cl. 178—4.1)

This invention relates to improvements in automatic telegraph switching systems and more particularly to cross office switching apparatus which automatically inserts into a telegraph message information necessary to the proper handling of the message by line switching telegraph apparatus.

Prior to this invention cross office switching systems for telegraph messages have been used in which a plurality of receiving reperforator-transmitter sets are linked by the cross office system to any one of a plurality of outgoing reperforator-transmitter telegraph sets. Thus, a message addressed to the switching center or a message passing through the switching center is routed through the office to be handled by one of the outgoing reperforator-transmitter sets. In handling the message in such prior art systems, no additional information is inserted into the body of the message as it is transmitted through the cross office system. Once the cross office link is established, the entire message stored on the tape at the incoming reperforator-transmitter set is transmitted by that set to the selected outgoing set without interruption.

It is an object of this invention to provide a cross office switching center in which a telegraph message is prepared for handling by a line switching telegraph system by automatically inserting into the message information determined by codes present in the incoming message.

It is a more specific object of this invention to provide a telegraph message preparation and switching center which automatically inserts into the message direct distance dialing telephone numbers determined by address codes present in the incoming message.

It is a further object of this invention to automatically insert additional control perforations into some of the characters of a message transmitted cross office for controlling outgoing line switching equipment.

The foregoing objects are accomplished in one embodiment of this invention which comprises a communications center primarily adapted to be used in conjunction with the line switching telegraph system for air lines disclosed in the copending patent application of D. E. Huffman, P. P. Petros and W. J. Zenner, Serial No. 135,857, filed on September 5, 1961 now Patent No. 3,124,643. In that application, telegraph messages are automatically transmitted over telephone lines under the control of direct distance dialing telephone numbers perforated into the tape preceding the address of the message in mnemonic code normally used in air lines' communications systems.

This invention is to be used in a central telegraph switching office which receives incoming telegraph signals from its own and foreign systems. Messages arriving at the switching center from other stations in its own or the same air line's system arrive over the telegraph network in the manner described in the afore-mentioned copending application. These messages are perforated in tape at an incoming receive unit reperforator-transmitter set and contain the message preceded by mnemonic address codes only, since the telephone number inserted into the tape at the originating transmitter was lost in making the telephone connection to the switching center.

Other messages arrive at the communications center on conventional telegraph lines from foreign air lines, that is air lines outside of the line switching system utilized by the particular air line with which the switching center is associated. No telephone numbers or connections are necessary in order to effect the transmission of this type of message, so that all of the information contained in the original tape at the originating transmitter is reperforated in the tape at the incoming reperforator-transmitter set.

Regardless of which type of system supplied the information to the incoming reperforator-transmitter sets, the tape which is prepared by these sets is identical in all respects, that is it contains only the mnemonic codes and the text of the message along with the usual start-of-message, end-of-address, and end-of-message perforations. No telephone numbers are perforated in the tape received from either type of system.

A different end-of-message code is utilized in the line switching systems and conventional telegraph systems presently in use. Thus, messages which are received from foreign air lines on conventional private telegraph lines may have one end-of-message code, whereas messages which are received on the line switching system will have another end-of-message code. Whenever a message from a foreign system is terminated by the conventional end-of-message code, the apparatus of this invention automatically causes the line switching end-of-message code to be added to the message.

Whenever a receive unit of either of the above types has a message available for cross office transmission, it indicates this state and a search circuit comprising a stepping switch in the receive unit searches for and establishes a connection between the receive unit and an idle one of a plurality of shift registers. Then a search unit comprising a stepping switch in an idle send unit searches for such a message available indication among the receive units. When a message available indication is found by the stepping switch in the send unit, a cross office link between the receive unit and the particular send unit is established. Each send unit comprises a reperforator-transmitter set; and once a cross office connection has been made between a send unit and a receive unit, a busy indication is established which prevents any other send unit from completing a connection to that particular receive unit.

Once these connections have been established, a start-of-message signal is supplied to the reperforator at the send unit where it is recorded in the tape of the send unit.

After the start-of-message signal has been supplied to the send unit reperforator, it is blinded to further signals from the receive unit transmitter; and the characters which represent the mnemonic code are transmitted to the shift register where they are stored. Following the storage of the mnemonic code by the shift register, a control signal is applied from the shift register to the transmitter distributor of the receive unit to stop further transmission by that unit; and the shift register indicates that a store mnemonic code is present therein.

A plurality of translator circuits for decoding the mnemonic codes and for determining the direct distance dialing telephone number which corresponds to each mnemonic code are provided. When a shift register has a complete mnemonic code stored, it causes a stepping switch to search for an idle translator and when one is found, a connection is made between the shift register and the idler translator circuit in a manner similar to the connections which previously were made between the receive unit and the send unit, and the receive unit and the shift register. After the connection between the shift register and the translator has been made, the translator reads the mnemonic code stored in the shift register; determines the direct distance dialing telephone number (DDD number) which corresponds to that mnemonic code; and then causes that telephone number to be transmitted to the send unit where it is perforated on the tape following the start-of-message indication which was supplied from the tape at the receive unit.

When the last digit of the DDD number has been supplied to the send unit, the mnemonic code stored in the shift register is shifted serially out of the register and is supplied to the send unit where it is perforated in the tape following the DDD number. The tape at the receive unit is not read or advanced during the period of time in which the translator and shift register supply information to the send unit.

If no end-of-address signal has been stored in the shift register following the mnemonic code the above sequence is repeated, that is, a new mnemonic code is supplied to an available shift register, and the mnemonic code stored in the register is read by a translator which then supplies the corresponding DDD number to the reperforator at the send unit.

If a mnemonic code for a foreign air line, that is an air line not associated with the line switching system, is stored in the shift register, no bid for a translator is made and the mnemonic code is shifted out of the register and supplied to the send unit without being preceded by a DDD number. This foreign mnemonic code is not used to effect a connection to a particular receiver and is merely supplied as a part of the message to the send unit. It is to be noted that each message which is sent to the switching center of this invention contains at least one mnemonic address for one of its own stations. Messages directed to stations foreign to the system with which this center is associated must be handled by other switching centers which are associated with the particular foreign station or system involved.

After an end-of-address signal has been sensed and shifted out of the shift register following the last mnemonic code preceding any given message, the shift register is released and the text of the message is transmitted directly from the receive unit to the send unit. If the incoming message originally was supplied by a station on the line switching system, the end-of-message signal following the text is supplied in its original form to the send unit. However, if the message was received on a conventional telegraph line from a foreign air line, the end-of-message signal may be different from that which is used in the line switching system; and when it is sensed it causes operation of an end-of-message generator which then supplies the line switching system end-of-message signal to the send unit. The message which is perforated in the tape at the send unit now contains the proper format for handling by a line switching system such as disclosed in the above-mentioned copending application.

In the foregoing sequence of operation, the translator unit and the shift register unit are dismissed or disconnected immediately after they have performed their respective functions so that they are available for use in processing other messages from other receive units.

In addition to the above-mentioned operation, each receive unit, shift register, and translator utilized in the processing of a particular incoming message inserts into the tape at a predetermined position a character which identifies it. This is necessary since an extremely large number of different possible combinations of equipment could be used in the handling of any particular message, and in the event that trouble occurs it would be almost impossible to trace the path of such a message without the use of these identification characters.

Other objects and features of the invention will be apparent to those skilled in the art upon consideration of the following detailed specification taken in conjunction with the accompanying drawings wherein.

Figure 11:
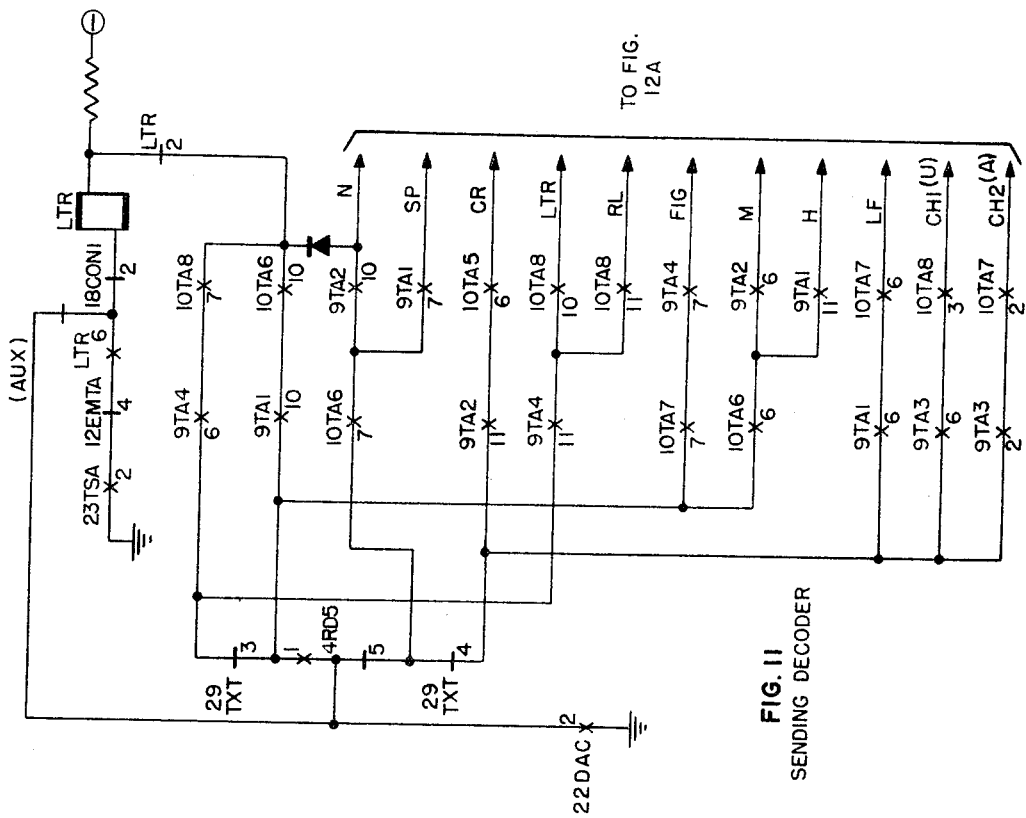
Figure 9:
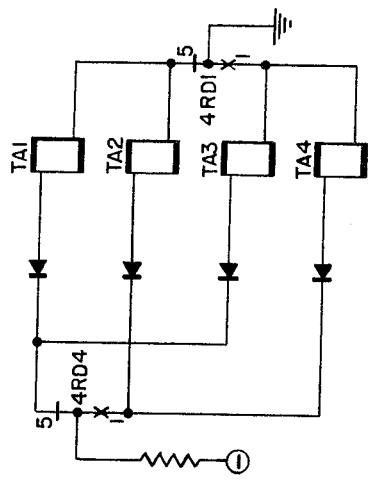
Figure 10:
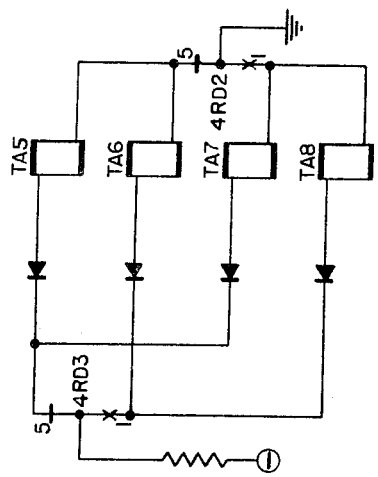
Figure 12A:
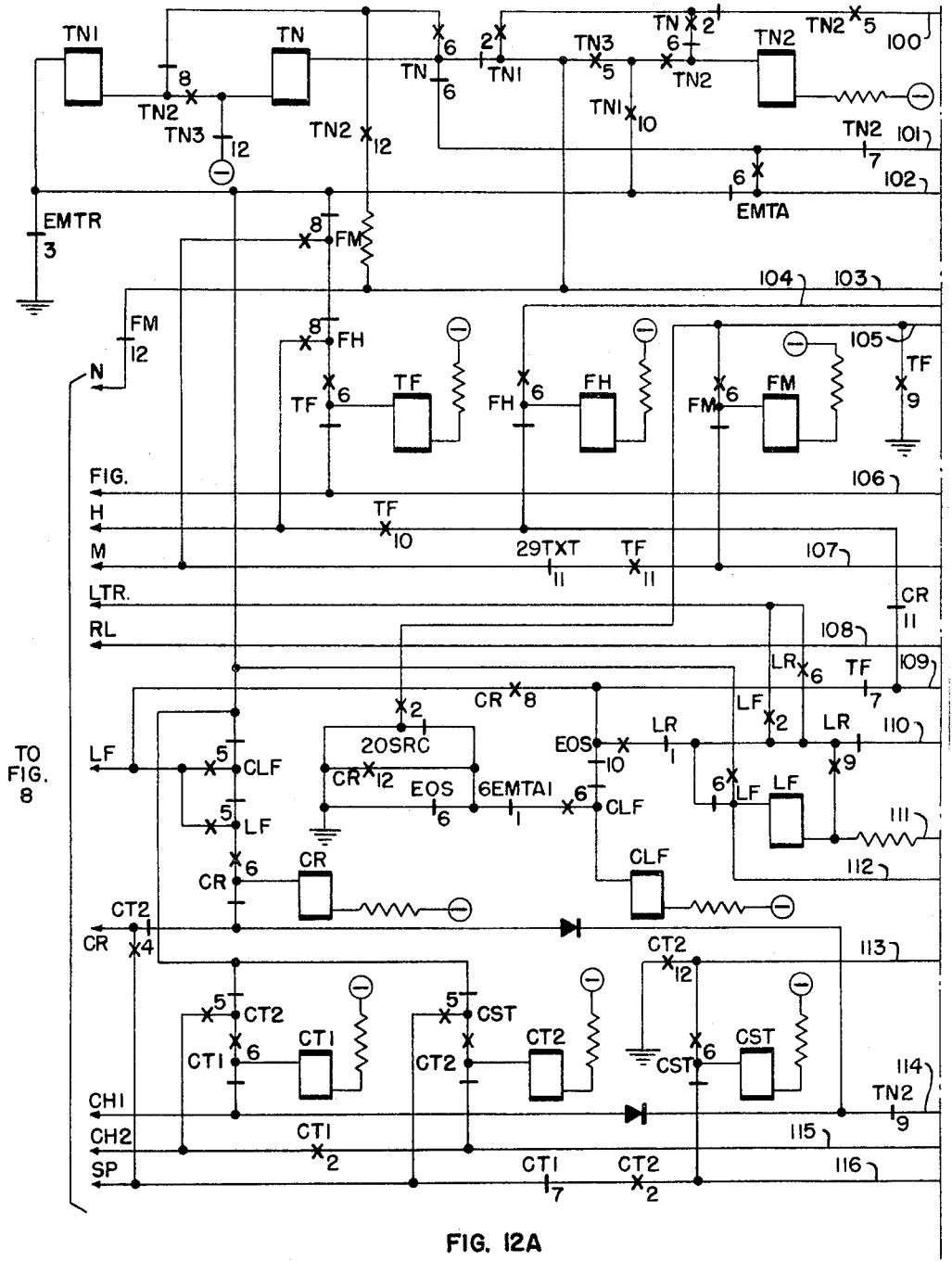
Figure 14:
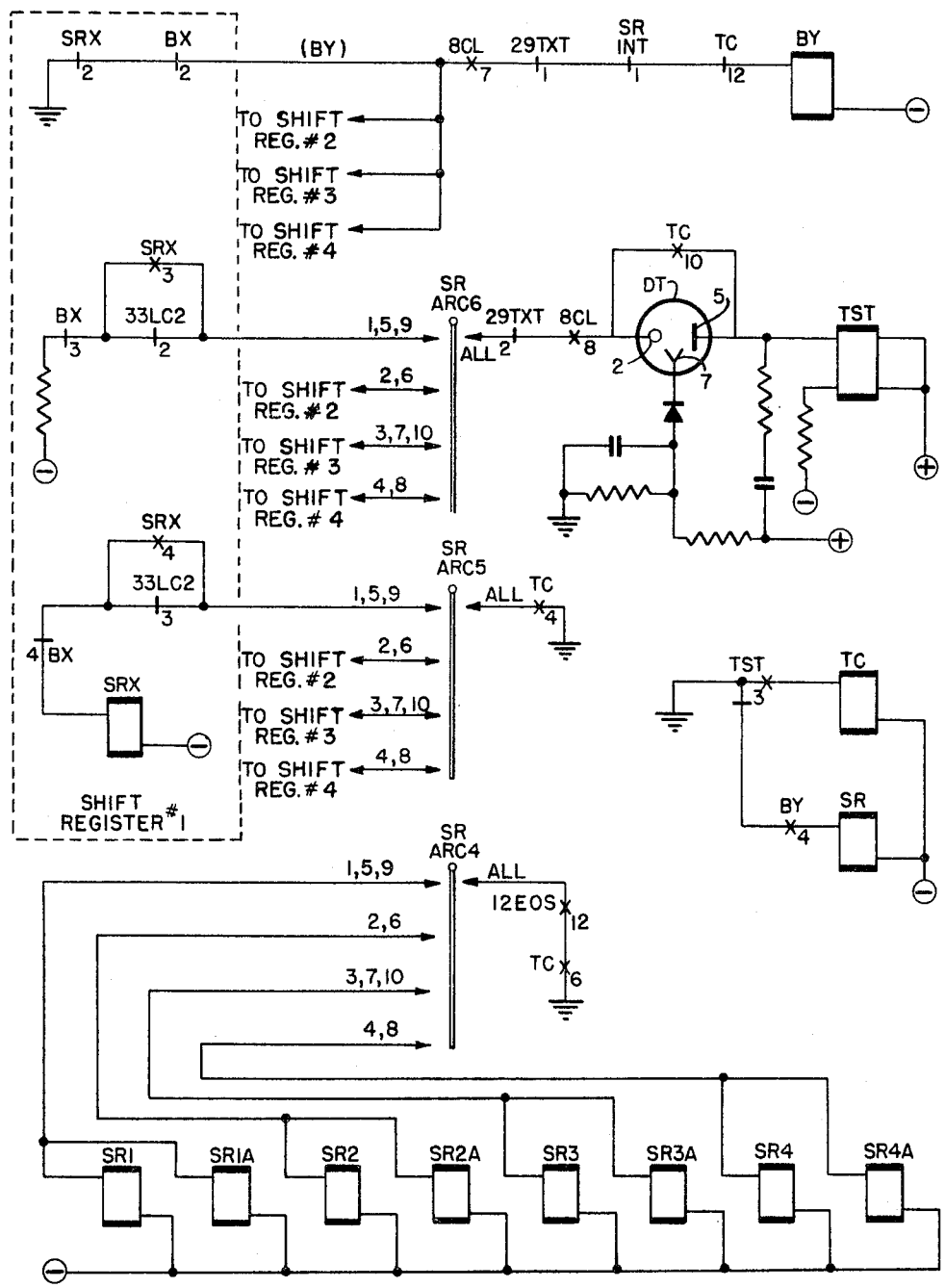
Figure 15:
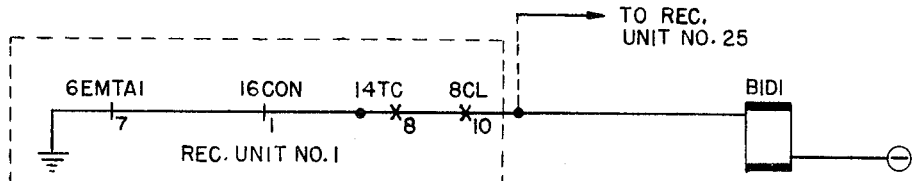

FIGS. 4, 6 to 12, and 14 to 44 are detached circuit schematic views showing, insofar as possible, a complete separate function of the circuitry in each separate figure, which function is described adjacent to the figure number, FIG. 5 shows the pattern for arrangement of the three parts of FIG. 4, and FIG. 13 shows the pattern for arrangement of the two parts of FIG. 12.

Figure 1:
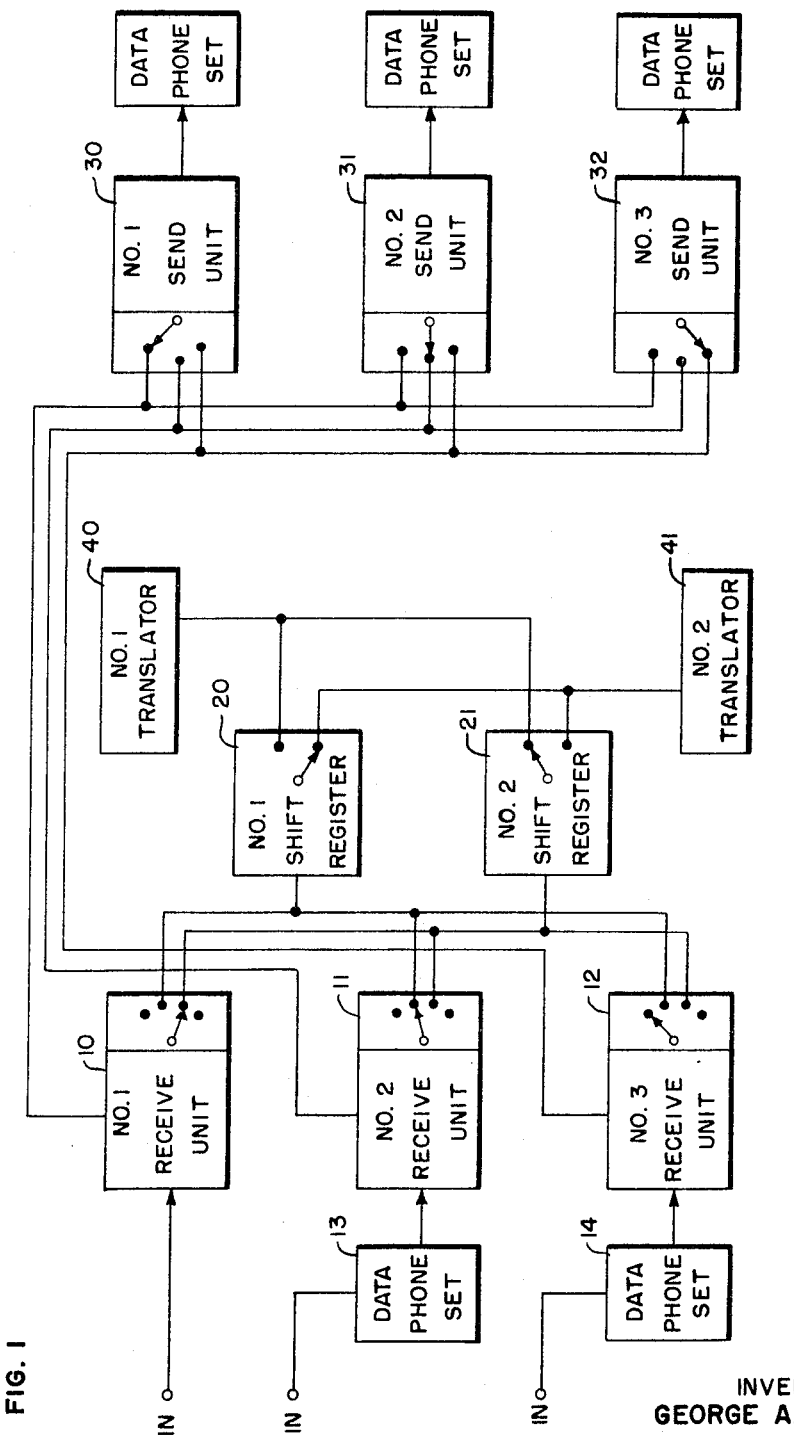
FIG. 1 is a block diagram of the basic units of the system.
Figure 16:
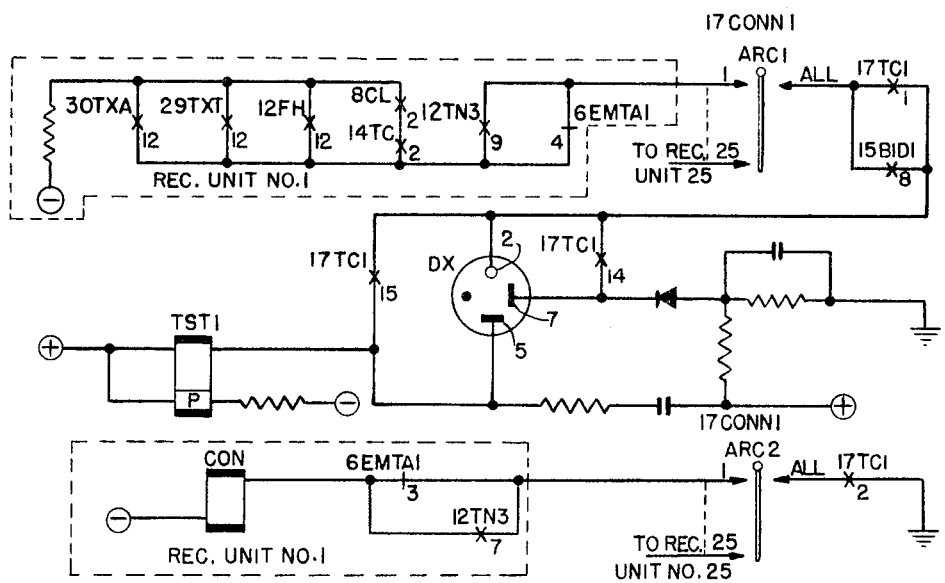

In the description of the block diagram in FIG. 1, the various component parts are designated in the conventional manner by reference numerals applied substantially in sequence, whereas in the description of the circuitry in FIGS. 4, 6 to 12, and 14 to 44 the "detached contact" method of exposition used in Patent No. 2,722,675 granted to J. Michal et al. November 1, 1955 has been adopted for use. In the "detached contact" method, relay contacts generally are not adjacent to their magnetic cores and windings but are separated or detached therefrom. For example, a core such as the core of the connecting relay shown on FIG. 16 is represented by a small rectangle and given a functional designation such as "CON." In the specification this relay is referred to as "16–CON," where "16" indicates the figure number of the drawing on which the core is located, and "CON" signifies "connect" as the functional designation of the relay. On the drawing each of the contacts controlled by the relay and shown on the same figure with the winding, is given a designation such for example, as "CON–2" placed in proximity to the contacts, where the "CON" indicates that the contacts are controlled by the winding of the relay "CON" located on the same figure. When the relay also has contacts located on another figure of the drawing, the contacts are given a compound designation such for example as "16–CON–5," where "16" indicates the figure number of the drawing on which the core is located and "5" is the number of the contacts. In the specification the contacts may be referred to as "4–16–CON–5" where "4" indicates the figure number on the drawing on which the contacts are located, "16" indicates the figure number of the drawing on which the core is located, "CON" is the functional designation and "5" is the contact number.

Contacts which are closed when the relay is deenergized, known as "break" contacts, are represented by a short line perpendicular to the line representing the conductor, while contacts which are closed when the relay is energized, known as "make" contacts, are represented by two short crossed lines diagonally intersecting the conductor line. A "break" and "make" contact connected together on one side, in close proximity to each other and with the designation "C," indicates a set of "continuity" or "make-before-break" contacts. The contacts in the reader are designated in a manner similar to that used in designating relay contacts. Rotary selectors are shown with their operating coils and core illustrated in the same manner as the coils of relays and with interrupter and off normal switches shown in a manner similar to that used in connection with the relays, whereas, the common brush or rotor of the switches is in each case designated "all" and the various contacts with which the rotor or brush engages in stepping across the row of contacts associated with it are given reference numbers indicating that certain of the separate contacts in the particular row or arc are interconnected one to another. For example, in FIG. 19 the switch EMCL–ARC–1 has its contacts 3 and 6 interconnected or strapped together. These stepper switches are of the type which step their wipers or brushes when the operating magnet is released or deenergized. These switches open their interrupter contacts each time they are energized and close their off-normal contacts in all except the home or normal position. Similarly the normally open and normally closed contacts of keys or push buttons are shown in a manner similar to that used in designating relay contacts. The other circuit elements are shown in the conventional manner employed heretofore.

In some instances where the complete function of a circuit cannot be shown in a single figure due to the fact that there is an interaction between its functional operation and the functional operation of other portions of the apparatus, a terminal is shown by a small arrow with a reference indicating the figure on which the continuation of this circuit is presented.

Since in many instances, the detached contact method of exposition results in a drawing where the circuit elements have no apparent physical connection one with the other, it is to be assumed that all of the subject matter appearing within the confines of a single sheet of patent drawing constitutes a single patent figure unless otherwise indicated. When the subject matter on a sheet of patent drawing includes more than one figure, the subject matter of each figure is identified by a separate figure number.

GENERAL DESCRIPTION

Referring now to FIG. 1, there is shown a block diagram of a message preparation center of the type to which this invention pertains. Incoming messages are supplied to the center on two different types of systems. Messages arriving at the center from other stations in the line switching network arrive over telephone lines terminated in Dataphone sets which convert the signals on the telephone line to conventional telegraph signals. These signals then are supplied from the Dataphone set to a telegraph receive unit where they are perforated and stored on paper tape. Telegraph messages arriving at the message preparation center from private line sources which do not have line switching facilities are transmitted directly to the center over conventional telegraph lines or loops to the reperforators in the receive units.

Both of the above types of inputs are represented in FIG. 1 with a receive unit 10 in the communication center being shown with an input applied directly to it. This input is representative of a conventional private telegraph line which is terminated by the receive unit 10. A pair of receive units 11 and 12 are shown each having an input supplied to them from respective Dataphone sets 13 and 14. These inputs are representative of signals arriving at the center on the line switching network with which this system is to be used. It is to be understood that the number of units of both types shown is merely illustrative and that practical applications of the invention may use considerably greater numbers of receive units of both types.

The two different types of receive units which are shown in FIG. 1 differ only with respect to necessary modifications which are dictated by the type of input system with which they are to be used. However, these modifications will not be discussed herein since the receiving reperforator in the receive unit 10 is a conventional typing reperforator of basically the same construction as that disclosed in the United States Patent No. 2,951,902 issued to R. E. Arko and C. W. Swan on September 6, 1960 and assigned to the same assignee as this invention. The disclosure of this patent is incorporated herein by reference for details of construction not illustrated herein. The receiving equipment in the receive units 11 and 12 is of the type described in the above-identified copending application.

Whenever any of the receive units 10 to 12 has a message available for cross office transmission, it so indicates and initiates operation of a stepping switch which is incorporated as a part of that receive unit. These stepping switches are indicated in the right-hand end of each of the receive units 10 to 12 in FIG. 1. The stepping switch in the receive unit searches for an idle one of a plurality of shift registers, two of which, 20 and 21, are shown in FIG. 1. If a shift register is busy, that is, if it is connected to another receive unit in the system, the stepping switch passes over it until it finds an idle shift register. When the stepping switch finds an idle shift register, it causes the receive unit to be connected to the shift register and the stepping switch magnet is disabled.

After the receive unit has been connected to a shift register, an indication is supplied to all of the send units 30, 31 and 32 which are reperforator-transmitter sets of the type described in the above-identified copending application. Each of the send units 30, 31 and 32 has incorporated therein a stepping switch similar to that located in each of the receive units 10, 11 and 12. Whenever a receive unit indicates that it has traffic available to the send units, all of the send units which are not already connected to a receive unit begin searching for the receive unit with the message available by causing the send unit stepping switches to search the receive units in sequence. When the stepping switch in a send unit finds the receive unit with traffic available, it causes that send unit to be connected to the receive unit and the stepping switch magnet is disabled.

After the connections mentioned above have been made, the receive unit transmits equipment identification characters and the start-of-message code to the send unit. The message format used by the air lines with which this system is to be used has a mnemonic code or address following the start-of-message code. This type of address has been discussed in detail in the above-mentioned copending application and will not be further explained here. After the start-of-message code has been supplied to the send unit, the send unit is disconnected or blinded to further signals from the receive unit, and the mnemonic code is supplied to the shift register which previously was connected to the receive unit.

When the entire mnemonic code is stored in the shift register, the shaft register causes further transmission from the receive unit to stop. If the mnemonic code stored in the register contains an air line designation which is that of the particular line switching system with which the message preparation center is associated, the shift register searches for an idle one of a pair of translators 40 or 41 by operation of a stepping switch in a manner similar to the operation of the stepping switches in the receive units and the send units previously discussed. When the shift register finds an idle translator, a connection is made between the shift register and the translator, and the stepping switch magnet is disabled.

The mnemonic code stored in the shift register then is read by the translator; and a direct distance dialing telephone number (DDD number), which is the telephone number of the destination represented by the stored mnemonic address code is generated by the translator. This DDD number and a translator identification character are supplied through connections in the shift register and the receive unit to the send unit which perforates the identification character and the telephone number in addition to some control perforations (as will be described more fully hereinafter) in the tape at the send unit.

Following the transmission of the DDD number to the send unit, the mnemonic code stored in the shift register is shifted serially out of the register and supplied through the connections in the receive unit to the send unit where it is perforated in the tape following the DDD number.

If no end-of-address code follows this first mnemonic code the above sequence is repeated until an end-of-address code is detected.

Whenever a mnemonic code is received having an air line designation which is not that of the particular line switching system with which the message preparation center is associated, the shift register does not search for a translator; and the mnemonic code is shifted serially out of the shift register without being preceded by a DDD number.

Once the translator has supplied the DDD number to the send unit, it is disconnected from the shift register so that it is available for use by other shift registers which may have a mnemonic code, requiring a DDD number, stored therein. In a like manner, once an end-of-address code has been detected by the shift register, the shift register is disconnected from the receive unit to make the register available to other receive units. By using the shift registers and translators in this manner, it is possible to service a large number of receive units with a considerably smaller number of shift registers and translators thereby effecting substantial savings in the cost of building the message preparation center of this invention.

After an end-of-address signal has been detected by the shift register, the text of the message is transmitted directly from the receive unit to the perforator in the send unit where it is stored in the tape following the end-of-address code which was perforated immediately following the last mnemonic code supplied from the shift register.

If the incoming message was received through one of the Dataphone sets 13 or 14 thereby indicating that it came from a line switching system, it has an end-of-message code which differs from the end-of-message code commonly used in conventional telegraph systems of the type which supply incoming messages to the receive unit 10. Since the line switching system of the above-mentioned copending application with which this message preparation center is to be used only recognizes the line switching end-of-message code as received by the receive units 11 and 12, it is necessary to insert this end-of-message code into any messages which are terminated by the conventional end-of-message code as received by the receive unit 10. This line switching end-of-message code is generated by the receive unit 10 upon recognition of the private line end-of-message code.

Each of the receive units 10, 11 and 12 generates the required 8-level control perforations which are necessary to the proper operation of the transmitter equipment in the send units 30, 31 and 32. Following the transmission of the line switching end-of-message code, the cross office path is released and the receive unit is available for processing of additional messages. It is to be understood that the details of all of the circuit logic described generally above will be described in detail hereinafter.

*The tape*

Figure 2:
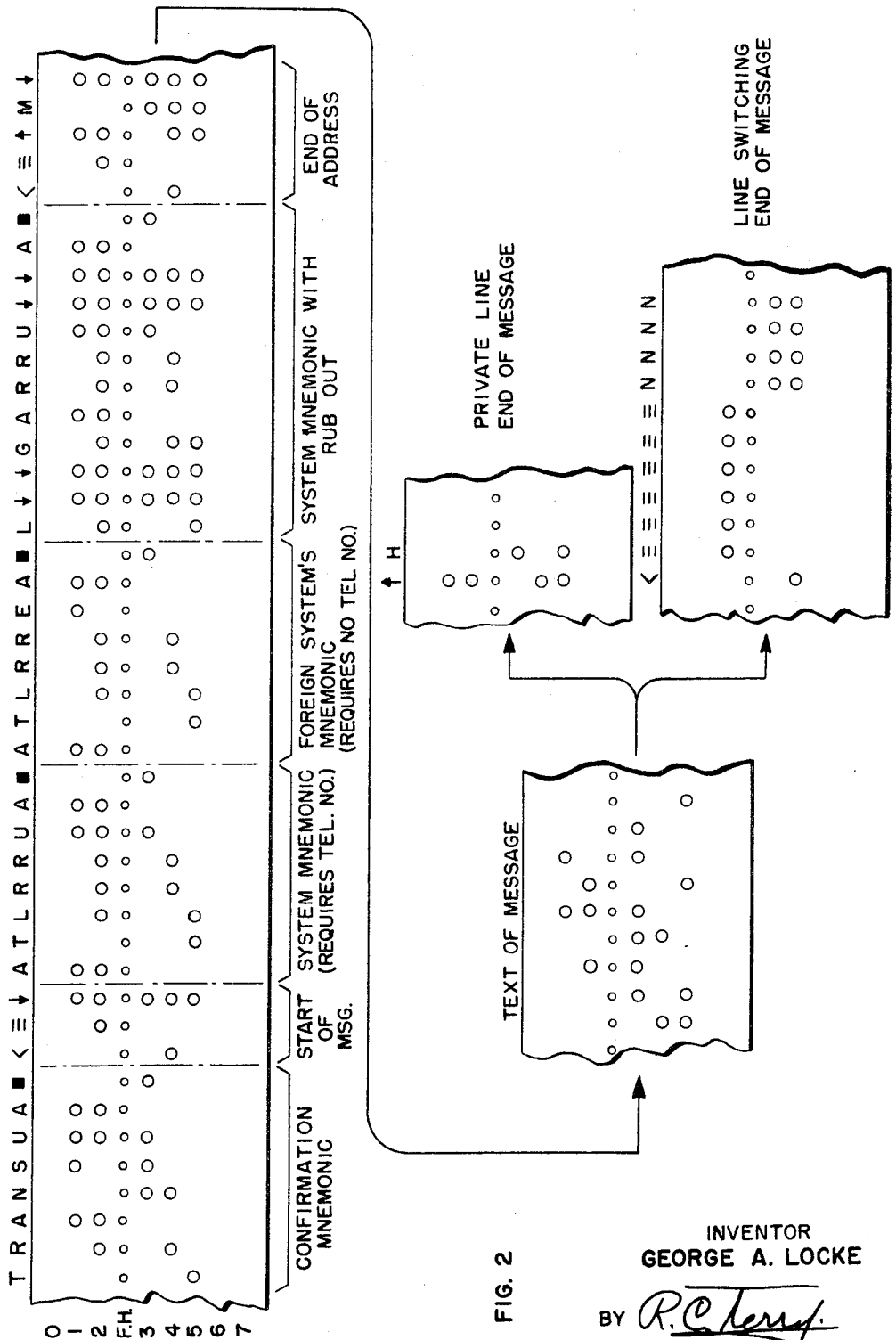
FIG. 2 shows a sample perforated tape containing a message as received by a receive unit.

FIG. 2 shows a sample tape as received by any of the receive units 10, 11 or 12. The first portion of the tape is perforated with characters representing the confirmation mnemonic code which was sent by the receiver unit to the transmitting station acknowledging connection between the transmitting station and the receive unit. The manner in which this confirmation mnemonic is generated will not be described here since it is discussed in the above-mentioned copending application. The confirmation mnemonic code is followed by a three-character start-of-message code, "CR–LF–LTRS." In FIG. 2 this start-of-message code is followed by a system mnemonic code, that is a mnemonic code of a station common to the line switching system of which this center is a part. This system mnemonic code requires a telephone number to be inserted by the cross office equipment for proper handling by the line switching equipment in the send unit 30, 31 or 32 to which the message is supplied. Immediately following the system mnemonic code in FIG. 2 there is shown a mnemonic code for a foreign system which requires no telephone number and which will be shifted directly out of the shift register without a connection to a translator being made as discussed under the General Description above.

It is common practice whenever an error is made in keyboarding the original tape at the transmitting station to rub out the error by perforating "LTRS" characters over those characters which are in error. When the message is transmitted these "LTRS" characters are also transmitted and are perforated in the tape at the receive unit. Such a mnemonic code with the rub-out "LTRS" characters in it is shown next on the tape in FIG. 2. In this case the second, third, ninth and tenth characters are "LTRS" rub-out characters, otherwise, the mnemonic code is similar to the first system mnemonic code which immediately followed the start-of-message address.

It will be noted by an examination of the tape in FIG. 2 that the characters "U–A–SPACE" are used to designate the system mnemonic code. This designation will be used throughout this specification in the examples which are utilized to explain the operation of the system. It should be apparent that any suitable designation code may be used in this system without departing from the invention and that the invention is not limited to a system using only the designation code "U–A–SPACE."

The message format received by the receive units 10, 11 and 12 may contain any number of mnemonic address codes. Following these mnemonic address codes there is perforated into the tape the end-of-address code "CR–LF–FIGS–M–LTRS" which is then followed by the text of the message as shown in FIG. 2. Messages which are received by the line switching system through the Dataphone sets 13 and 14 have the line switching end-of-message code "CR," six codes for "LF," and the code for "N" four times. Messages which are received from a private line system such as that connected to receive unit 10 may be terminated in either the above end-of-message code or the end-of-message code "FIGS H." Both types of end-of-message codes are shown in FIG. 2.

From an examination of FIG. 2 it may be seen that the incoming signals which are perforated at the receiving units 10, 11 and 12 are in 5-level Baudot code.

Figure 3:
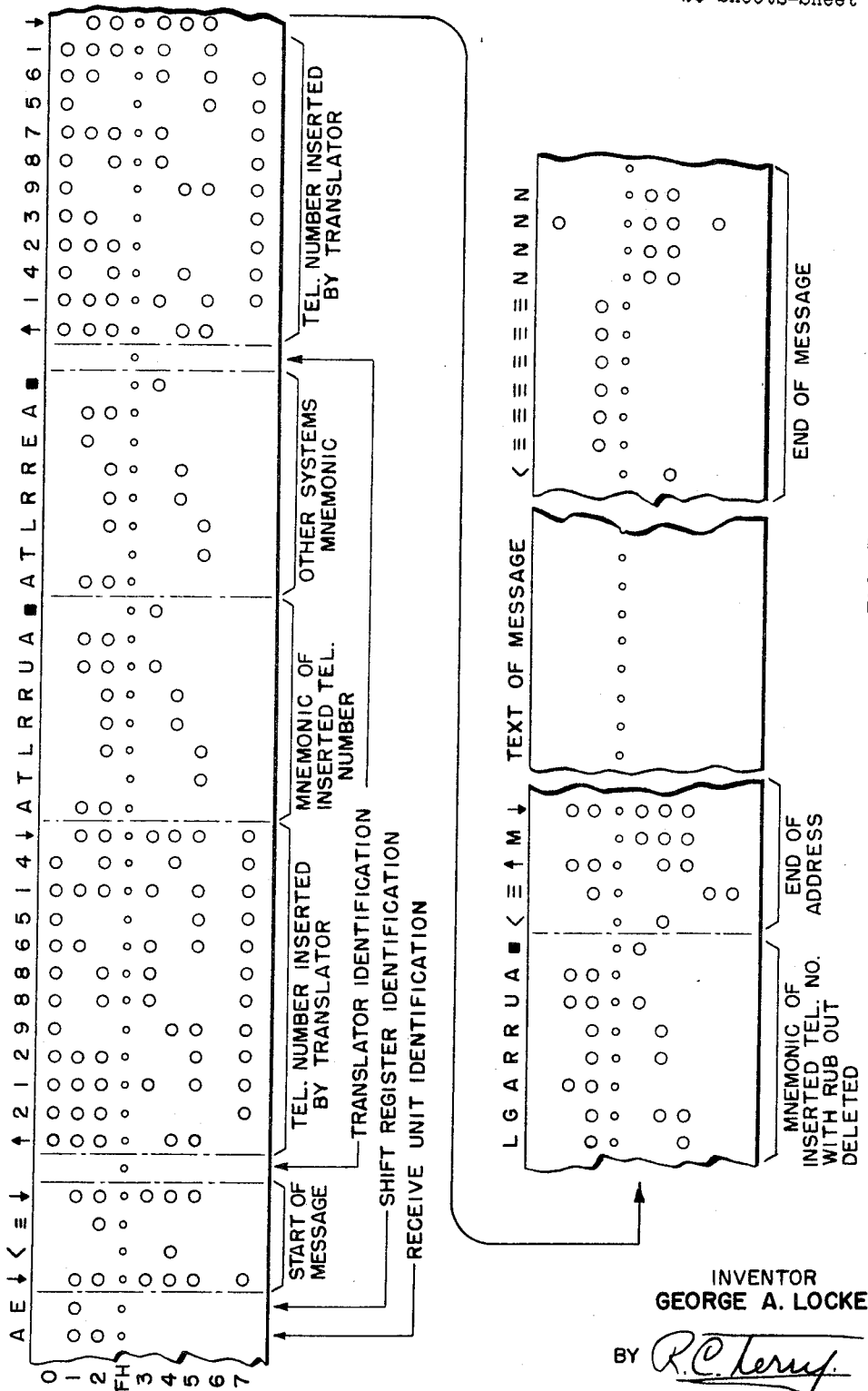
FIG. 3 shows a sample perforated tape containing the message of FIG. 2 as received by a send unit.

FIG. 3 shows a sample tape as perforated by the reperforator in any one of the send units 30, 31 or 32. The tape shown in FIG. 3 was prepared from the incoming tape of FIG. 2. The system ignores all characters which precede a start-of-message code, and the start-of-message code perforated in the incoming tape is used to cause the receive unit to search for and connect to a shift register and a send unit. When this connection has been made, a receive unit identification code and a shift register identification code are transmitted to the send unit and are perforated in the tape prior to the start-of-message code.

Since the start-of-message code in the original tape was lost in causing the receive unit to establish connections to the shift register and the send unit, the receive unit generates a new start-of-message code "LTRS–CR–LF- LTRS," the first "LTRS" character of which is accompanied by a perforation in the seventh level.

As previously stated the mnemonic code is not transmitted directly to the send unit but rather is stored in the shift register where it is read by the translator which then supplies the DDD telephone number to the send unit reperforator. However, prior to the transmission of the DDD number and immediately following the transmission of the start-of-message signal to the receive unit, a translator identification character is supplied to the send unit and this character is shown on the tape in FIG. 3 immediately following the start-of-message code. The DDD number is transmitted to the reperforator preceded by a "FIGS" character and followed by a "LTRS" character. The "FIGS" character is accompanied by a perforation in the zero level and the "LTRS" character following the DDD number is accompanied by a control perforation in the seventh level. The ten DDD numbers are each accompanied by control perforations in the zero to seventh levels.

The mnemonic code of the above inserted telephone number is then transmitted from the shift register in conventional 5-level Baudot code as shown in FIG. 3 and this mnemonic code is followed on the tape by the foreign systems mnemonic code which is also perforated in the conventional 5-level Baudot code.

Since the next mnemonic code which appears on the incoming tape is a system mnemonic code, a translator again is selected and an identification character is perforated in the tape following the foreign mnemonic code. Then a DDD telephone number corresponding to the system mnemonic code is inserted by the translator. This number is similar to the telephone number previously inserted for the first mnemonic code which appeared on the incoming tape. Following this second telephone number the second system mnemonic code is perforated on the send unit. It should be noted that the rub-out "LTRS" characters have been deleted and only the desired mnemonic code characters are perforated on the tape at the send unit. The manner in which this deletion of the "LTRS" characters is accomplished will be described more fully in the subsequent explanation of the detailed circuit.

The last mnemonic code is followed by the same end-of-address signal which appeared on the input tape except that control perforations have been added to the sixth and seventh levels of the "LF" character. Following the end-of-address, the text of the message in 5-level Baudot code follows and this text is followed by the line switching end-of-message to which have been added control perforations in the zero to sixth levels of the third "N" of the end-of-message code.

The comparison of the tapes shown in FIGS. 2 and 3 shows that the system of this invention causes a considerable amount of information to be inserted into the tape at predetermined points so that the tape prepared by the message center is in a format which may be used with the line switching systems described in the above-mentioned copending application. All of this additional information is automatically inserted into the tape during the cross office transmission and processing of messages received by the message preparation center, as will be more fully understood from the following detailed description of the various circuits which comprise the message preparation system.

*Detailed circuit description*

In the ensuing description it is assumed that the reperforator in one of the receive units 10 to 12 has completed the tape preparation and the tape is available for processing by the switching and message preparation center. The transmitter-distributor used in each of the receive units 10 to 12 is preferably a 200 w.p.m. unit of the type having two cam shafts, which in this invention are separately controlled. This type of transmitter distributor is fully disclosed in the afore-mentioned copending application.

The transmitter or sensing contacts of the transmitter-distributor are used to read the tape and send the information to the shift register and/or to the send unit. All of the intelligence information, that is mnemonic codes, text, end-of-address, and end-of-message are transmitted on a parallel basis. The serial or distributor contacts of the transmitter-distributor which are normally used for line transmission are used in this invention only to provide short interval, timed pulses to operate the send unit reperforator clutch magnet. As stated previously, the reperforator used in each of the send units is of the type disclosed in the afore-mentioned application. Each of the eight levels is equipped with a selector or punch magnet and the information transmitted from the receiver unit transmitter operates the magnets simultaneously.

(1) *Recognition of start-of-message ("CR," "LF")*

When tape becomes available to the transmitter, an indication is made to the transmitter that this condition exists by closure of the tape available make contact shown in FIG. 23. Closure of this contact can be done in a number of ways common in the art, and such methods of closing a tape available contact will not be discussed here. Closure of this contact causes the relay 23–TSA to operate. This relay is a slow release relay which is held operated through its own contact 23–TSA–10 for a predetermined period of time after the tape available contact is opened.

The operation of the relay 23–TSA opens the end-of-message distributor control paths by opening the break contact 24–23–TSA–4 and the break contact 22–23–TSA–6 in order to prevent operation of the end-of-message distributor control path prior to the receipt of the next end-of-message code combination, as will be more fully understood from the subsequent description of the operation of the circuit upon receipt of an end-of-message code combination.

Closure of the tape available contact also causes operation of the transmitter clutch magnet 23–TCM through the now closed break contacts 23–20–SRC–6, 23–6–EMTA1–8, 23–12–CLF–1, 23–12–FH–1, 23–12–CST–1, 23–21–Z–10 and 23–30–TXA–6. Operation of the transmitter clutch magnet 23–TCM allows the transmitter mechanism to feed and sense the tape which is available in the receive unit. All characters which precede the start-of-message code "CR," "LF" are ignored by the system and are lost as far as transmission from the receive unit to a send unit is concerned. When the first "carriage return" character ("CR") is sensed, it causes operation of the code reading relay 4–RD4 leaving unenergized the code reading relays 4–RD1, 4–RD2, 4–RD3 and 4–RD5. This operation is effected by the closing of only the transmitter reading make contact 4 which is the Baudot permutation code used to signify "CR." The operation of the relay energize path for the relay 4–RD4 takes place from ground (FIG. 4), through this closed transmitter reading contact, the now closed break contact 4–21–Z–4, the winding of the relay 4–RD4 to a source of negative battery (FIG. 4).

Operation of the relay 4–RD4 causes the make contact 9–4–RD4–1 to be closed thus providing an energizing path for the relay 9–TA2 through the now closed break contact 9–4–RD1–5. At the same time, operation of the relay 10–TA5 is effected through a path provided by the now closed break contacts 10–4–RD2–5 and 10–4–RD3–5 since neither the relay 4–RD2 nor 4–RD3 was energized during the sensing of the "CR" character. The operation of the relays 9–TA2 and 10–TA5 closes the make contacts 11–9–TA2–11 and 11–10–TA5–6, which in conjunction with the now closed break contacts 11–29–TXT–4 and 11–4–RD5–5 prepare a path from ground (FIG. 11) to the carriage return relay 12–CR.

Operation of the transmitter clutch magnet 23–TCM also closes the transmitter auxiliary make contact 22–23–TRANS–AUX–1. This contact is opened once for each revolution of the transmitter cam shaft in a manner which is more fully understood with reference to the afore-mentioned copending application with discloses the transmitter distributor apparatus in full.

Closure of the transmitter auxiliary contact 22–23–TRANS–AUX–1 causes operation of the relays 22–DAC and 22–DAC1 by providing a path from ground (FIG. 22), through the contact 22–23–TRANS–AUX–1, the now closed break contact 22–4–LRD–3, and the windings of the relays to a source of negative battery (FIG. 22). Operation of the relay 22–DAC closes the make contact 11–22–DAC–2 to complete the operating path from ground (FIG. 11) to the relay 12–CR over the path described above. The relay 12–CR, in operating, locks to ground through its own now closed make contact 12–CR–6 and the now closed break contacts 12–LF–5, 12–CLF–5, and 12–EMTR–3. In addition to operating the relay 12–CR, the energization of the carriage return lead also applies an inhibiting signal to the relay 12–EMTR through the now closed break contacts 12–CT2–4, 12–TN2–9, 12–TN3–11, 12–TF–2, and 12–CT2–7. In the absence of such an inhibiting signal the relay 12–EMTR would be operated due to the closure of the make contacts 12–22–DAC–3 by the operation of the relay 22–DAC.

On the next revolution of the transmitter cam shaft when the "line feed" ("LF") character is read by the transmitter reading contacts 1–5 of FIG. 4, it is decoded by the relays 4–RD1 to 4–RD5 and the relays 9–TA1 to 9–TA4 and 10–TA5 to 10–TA8 in a manner similar to the decoding of the "CR" character discussed above. Without tracing in detail the various circuit paths and relay operations which are utilized to decode the "LF" character, it is considered sufficient to state that the detection of the "LF" character causes operation of the relays 9–TA1 and 10–TA7 thereby causing energization of the lead LF through the path from ground (FIG. 11) through the now closed make contact 11–22–DAC–2; the now closed break contacts 11–4–RD5–5 and 11–29–TXT–4, the now closed make contacts 11–9–TA1–6, 11–10–TA7–6, and 12–CR–8; and the now closed break contacts 12–EOS–10 and 12–CLF–6 to energize the relay 12–CLF.

The operation of the relay 12–CLF transfers the holding path of the relay 12–CR to the pulses on the lead LF by closing the make contact 12–CLF–5 and opening the break contact 12–CLF–5. At the end of the "LF" pulse the relay 12–CR is released by the opening of the make contact 11–22–DAC–2 upon the release of the relay 22–DAC effected by the opening of the transmitter auxiliary contact 22–23–TRANS–AUX–1.

The relay 12–CLF, when it is operated, locks operated through its own make contact 12–CLF–6 and the now closed break contacts 12–6–EMTA1–1, 12–20–SRC–2, and 12–EOS–6. The transmitter clutch magnet 23–TCM is deenergized upon the operation of the relay 12–CLF which opens the break contact 23–12–CLF–1 in the energizing circuit for the transmitter clutch magnet. This disabling of the transmitter clutch magnet causes the reading of the tape in the send unit to be temporarily stopped.

At the same time that the transmitter clutch magnet 23–TCM is disabled by the operation of the relay 12–CLF, the make contact 8–12–CLF–3 is closed thus providing an energizing path for the relay 8–CL through that contact and through the now closed break contact 8–CL–6. The relay 8–CL locks operated through its own make contact 8–CL–6 and the now closed break contacts 8–30–TXA–4 and 8–12–EMTA–7.

It should be noted that the start-of-message characters "CR," "LF" which are read by the receiving unit transmitter and decoded by the above-described circuit are not supplied to any send unit but are used merely to initiate searches for an idle shift register and an idle send unit as described in the next two sections.

(2) *Selection of a shift register*

When the relay 8–CL operates, it closes the make contact 14–8–CL–7 to close the lead BY to the four shift registers if any of the four shift registers is idle at the time the contact 14–8–CL–7 is closed. This idle condition is indicated by closure of the break contacts 14–SRX–2 and 14–BX–2 in one or more of the shift registers. For the purpose of simplifying this disclosure only one of the shift registers has been shown in detail in the drawings; and whenever connections may be made to others of the four shift registers, this has been indicated in the drawings by showing a lead terminated in an arrowhead with the designation "TO REG." followed by the number of the shift register to which this connection is made. In all of the drawings, only the connections to the shift register No. 1 are shown in detail.

Assume that the contacts 14–SRX–2 and 14–BX–2 in the shift register No. 1 are closed at the time the contact 14–8–CL–7 is closed by operation of the relay 8–CL. The busy relay 14–BY then is energized through a path extending from ground through the afore-mentioned contacts, the now closed break contacts 14–29–TXT–1 and 14–TC–12, the now closed stepping switch interrupt contact 14–SR INT–1 and the winding of the relay 14–BY to a source of negative battery. Operation of the busy relay 14–BY closes the contact 14–BY–4 to cause energization of the stepping switch relay 14–SR through a path extending from ground through the now closed make contact 14–BY–4, the now closed break contact 14–TST–3, and the winding of the relay 14–SR to a source of negative battery. Since all of the stepping switches used in this system are of the type which step forward when they are released, this energization of the relay 14–SR prepares the shift register connect stepping switch to step one step forward when its interrupter contact 14–SR INT–1 is opened as a consequence of the energization of the relay 14–SR. This contact 14–SR INT–1 is normally closed and opens any time the relay 14–SR is energized. When the contact 14–SR INT–1 opens, the relay 14–BY is released thereby opening the contact 14–BY–4 to release the stepping switch relay 14–SR causing the stepping switch to move its brushes or wipers from the normal position to the No. 1 position. Release of the relay 14–SR causes the contact 14–SR INT–1 to reclose, thereby reenergizing the relay 14–BY. The contact 14–BY–4 is closed again, and the relay 14–SR is reenergized causing the above sequence to be repeated to advance the stepping switch to the No. 2 position. The stepping switch continues to advance step-by-step in this manner until it is stopped by the operation of the relay 14–TST as explained hereinafter.

When the stepping switch 14–SR–ARC–6 connects to an idle shift register (for this illustration No. 1) the −48 volts is connected to the terminal 2 of the tube DT from ground through the closed break contacts 14–BX–3 and 14–33–LC2–2 in the idle shift register, the stepping switch 14–SR–ARC–6, position 1, 5 and 9 for register No. 1, the now closed break contacts 14–29–TXT–2, and the now closed make contacts 14–8–CL–8 causing the tube to conduct. The conduction of tube DT then causes the relay 14–TST to operate. The operation of the relay 14–TST stops the 14–SR stepping switch in positions 1, 5 or 9 by opening the break contact 14–TST–3 to open the energizing path for the relay 14–SR. At the same time, the relay 14–TC is energized by closure of the make contact 14–TST–3 and closes its make contact 14–TC–10 to provide a short circuit across the No. 2 and No. 5 elements of the DT tube. This applies a high positive potential to the stepping switch 14–SR–ARC–6 to safeguard against a second receive unit connecting to the shift register which has been selected by this receive unit.

The operation of the relay 14–TC closes the make contact 14–TC–4 to provide an energizing path for the relay 14–SRX in the shift register No. 1 from ground through the stepping switch 14–SR–ARC–5, the now closed break contacts 14–33–LC2–3 and 14–BX–4, and the winding of the relay to a source of negative battery. The operation of the relay 14–SRX shunts the contact 14–33–LC2–3 by closing the make contact 14–SRX–4 and opens the break contact 14–SRX–2 to disable the relay 14–BY. At the same time the lead BY is opened further by the opening of the break contact 14–TC–12 by operation of the relay 14–TC.

(3) *Selection of a sending unit*

Figure 17:
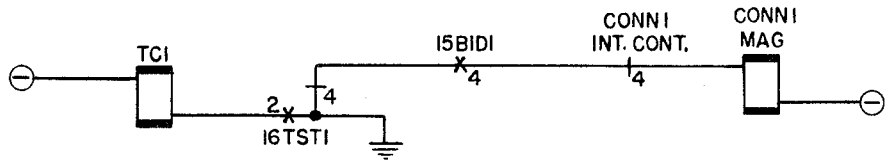
Figure 18:

The operation of the relay 14–TC in conjunction with the previous operation of the relay 8–CL provides an operating path for the relay 15–BID1 in completing a path from ground through the now closed break contacts 15–6–EMTA1–7 and 15–16–CON–1, the now closed make contacts 15–14–TC–8 and 15–8–CL–10, and the winding of the relay to the negative battery. Operation of the bid relay 15–BID1 initiates operation of the send unit search and connect stepper switch magnet 17–CONN1 by completing a path from ground (FIG. 17) through the now closed break contact 17–16–TST1–4, the now closed make contact 17–15–BID1–4, the now closed break contacts 17–CONN1 INT–4 and the relay winding to the negative battery (FIG. 17). Energization of the stepping switch magnet 17–CONN1 causes the stepping switch ARCs 1 through 11 to step and search for the send unit which caused the bid relay 15–BID1 to be energized. This stepping switch is of the same type as 14–SR and operates in the same manner.

A path is completed from negative battery (FIG. 16) through the now closed make contacts 16–8–CL–2 and 16–14–TC–2 and the now closed break contact 16–6–EMTA1–4 to the position of stepping switch 16–17–CONN1–ARC–1 associated with the receive unit which is seeking the connection (unit No. 1 in this illustration) with the particular send unit under consideration. In the example shown in FIG. 1 only the contacts associated with the receive unit No. 1 have been shown in detail with indications of the connections to the other receive units being shown by a dotted line interconnecting step No. 1 and step No. 25 of 16–17–CONN1–ARC–1 and ARC–2. Each step of the stepping switch causes ARC–1 and ARC–2 to be connected to a different one of the receive units in the system in sequence. Since the receive unit No. 1 is the receive unit which has been indicated in the illustration as making a bid for a send unit, the stepping switch 17–CONN1 on its first step or position finds a negative potential present at position 1, and this negative potential is applied through position 1 of 16–17–CONN1–ARC–1, the now closed make contact 16–15–BID1C–8 to terminal 2 of the cold cathode tube DX. This tube fires and causes operation of the relay 16–TST1 in much the same manner that the firing of the tube 14–DT operated the relay 14–TST.

Operation of the relay 16–TST1 interrupts the energization path for the stepper switch magnet 17–CONN1 by opening the break contact 17–16–TST1–4. At the same time, the relay 17–TC1 is energized from a source of negative battery connected through the relay coil and the now closed make contact 17–16–TST1–2 to ground (FIG. 17).

The relay 17–TC1, when it operates, then closes the make contacts 16–17–TC1–15 and 16–17–TC1–14 in the cold cathode tube circuit 16–DX to cause the 2–5 elements and the 2–7 elements of the tube to be shorted. As a result, a high positive potential appears on the first position of the stepping switch 16–17–CONN1–ARC–1, so that no other send units will connect to this particular receive unit. This is necessary since the like positions of the stepping switches in the other send units (not shown) are connected in parallel with the same positions in the send unit No. 1 shown in the drawings.

Closure of the make contacts 16–17–TC1–1 by the operation of the relay 17–TC1 transfers control of the cold cathode tube 16–DX from the relay 15–BID1 to the relay 17–TC1.

When the relay 17–TC1 is operated, it also closes the make contacts 16–17–TC1–2 to complete a path from ground through the stepper switch 16–17–CONN1–ARC–2 in position 1, and the now closed break contact 16–6–EMTA1–2, the winding of the relay 16–CON to a source of negative battery to cause energization of the connecting relay 16–CON. When the relay 16–CON is operated, it closes the make contacts 18–16–CON–3 providing a path from ground through the winding of the relay 18–CON1 to a source of negative battery thereby causing operation of the relay 18–CON1. The energizing path in the receive unit No. 1 for the bid relay 15–BID1 is also opened by operation of the relay 16–CON which now opens the break contacts 15–16–CON–1. Release of the relay 15–BID1 also further opens the energizing path for the 17–CONN1 stepper switch magnet by opening the make contacts 17–15–BID1–4.

Operation of the connect relay 16–CON closes the nine connect contacts 4–16–CON–4 through 4–16–CON–12 in the receive unit to connect the nine leads "a" through "i" to the send unit stepping switch 4–17–CONN1–ARCs–3 to 11, respectively, when the stepping switch 17–CONN1 is in position 1. It should be noted that the leads "a" through "i" are connected in common to the position 1 of the respective ARCs 3 to 11 of similar CONN stepping switches in other send units and also that similar leads in other receive units are connected to different positions of the ARCs 3 through 11 of the stepping switch 17–CONN1. Only one send unit is illustrated in detail in order to simplify the description of the circuit, but all of the send units are alike and operate in the same manner.

The operation of the connect relay 16–CON signifies to the receive unit that connections have now been made to a shift register and to a send unit. As a consequence, when the relay 18–CON1 is operated, it closes an operating path for the start-of-message and end-of-message stepping switch magnet 19–EMCL by completing a path from ground through the now closed make contacts 19–18–CON1–4 and 19–8–CL–11, the now closed break contact 19–12–EOS–4, the now closed off normal break contacts 19–EMCL O.N.–2 of the 19–EMCL stepping switch magnet, the now closed interrupt contacts 19–EMCL INT–1 of the 19–EMCL stepping switch magnet, and the winding of the 19–EMCL stepping switch magnet to a source of negative battery (FIG. 19). Energization of the start-of-message stepping switch magnet 19–EMCL advances the switch to position 1 which causes the receive unit identification character combination to be supplied to the send unit reperforator selector magnets 4–LPR–1 to 5.

The particular character which identifies the receiver in which the start-of-message and end-of-message generator 19–EMCL is located is coded by appropriate permutative strapping between position 1 of the stepping switch 19–EMCL–ARCs–1 to 5 and a ground potential which is applied through the now closed make contacts 19–12–CLF–8. The position 1 of each of the respective ARCs 1 through 5 of the 19–EMCL stepping switch having ground potential applied to it through a coding strap connection causes this ground potential to be applied through the stepping switch 19–EMCL–ARCs–1 to 5 to a respective lead P1 to P5. This ground potential on selected ones of the leads P1 to P5 is applied to the leads "a" through "e," respectively, which in turn cause this potential to be applied to respective ones of the send unit punch magnets 4-LPR1 to 4-LPR5. Any of the leads "a" through "e" which has the ground potential applied to it completes an energization path for its associated punch magnet 4-LPR1 to 4-LPR5 from a source of positive potential (FIG. 4) through the winding of its associated punch magnet, one of the now closed make contacts 4–17–TC1–3 to 4–17–TC1–7, and the stepper switch 17–CONN1–ARCs–1 to 5, position 1 to the respective grounded leads "a" through "e." Each receive unit is coded at position 1 of its 19–EMCL stepper switch with a different identification character so that the first character which is now perforated in the tape at the send unit thus identifies the particular receive unit which has been connected to the send unit for the message being processed.

The distributor clutch magnet 24–DCM in the receiving unit is energized through a path extending from a source of negative potential (FIG. 24) through the winding of the distributor clutch magnet 24–DCM, the now closed interrupt contacts 24–10–EMCL INT–3, the now closed make contacts 24–8–CL–5, and stepping switch 24–19–EMCL–ARC–11, positions 1 to 6 to ground. When the stepping switch 19–1MCL moves from its off normal position to position 1, the contact 19–EMCL O. N.–2 is opened thereby transferring control of the stepper switch magnet 19–EMCL to the distributor auxiliary contact 21–23–DIST–1 through a path extending from ground (FIG. 24), the distributor auxiliary contact, the stepping switch 19–EMCL–ARC–10, positions 1 to 6, the now closed make contact 19–12–CLF–2 and the winding of the switch magnet 19–EMCL to a source of negative potential (FIG. 19). As the cam in the distributor completes its first rotation, it causes the distributor auxiliary contacts 21–24–DIST–AUX–1 to open thereby releasing the stepping switch magnet 19–EMCL by breaking its operating path. When the magnet 19–EMCL releases, the stepping switch advances and the interrupter contacts 24–19–EMCL INT–3 are reclosed. This again causes operation of the distributor clutch magnet 24–DIST which closes the distributor auxiliary contact 21–24–DIST–AUX–1; and the cycle is repeated for each character generated by the start-of-message generator.

The distributor auxiliary contact 21–24–DIST–AUX–1 is closed for a period of approximately 40 milliseconds. During the period of the auxiliary contact closure, the distributor 2, 3, and 4 contacts (FIG. 22) close for an interval of approximately 20 milliseconds. The distributor auxiliary contact 21–23–DIST–AUX–1 is used to control the EMCL stepping switch, and the distributor 2, 3, and 4 contacts (FIG. 22) control the operation of the send unit reperforator clutch magnet 4–CM through a path extending from ground (FIG. 22) through the 2, 3, and 4 distributor contacts (FIG. 22), the now closed break contact 22–26–LTC–2, the now closed make contact 22–12–CLF–3, the stepping switch 22–19–EMCL–ARC–12, positions 1 to 6, line "j," the now closed make contact 4–16–CON–4, line "i," the stepping switch 4–17–CONN1–ARC–11 position 1, the now closed make contact 4–17–TC–11 and the winding of the clutch magnet 4–CM to a source of positive potential (FIG. 4).

When the stepping switch 19–EMCL steps to position 2, the particular shift register which has previously been connected to the receiving unit is identified through the stepping switch 19–14–SR–ARC–3. Each position 2 of ARCs–1 to 4 of the stepping switch 19–EMCL is connected respectively to different positions of the stepping switch 19–14–SR–ARC–3 which correspond to different ones of the four possible shift registers which are available for use by the receive unit. Since shift register No. 1 is the register which is connected to the receive unit in this example, a path is extended from ground, the stepping switch 19–14–SR–ARC–3 positions 1, 5, 9, stepping switch 19–EMCL–ARC–1 position 2 to lead P1 which in turn applies this potential over a path previously described to the send unit punch magnet 4–LPR1. Thus, an identification character for the shift register is perforated in the tape at the send unit.

Following the identification characters of the receive unit and the shift register, the stepping switch 19–EMCL is coded for "LTRS" in position 3, ARCs–1 to 5, and includes a path from ground to lead P7 through 19–EMCL–ARC–8 position 3 to the lead "h" (FIG. 4) which in turn causes an operating path for the punch magnet 4–LPR7 to be established from a source of positive potential (FIG. 4), through the winding of the punch magnet 4–LPR7, the now closed make contact 4–17–TC1–10, the stepping switch 4–17–CONN1–ARC–10 position 1 to the lead "h." This causes a control perforation to be made in the No. 7 level along with the "LTRS" character perforated in the No. 1 to No. 5 levels. The fourth step of the stepping switch 19–EMCL is coded for "CR," the fifth step is coded for "LF," and the sixth step is coded for "LTRS." These various permutative combinations are shown in FIG. 19 with respect to ARCs–1 to 8 of the stepping switch 19–EMCL.

When the stepping switch 19–EMCL reaches position 7, the distributor clutch magnet operating path is broken due to the fact that control for the distributor clutch magnet 24–DCM is transferred from the closed make contact 24–8–CL–5 connected to positions 1 through 6 of 24–19–EMCL–ARC–11 to the now open make contact 24–12–FH–4 connected to positions 7 through 15 of the stepping switch 24–19–EMCL–ARC–11. At the same time, the control of the stepping switch magnet 19–EMCL is transferred from the receive unit distributor to a path extending from ground (FIG. 19) the stepping switch 19–EMCL–ARC–9 positions 7 to 15, the now closed make contact 19–12–CLF–12, the interrupter contact 19–EMCL INT–1, and the winding of the magnet 19–EMCL to a source of negative potential. As a consequence, the stepping switch 19–EMCL rapidly steps through positions 7 to 15 under the control of the interrupter contact 19–EMCL INT–1. When the stepping switch 19–EMCL reaches position 16, the contacts 19–12–CLF–12 are shunted with the remainder of the control path being otherwise the same causing the switch to step rapidly "home." As the stepping switch 19–EMCL passes through step 25 in the "homing" process, ground is applied through 19–EMCL–ARC–11 position 25 to lead 118 to operate the relay 12–EOS. The operate path for the relay is provided from a source of negative potential (FIG. 12) through the winding of the relay 12–EOS, the now closed make contact 12–CL–1, and the now closed break contact 12–FH–7 to the grounded lead 118. When the relay 12–EOS is operated, it locks through to ground through its own make contact 12–EOS–2 and the now closed break contact 12–6–EMTA1–10. Operation of the relay 12–EOS opens the break contact 19–12–EOS–4 in the stepping switch off normal path to prevent further operation of the stepping switch magnet 19–EMCL. In order to prevent operation of the send unit reperforator during the time that the mnemonic code is sent to the shift register, the contact 4–12–EOS–5 is opened thereby preventing the operation of the clutch magnet 4–CM in the send unit reperforator by the closing of the make contact 4–22–DAC1–1.

The operation of the relay 12–EOS completes the connections between the shift register and the receive unit by closing the make contacts 14–12–EOS–12 which in conjunction with the previously closed make contacts 12–TC–6 completes a path from ground through the stepping switch 14–SR–ARC–4 and through the windings of one of four pairs of shift register connect relays 14–SR1 and 14–SR1A to 14–SR4 and 14–SR4A to a source of negative potential. In the particular example used in illustrating this invention, the stepping switch 14–SR is stopped in one of its positions 1, 5 or 9 thereby causing this path to be completed through the windings of the shift register connect relays 14–SR1 and 14–SR1A, operating those relays.

The shift register connect relays 14–SR1 and 14–SR1A, when operated, perform the function of connecting the receive unit and the shift register by closing the make contacts 4–14–SR1–1 through 4–14–SR1–13. A number of other contacts, operated by these relays, which perform connecting functions between various other parts of the system will be explained in detail when the functions of those portions of this circuit are recited in this discussion of the system operation.

Operation of any one of the relays 14–SR1 to 14–SR4 causes operation of the relay 20–SRC by closing the appropriate one of the make contacts 20–14–SR1–24 to 20–14–SR4–24 connected in parallel between one side of the relay 20–SRC and ground. The operation of the relay 20–SRC opens one of the lock paths for the relay 12–CLF by opening the break contact 12–20–SRC–2. The relay 12–CLF then releases due to the fact that the previous operation of the relay 12–EOS opened the break contact 12–EOS–6 and the release of the relay 12–CR opened the make contacts 12–CR–12 which provided the other holding paths for the relay 12–CLF.

The operation of the transmitter clutch magnet 23–TCM is transferred to the control of the shift register No. 1 by operation of the relay 20–SRC which closed the make contact 23–20–SRC–6 and opened the break contact 23–20–SRC–6. When the relay 12–CLF releases due to the operation of the relays 20–SRC and 12–EOS, the transmitter clutch magnet is reenergized through the path from ground (FIG. 23), through the now closed make contacts 23–20–SRC–6 and 23–14–SR1–15, the now closed break contacts 23–34–DLS–5 and 23–34–EOA1–9, the now closed make contact 23–14–SR1–16, the new closed make contact 23–6–EMTA1–8, and the remainder of the path previously discussed for the initial energization of the transmitter clutch magnet 23–TCM.

(4) Sending the mnemonic code to the shift register

Operation of the transmitter clutch magnet 23–TCM in the manner outlined in the preceding paragraph permits the transmitter cam to rotate and sensing of the tape by the transmitter reading contacts 1 to 5 of FIG. 4 resumes. The information sensed in the tape is sent to the shift register code reading relays 25–R1 to 25–R5 and 25–R1A to 25–R5A on the five leads 119 through 123, respectively. At the same time, this information is sent to the receive unit decoding relays 4–RD1 to 4–RD5 causing them to operate in the manner previously described. Rotation of the transmitter cam also causes operation of the transmitter auxiliary contact 22–23–TRANS–AUX–1 which provides the actuating ground pulses to step the shift register through the operation of the relays 25–DA and 25–DA1. The operating path for these relays is from ground (FIG. 22), through the transmitter auxiliary contact 22–23–TRANS–AUX–1, the now closed break contact 22–4–LRD–3, the now closed make contact 22–14–SR1–19, lead 126, and through the windings of the relays 25–DA and 25–DA1 to a source of negative potential (FIG. 25). It is to be noted that operation of any of the other relays 14–SR2 through 14–SR4 will cause similar connections to others of the shift registers Nos. 2 through 4 (not shown). The relays 24–DA and 25–DA1 are those in the shift register No. 1 which are being used to illustrate the operation of the invention.

Closure of the transmitter auxiliary contact 22–23–TRANS–AUX–1 operates the relays 22–DAC and 22–DAC1 as previously described.

Figure 27:
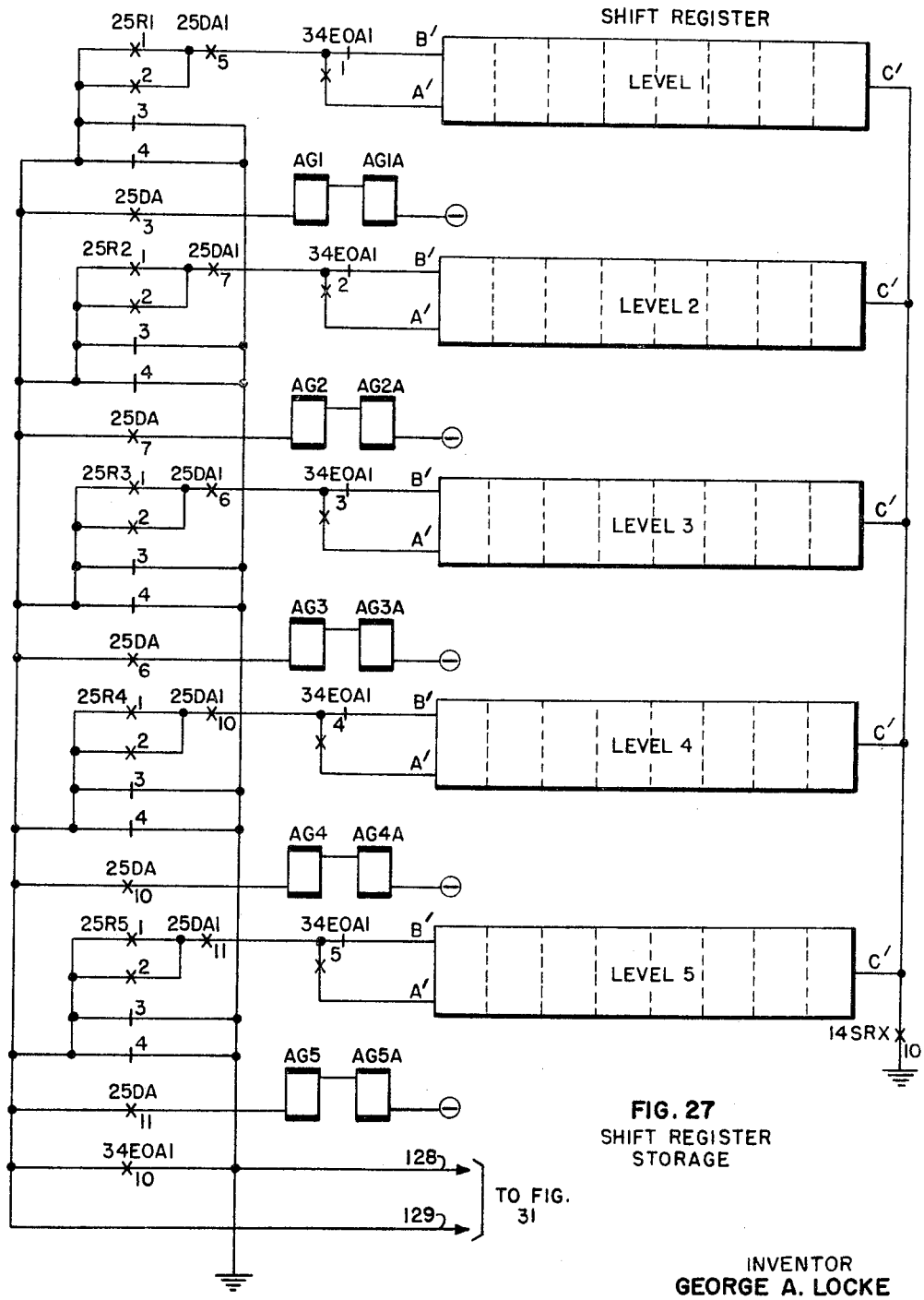

The shift register is capable of storing eight teletypewriter characters in the 5-level Baudot code which is commonly used. As seen in FIG. 27, all entries into the shift register are established from the contacts of the relays 25–R1 to 25–R5 which are operated from the tape sensing contacts (shown in FIG. 4) of the receive unit transmitter. It is a principle of the design of this system that *no* marking pulse may enter into the register unless at least one of the relays 25–R1 to 25–R5 is in its spacing (released) condition; therefore, the "LTRS" combination of five marking pulses cannot normally enter the register. This blinding of the register to "LTRS" combination is evident from an examination of FIG. 23 which shows that if all of the relays 25–R1 to 25–R5 are operated, thus indicating "LTRS," all of the break contacts 27–25–R1–3, 4 to 27–25–R5–3, 4 will be opened thereby preventing the ground potential of FIG. 27 from being applied to either of the lines A' or B' which are the inputs to each of the different levels of the shift register. If any one of the relays 25–R1 to 25–R5 is in its released or spacing condition, a path is established from ground (FIG. 27) through the now closed break contacts 3, 4 of the released relay(s), the now closed make contacts 1, 2 of any of the relays 25–R1 to 25–R5 which are in the marking or operated condition, the now closed make contacts 27–25–DA1–5, 6, 7, 10 or 11 and the now closed break contacts 27–34–EOA1–1 to 5 to the input line B' of the particular level of the shift register which is associated with a relay 25–R1 to 25–R5 which is in the marking or operated condition.

Under one special circumstance the "LTRS" combination is admitted into the shift register. If a "LTRS" combination is preceded by the characters "CR," "LF," a short is formed across the make contact 27–34–EOA1–10 for a period long enough (25 milliseconds) to permit the five marking pulses designating a "LTRS" character to enter the shift register. The method of establishing this short circuit path will be explained in detail in a subsequent description of the operation of the receive unit during receipt of the code combination characters "CR," "LF," "LTRS" at a time other than the start-of-message.

Figure 28:
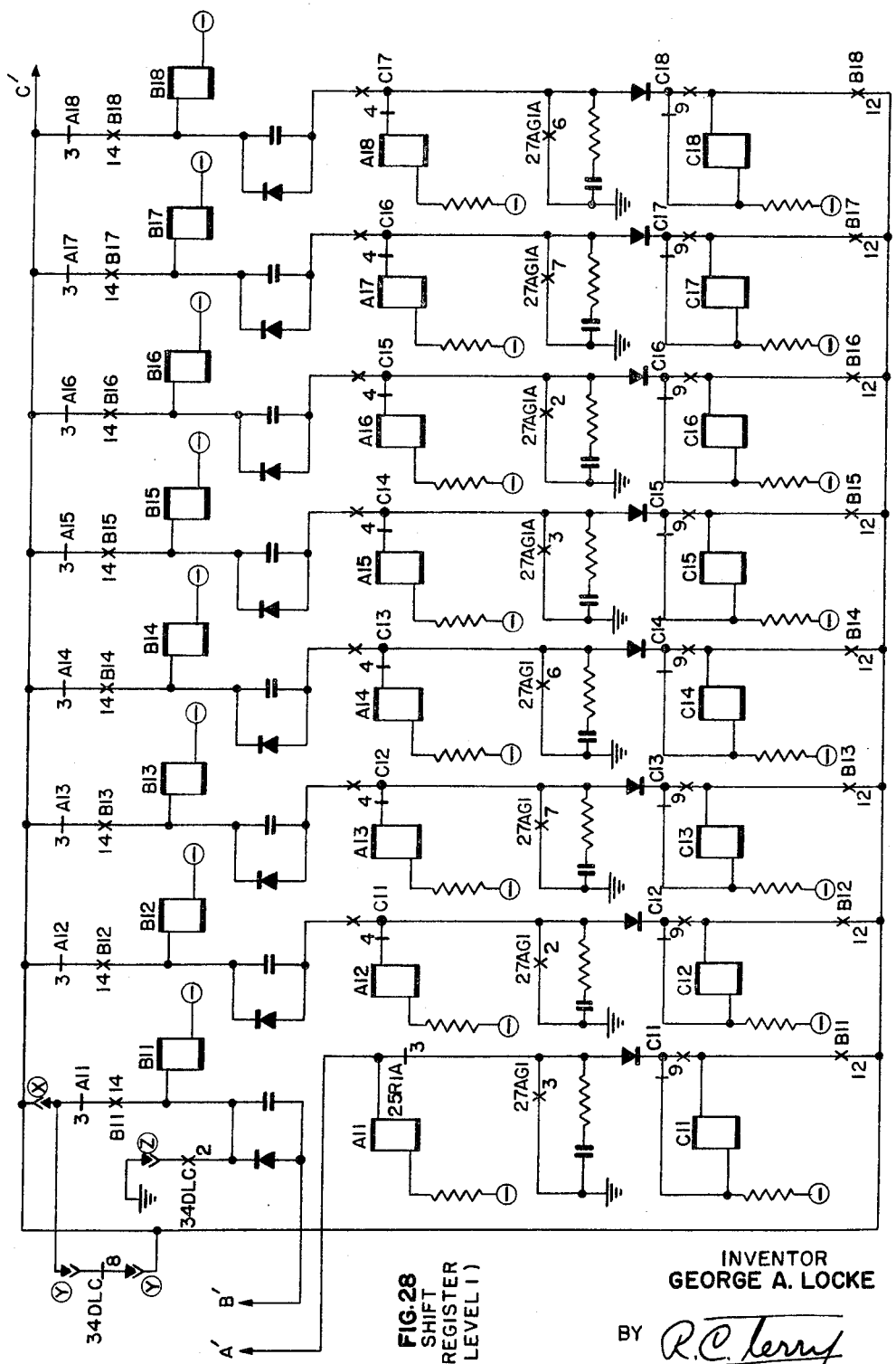

The shift register has the function of receiving the new condition while passing the old condition onto the next stage. In order to do this each stage must remember the old state while being reset with the new state. Each pulse of the 5-unit Baudot code is referred to as a level. Each level contacts eight storage positions or stages which are represented in FIG. 27 by the dotted lines dividing each of the five levels of the shift register. Every storage position of each level contains three relays, A, B and C. The designation of the relay indicates the level and the position with which it is associated. For example, relay A15 is the A relay in the fifth position of the first level of the shift register, where the "1" signifies the level with which the relay is associated and the "5" signifies the particular position in that level in which this relay appears. Similar designations are given to the B and C relays. Relay B is the relay which assumes the new condition, relay A is an unlock relay for relay B, while relay C is the memory relay. One level, the first level, of the shift register storage unit is shown in FIG. 28. Each of the five levels of the shift register which appear in FIG. 27 is the same except that the X wiring designation shown in the upper left-hand corner of FIG. 28 is used in the 1, 2 and 5 levels, the Y wiring designation of FIG. 28 is used on level 4 only, and the Z wiring designation of FIG. 28 is used on level 3 only. Aside from these minor variations each of the levels of the shift register are the same. The level of the shift register shown in FIG. 28 is typical of all five and represents one pulse of the five pulses required for each teletypewriter character in Baudot code.

Assume that all the A, B and C relays of FIG. 28 are released and that the relay 14–SRX is operated which then closes the make contact 27–14–SRX–10 applying ground to the lead C' of all five levels of the shift register. Also assume that the first character read in the receiving unit transmitter has a spacing pulse in the first level and that the remaining four levels are marking which is the B code representative for the letter "V." In this condition the relays 25–R1 and 25–R1A are not operated and the relays 25–R1 to 25–R5 and 25–R2A to 25–R5A are operated. When the transmitter auxiliary contact 22–23–TRANS–AUX–1 closes, the relay 25–DA is operated, as explained previously, and in turn this relay causes the operation of the relays 27–AG1 through 27–AG5 and 27–AG1A through 27–AG5A. The operating path for these AG relays is from ground (FIG. 27) through the contacts 27–25–R1–3, 4 of the released relay 25–R1 and the now closed make contacts 27–25–DA–3, 6, 7, 10 and 11. It is to be noted that when any of the relays 25–R1 through 25–R5 is in its released condition upon closure on transmitter auxiliary contact 22–23–TRANS–AUX–1, the relays 27–AG1 through 27–AG5 and 27–AG1A through 27–AG5A are operated. Operation of the relay 27–AG1 closes the make contacts 28–27–AG1–2, 3, 6 and 7. This completes an operate path for the relay 28–A–11 from ground (FIG. 28) through the now closed make contact 28–27–AG1–3, the now open break contact 28–25–R1A–3 of the released relay 25–R1A, the winding of the relay 28–A11 to a source of negative potential (FIG. 28). When the relay 27–AG1 releases upon the opening of the transmitter auxiliary contact 22–23–TRANS–AUX–1 at the completion of the first character supplied to the shift register, the relay 28–A11 is released since the make contact 28–27–AG1–3 opens. As a consequence, at the end of the reading of the first character a space signal is stored in the register, position 1, level 1, as evidenced by the released relays 28–B11 and 28–C11.

Assume for the purpose of this illustration, that the second character read by the transmitter has a marking pulse in the first level and that one or more of the other pulses is spacing. In this condition, upon sensing of the character, the relays 25–R1 and 25–R1A operate. Upon closing of the transmitter auxiliary contact 22–23–TRANS–AUX–1 and the resulting operation of the relay 25–DA, the relay 28–B11 is operated through a path established from ground (FIG. 27), the now closed make contacts 27–25–R1–1, 2 and 27–25–DA1–5 (closed upon operation of the relay 25–DA1 when the transmitter auxiliary contact closed), the now closed break contacts 27–34–EOA1–1, line B′, the winding of the relay 28–B11 to a source of negative battery (FIG. 28). As in the previous example, the operation of the relay 25–DA closes the make contact 27–25–DA–3 to effect operation of the relays 27–AG1 and 27–AG1A. Operation of the relay 27–AG1 prevents operation of the relay 28–C11 by shunting its winding through the closed make contacts 28–27–AG1–3 and the low closed break contacts 28–C11–9. Upon release of the relay 27–AG1 at the completion of the second character, the relay 28–C11 is operated through the now closed make contacts 28–B11–12 of the operated relay 28–B11 and the now closed make contact 27–14–SRX–10 to complete a path from ground (FIG. 27) through those contacts and the winding of the relay 28–C11 to a source of negative potential (FIG. 28). Thus, at the end of the reading of the second character a marking signal is stored in the register in position 1 as evidenced by the operated relays 28–B11 and 28–C11. The relay 28–B11 locks operated to ground at the end of the character through its now closed make contact 28–B11–14, the now closed break contact 28–A11–3, line C′, and the now closed make contact 27–14–SRX–10.

Now assume that the third character read by the transmitter has a space in the first level. Again the relays 25–R1 and 25–R1A are not operated. With the closure of the transmitter auxiliary contact 22–23–TRANS–AUX–1 and the subsequent operation of the relays 25–DA, 27–AG1 and 27–AG1A the relay 28–A11 is operated. The operate path for this relay has been discussed previously in conjunction with the first character read by the transmitter. Operation of the relay 28–A11 causes the release of the relay 28–B11 by opening the break contact 28–A11–3. The relay 28–C11 is held operated by the ground potential applied through the now closed make contacts 28–27–AG1–3 and 28–C11–9 to one side of the winding relay 28–C11, the other side of which is connected to a source of negative potential. With the relay 28–C11 operated, the relay 28–B12 is operated through a path extending from ground (FIG. 28), through the now closed make contacts 28–27–AG1–2, the now closed make contacts 28–C11–4, the winding of the relay 28–B12 to a source of negative battery (FIG. 28). At the same time, the relay 28–C12 is prevented from operating by the shunting ground applied through the now closed make contact 28–27–AG1–2 and the now closed break contact 28–C12–9. When the transmitter auxiliary contact 22–23–TRANS–AUX–1 opens upon the completion of the third character, the release of the relay 27–AG1 causes the relay 28–C12 to operate and the relay 28–C11 to release. The operate path for the relay 28–C12 is from ground (FIG. 27) through the closed make contact 27–14–SRX–10, line C′, the closed make contact 28–B12–12, and the winding of the relay 28–C12 to a source of negative potential (FIG. 28). The relay 28–C11 is released by the opening of the make contact 28–27–AG1–3. As a consequence, at the end of the reading of the third character a space signal is stored in the third position, (relays 28–B13 and 28–C13 released), a mark signal is stored in the second position (relays 28–B12 and 28–C12 operated) and a space signal is stored in the first position (relays 28–B11 and 28–C11 released).

The same process takes place in all five levels. The signals are shifted along in this manner under the control of the transmitter auxiliary contact 22–23–TRANS–AUX–1 until the first character supplied to the shift register is in the eighth position and the eighth character is in the first position. When the ninth character is received by the shift register, the first character is supplied from the eighth position to the sending unit reperforator magnets 4–LPR–1, 2, 3, 4 and 5 as will be more fully explained subsequently. As has been noted hereinbefore, this circuit provides a means of storing a mnemonic code consisting of seven characters and a "SPACE" or seven characters and a "CR."

*(5) Removal of blanks from the shift register*

At the beginning of the mnemonic code address processing, the shift register contains blanks (all spacing signals) in all levels and in all positions. In order to prevent transmission of these blanks to the sending unit reperforator, the reperforator clutch magnet 4–CM is released by opening its control lead at the time that a receive unit begins transmission of a mnemonic code to the shift register. This is accomplished by the operation of the relay 12–EOS which opens the break contact 4–12–EOS–5 thereby breaking the connection between ground and the winding of the clutch release magnet 4–CM. At the time the receive unit is connected to a shift register, the control of the receive unit transmitter is transferred to the shift register and the mnemonic code enters the register as described in detail above. Since the send unit reperforator clutch magnet 4–CM is released, none of the blanks which are being shifted out of the eighth stage of the shift register are perforated in the tape at the send unit reperforator. It is necessary to recognize when all of these blanks have been removed from the shift register in order to permit reconnecting the send unit reperforator for receipt of subsequent transmission from the shift register. In order to accomplish this, the contacts of the relays 28–C18, C28, C38, C48 and C58 are arranged so that a signal received in any of the five levels of the eighth position in the shift register operates a relay in the receive unit to restore the send unit reperforator control.

Assume that a mark is received in the eighth position of the first level of the shift register thereby causing operation of the relay 28–C18. When this relay operates the make contacts 31–28–C18–4 is closed thereby completing a path from ground (FIG. 31), through the contact 31–28–C18–4, the previously closed make contact 31–14–SR1–20, the now closed break contact 31–SRF–6 and the winding of the relay 31–SRF to the source of negative battery (FIG. 31). As a consequence the relay 31–SRF is energized and locks through its own now closed make contacts 31–6–EMTA1–9 to ground. When the relay 31–SRF is operated, it closes the make contact 4–31–SRF–8 which then completes a path from ground through the contact 4–31–SRF–8, the make contact 4–22–DAC1–1, the now closed make contact 4–16–CON–4, the stepping switch 4–17–CONN1–ARC–11, the now closed make contact 4–17–TC1–11, the winding of the reperforator clutch magnet 4–CM to a source of positive potential (FIG. 4). The operation of the relay 22–DAC1 by the opening and closing of the transmitter auxiliary contact 22–23–TRANS–AUX–1, controls the opening and closing of the make contact 4–22–DAC–1, thus placing the clutch magnet 4–CM of the send unit reperforator under control of the transmitter auxiliary contact for subsequent removal of the characters stored in the shift register.

Assuming that the mnemonic code stored in the shift register does not contain the designator code character "U–A–SPACE," it is transmitted forward through the eighth position to the send unit reperforator magnets 4–LPR1 through 4–LPR5 without further action. The path for the transmission of these characters from the shift register is from ground (FIG. 32) through the now closed break contacts 32–35–TX–5, 7, 9, 11 and 12 through the now closed make contacts 32–28–C18–12 to 32–C58–12 of any of the relays 28–C18 to C58 which are operated representing a mark stored in the particular level with which they are associated; and leads a′, b′, c′, d′, and e′; the now closed make contacts 4–14–SR1, 3, 4, 5, 6, 7 and 8; the closed break contacts 4–29–TXT–6, 7, 8, 9 and 10 to the leads a, b, c, d and e and over the previously described path to the punch magnets 4–LPR1 through 4–LPR5. Each character is shifted out of the shift register and supplied to the send unit reperforator in this manner.

If the mnemonic code supplied to the shift register contains the system designator code "U–A–SPACE" or "U-A-CR," the decoder relays in the receive unit cause the designator code to be recognized for control purposes more fully explained hereinafter.

The designator code "U-A-SPACE" or "U-A-CR" also is recognized in the third, second and first positions, respectively, of the shift register and indicates that a mnemonic code is stored in the register requiring the addition of an appropriate DDD telephone number proceding the mnemonic address on the outgoing tape. It is the function of the translator to provide this information. To allow this operation to take place, it is necessary to stop the transmitter in the receive unit to hold the mnemonic code in the shift storage until this translation has been completed. In order to stop the 200 w.p.m. transmitter when the designator code character reaches the 3, 2 and 1 positions of the shift register storage, it is necessary to anticipate the stop since the transmitter cannot be stopped in the same cycle that the character is sensed in the shift register. This act of anticipation is done in the receive unit by the locking of the relay 12-CST in that circuit to the relay 34-DLS in the shift register.

The purpose of the 12-CST relay is to open the transmitter path as soon as the third character in the system designator code is sensed by the transmitter. This is accomplished by opening the break contact 23-12-CST-1 in the energization circuit for the transmitter clutch magnet 23-TCM. The transmitter then continues to rotate one cycle (180 degrees) and the designator code "U-A-SPACE/CR" is stored in the shift register.

The relays 4-RD1, 4-RD2 and 4-RD3 are operated and relays 4-RD4 and 4-RD5 are released upon receipt of the character "U." When the relays 4-RD1, 4-RD2 and 4-RD3 operate, the relays 9-TA3 and 10-TA7 are operated which together with the released relay 4-RD5 prepare a path for the character 1 (CH1) reading branch from ground through the make contact 11-22-DAC-2, the now closed break contacts 11-4-RD5-5 and 11-29-TXT-4, the now closed make contacts 11-9-TA3-6 and 11-10-TA8-3. When the transmitter auxiliary contact 22-23-TRANS-AUX-1 closes, the relay 22-DAC is closed over a previously described path thereby closing the contact 11-22-DAC-2. This completes the path from ground to the lead CH1 thereby causing operation of the relay 12-CT1 over a path from the lead CH1 through the closed break contact 12-CT1-6 and the winding of the relay 12-CT1 to a source of negative battery (FIG. 12). The relay 12-CT1 locks to ground through its own now closed make contact 12-CT1-6, the now closed break contact 12-CT2-5 and the now closed break contact 12-EMTR-3. It also opens the lead SP inhibit path to the relay 12-EMTR by opening the break contacts 12-CT1-7. This is to assure that the system designator code "U-A-SPACE" will be in the proper sequence.

Recognition of the character "A" of the designator code in the receive unit is accomplished in much the same manner as recognition of the character "U." Ground applied to the lead CH2 from the decoder circuit of FIG. 11 operates the relay 12-CT2 since a path is completed from the grounded lead CH2 through the now closed make contact 12-CT1-2, the now closed break contact 12-CT2-6 and the winding of the relay 12-CT2 to source of negative battery (FIG. 12). The operation of the relay 12-CT2 causes it to lock to ground through its now closed make contact 12-CT2-6 and the closed break contacts 12-CST-5 and 12-EMTR-3. The operation of the relay 12-CT2 also connects the leads CR and SP from the decoded circuit together by closing the make contact 12-CT2-4. This is done to provide an operating path for the relay 12-CST in the event that the designator code read in the decoding circuit is "U-A-CR" instead of "U-A-SPACE" since both types of designator codes may be used by the air lines supplying messages to this system.

The inhibit path on lead CH1 to the relay 12-EMTR, is opened by the operation of the relay 12-CT2 opening the break contact 12-CT2-7. Operation of the relay 12-CT2 also transfers the lock path of the relay 12-CT1 to the lead CH2 by opening the break contact 12-CT2-5 and closing the make contact 12-CT2-5. Upon release of the relay 22-DAC due to the opening of the transmitter auxiliary contact 22-23-TRANS-AUX-1, the make contact 11-22-DAC-2 is opened and the relay 12-CT1 is released.

The reading of the characters "SPACE" or "CR" in the designator code is accomplished in much the same manner as that of the other two characters of the code. This causes ground to be applied to the leads CR or SPACE to operate the relay 12-CST through the now closed break contact 12-CT1-7 and the now closed make contact 12-CT2-2. The relay 12-CST locks to ground through its own now closed make contact 12-CST-6 and the now closed make contact 12-CT2-12. An additional locking path for the relay 12-CST is provided through its own now closed make contact 12-CST-6 and the now closed break contact 12-34-DLS-7 in the shift register which is connected to the receive unit through the now closed make contact 12-14-SR1-14.

Although the operation of the relay 12-CST opens or releases the transmitter clutch magnet 23-TCM by opening the break contact 23-12-CST-1, the transmitter clutch magnet does not remain deenergized unless the relay 34-DLS in the shift register is operated thereby opening the break contact 23-34-DLS-5. If a "SPACE" or "CR" does not follow the designator code characters "U-A," the relay 34-DLS does not operate and the transmitter clutch magnet 23-TCM is reclosed upon the release of the relay 12-CST; and the operation continues by allowing further characters to be fed into the shift register with the characters shifted out of the eighth position of the shift register being supplied to the punch magnets 4-LPR1 through 5.

The operation of the relay 12-CST transfers the lock path of the relay 12-CT2 to the lead SP or CR by closing the make contact 12-CST-5 and opening the break contact 12-CST-5. Upon release of the relay 22-DAC due to the opening of the transmitter auxiliary contact 22-23-TRANS-AUX-1, the contact 11-22-DAC-2 is opened and the relay 12-CT2 is released.

The release of the relay 12-CT2 opens the make contact 12-CT2-12 thereby placing the lock circuit for the relay 12-CST under the exclusive control of the relay 34-DLS by means of the break contacts 12-34-DLS-7. It should be noted that the relay 34-DLS operates only when the designator code "U-A-SPACE" or "U-A-CR" are in the 3, 2, 1 positions, respectively, of the shift register storage.

When the character "U" is in the third position of the shift register, the relays 23-C13, C23 and C33 are operated thereby indicating a mark stored in each of the levels with which these relays are associated. At the same time the relays C43 and C53 are in their released or spacing condition. If an "A" is stored in the second position of the shift register, the relays 28-C12, and C22 are operated or in the marking condition and the relays C3? C42 and C52 are released or in their spacing condition. If a "SPACE" is stored in the first position of the shift register the relays 23-C11, C21, C41 and C51 are released or in their spacing condition and the relay C31 is operated indicating a mark stored in the third level of the first position.

Since the designator code "U-A-SPACE" is only used in the message format at the end of a mnemonic code, the detection of this sequence in the receive unit also coincides with the detection of the sequence in the first three positions of the shift register. When the designator code is detected in these positions of the shift register, a path is established from ground (FIG. 34) through the now closed break contacts 34-28-C11-1, 34-C21-1, 34-C41-1, 34-C51-1, the now closed make contact 34-C31-1, the now closed make contacts 34-28-C12-1 and 34–C22–1; the now closed break contacts 34–C32–1, 34–C42–1 and 34–C52–1; the now closed make contacts 34–28–C13–1, 34–C23–1, and 34–C33–1; the now closed break contacts 34–C43–1 and 34–C53–1; the now closed break contact 34–DDC–6; and the winding of the relay 34–DLS to a source of negative battery (FIG. 34) to operate the relay 34–DLS. Operation of the relay 34–DLS opens the break contact 12–34–DLS–7 to effect the release of the relay 12–CST. At the same time the break contact 23–34–DLS–5 is opened transferring control of the transmitter clutch magnet 23–TCM to the shift register circuit.

The transmitter clutch magnet remains deenergized even though the break contact 23–12–CST–1 is now closed since the energization path is held open by the opened contact 23–34–DLS–5. As stated previously, it is necessary to stop the transmitter in order to hold the mnemonic code in the shift storage until the translation of the mnemonic code has been completed. This is accomplished by holding the relay 34–DLS energized during this period of time. Deenergization of the relay 34–DLS will cause reenergization of the transmitter clutch magnet 23–TCM thereby causing the transmitter to resume reading the tape stored in the receive unit. This operation will be more fully described subsequently.

Figure 34:
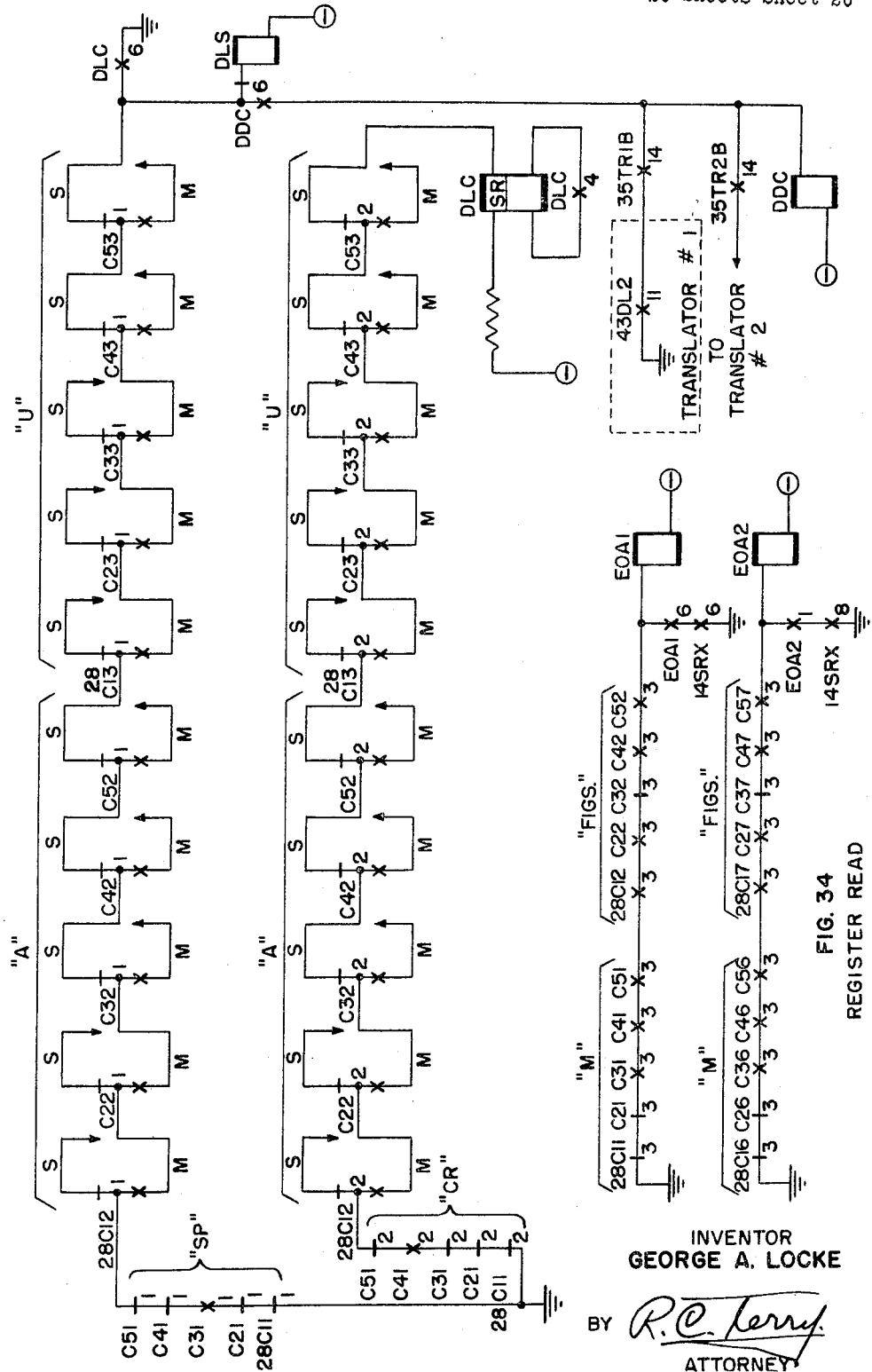

If the character "CR" follows the characters "U–A" and is stored in the first position of the shift register instead of the character "SPACE," a path for the operation of the slow release relay 34–DLC is completed from ground (FIG. 34) through the now closed break contacts 34–28–C11–2, 34–C21–2, 34–C31–2, 34–C51–2; the now closed make contact 34–41–2; and a decoding tree for the characters "U–A" which uses the No. 2 contacts of the same relay in an identical circuit to that described above for decoding "U–A" in the operate path for the relay 34–DLS; and the winding of the relay 34–DLC to a source of negative potential (FIG. 34). The operation of the relay DLC closes the make contact 34–DLC–6 to provide an operating path from ground (FIG. 34) through that contact, the now closed break contact 34–DDC–6, and the winding of the relay 34–DLS to a source of negative potential (FIG. 34) to operate the relay 34–DLS. For the proper operation of the line switching equipment in the send unit, the "CR" character stored in the first position of the shift register must be changed to "SPACE." In order to accomplish this change, the mark stored in the fourth level must be changed to space and the space stored in the third level must be changed to mark. In the third level the change from mark to space is accomplished by using the "Z" wiring shown in FIG. 28. The closing of the make contact 28–34–DLC–2 by the operation of the relay 34–DLC provides a path from ground (FIG. 28) through that contact and the winding of the relay B31 to a source of negative battery (FIG. 28) to cause operation of the relay B31. The relay B31 then closes the make contact B31–12 completing a path from ground (FIG. 27), through the make contact 27–14–SRX–10, the line C′, the contact B31–12 and the winding of the relay C31 to a source of negative potential (FIG. 28) to cause operation of the relay C31 thereby indicating a mark stored in the third level. It is to be noted that the circuit for the relays B31 and C31 and their respective contacts is identical in all respects to the circuit for the like relay B11 and C11 shown in FIG. 28.

In the fourth level the "Y" wiring option is used which establishes an operating path for the relay B41 from ground (FIG. 27) through the make contact 27–14–SRX–10, line C′, the normally closed break contact 28–34–DLC–8, the closed break contact A41–3, the closed make contact B41–14 through the winding of the relay B41 to a source of negative potential (FIG. 28). This is the holding path for the relay B41 once it has been set to mark by the normal input signal to that stage of the shift register. As stated previously operation of a B relay also causes operation of the C relay in the same position of the same level of the shift register in which these relays appear. However, in this fourth level the opening of the break contact 28–34–DLC–8 opens the afore-mentioned holding path for the relay B41 which in turn opens the contact B41–12 causing the release of the relay C41 thereby causing a SPACE to be stored in the first position of the fourth level of the shift register.

The above-mentioned changes now cause the normal holding path of the relay 34–DLS to be established as previously described in detail when the designator code "U–A–SPACE" is stored in the first three positions of the shift register. The relay 34–DLC is released following this transition in the shift register; and since the relay 34–DLC is a slow release relay, the make contact 45–DLC–6 remains closed long enough to provide a holding path for the relay 34–DLS during the time required for this transition in the shift register to take place.

(6) *Connection to a translator*

If a translator is idle, closure of the make contact 35–45–DLS–6 by the operation of the relay 34–DLS completes a path from ground (FIG. 37) through the now closed break contact 37–DE–8, line 132, the now closed make contact 35–34–DLS–6, the now closed break contacts 35–34–DDC–5 and 35–TX–4, the interrupt contact 35–TR INT–1, and the winding of the relay 35–BR to a source of negative potential (FIG. 35) to cause operation of the relay 35–BR. At the same time, the operation of the relay 34–DLS closes the make contact 35–34–DLS–8 thereby completing a path from ARC–4 of the stepping switch 35–TR through that contact and the now closed break contact 35–34–DDC–7 to a cold cathode tube 35–TDX.

Figure 35:
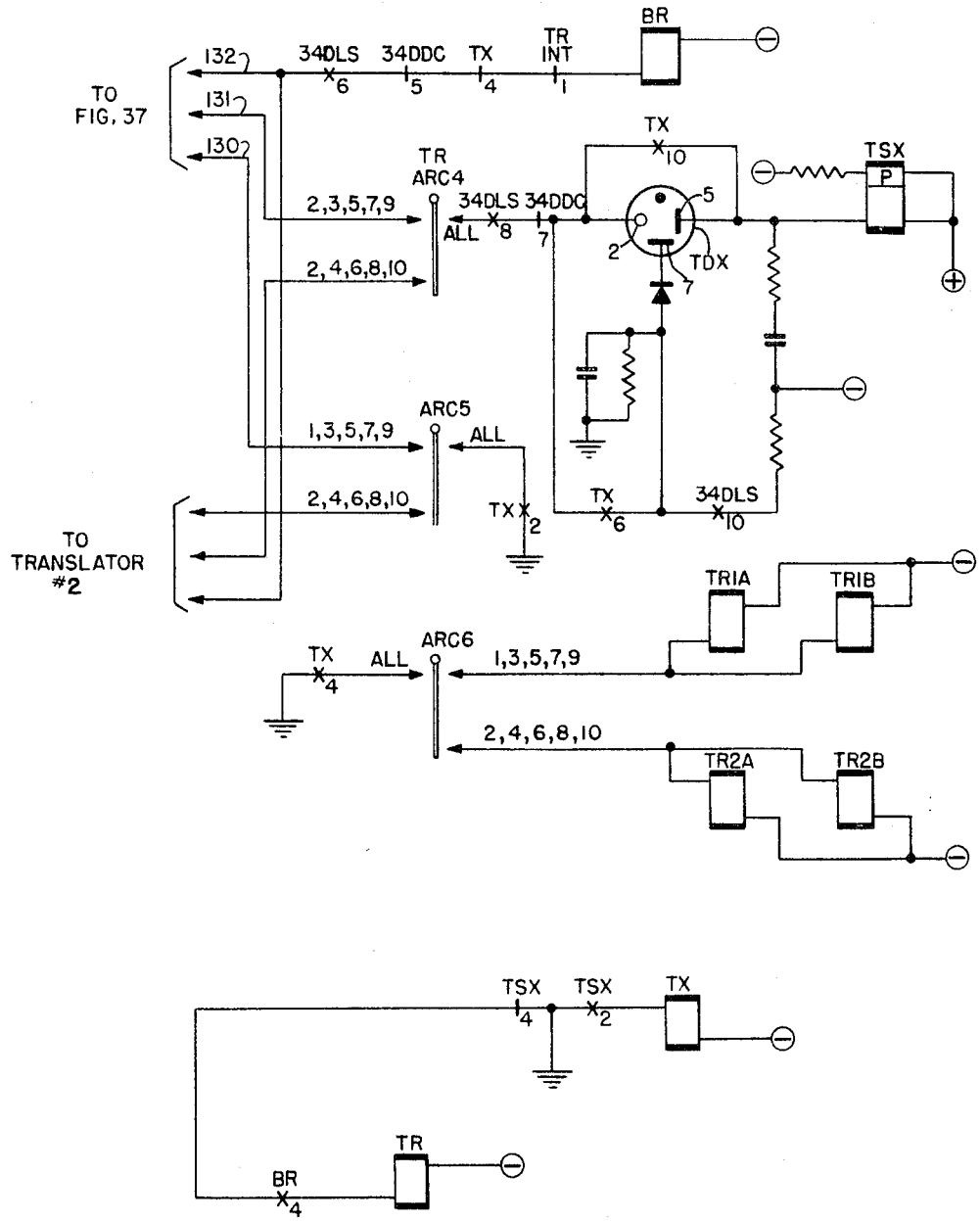
Figure 36:
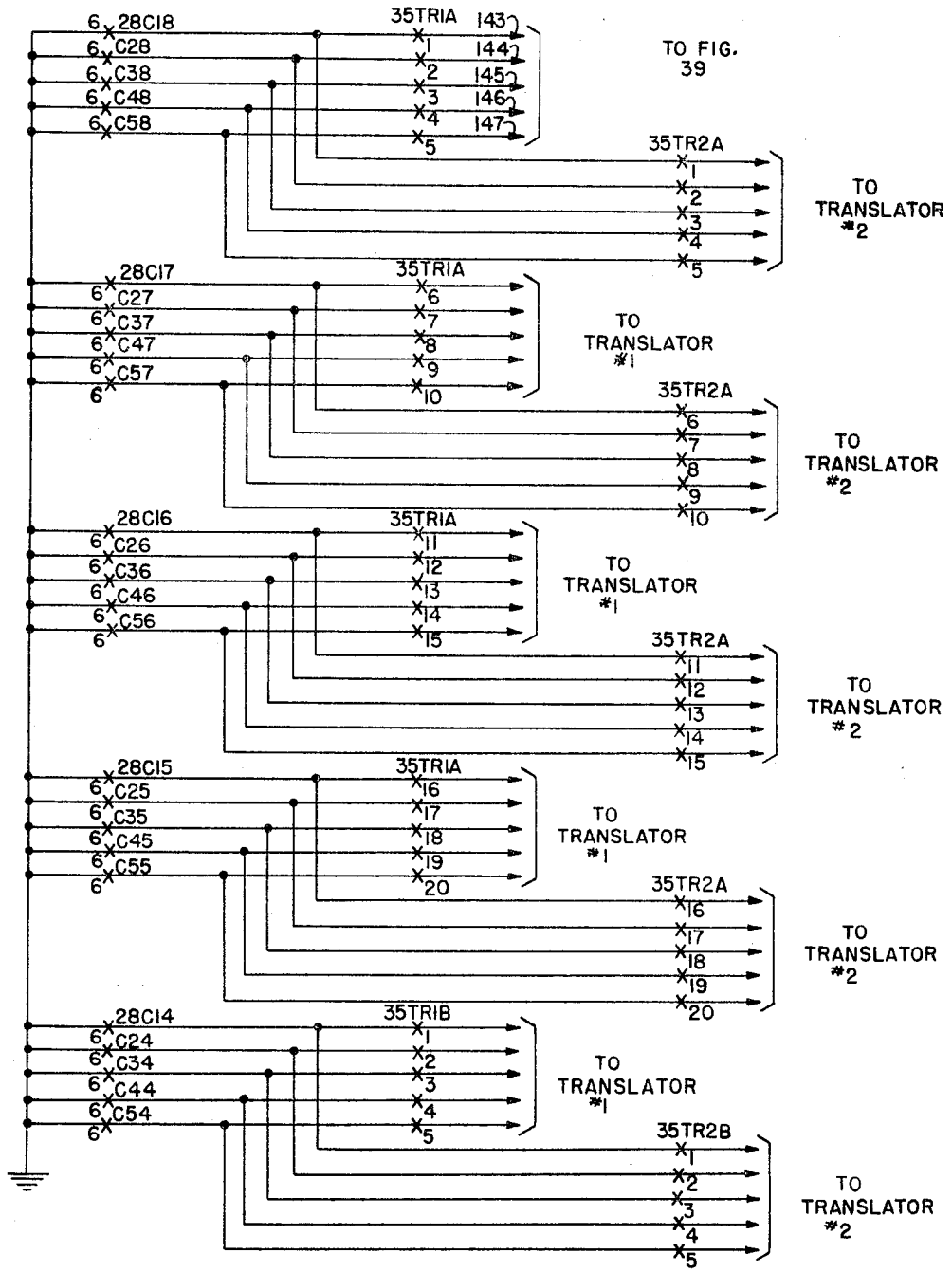
Figure 37:
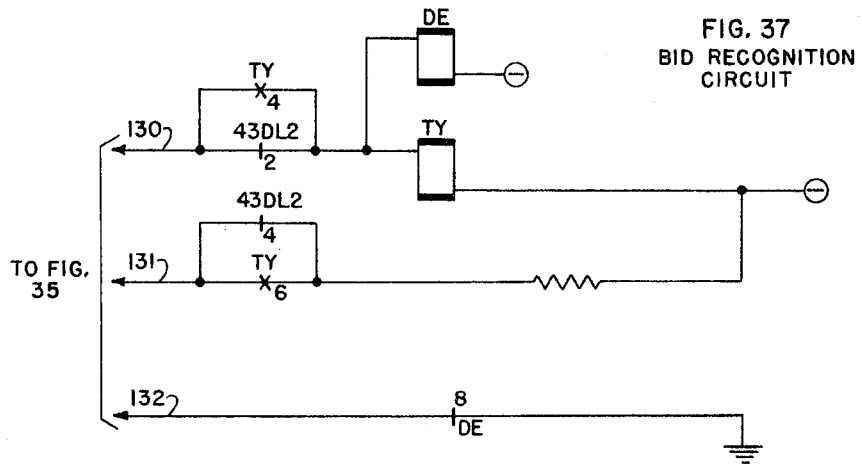
Figure 39:
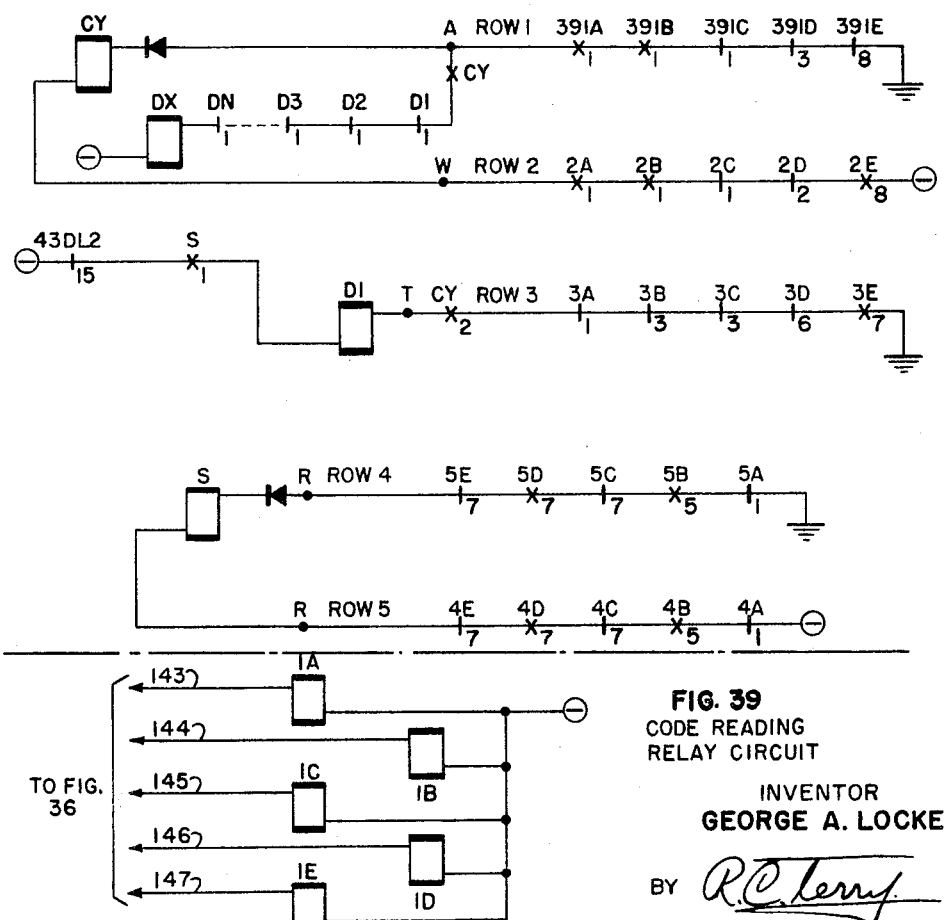

The operation of the relay 35–BR closes the make contact 35–BR–4 thereby completing an operating path for the stepping switch relay 35–TR from ground (FIG. 35) through the now closed break contacts 35–TSX–4, the closed make contacts 35–BR–4, and the windings of the relay 35–TR to a source of negative potential (FIG. 35). The stepping switch 35–TR is then advanced step-by-step following the operation of the relay 35–TR which, when it operates, causes the interrupter contacts 35–TR INT–1 to open thereby releasing the relay 35–BR to open the contact 35–BR–4 which in turn releases the stepping switch relay magnet 35–TR causing the contacts 35–TR INT–1 to be reclosed and the sequence to be repeated. The stepping switch will continue to step in this manner until ARC–4 is connected to a lead 131 having a negative D.C. potential applied to it from one of the translators.

In a preferred embodiment of the invention two translator circuits are provided, and in the illustration used in describing the invention, only the translator circuit for translator No. 1 is shown in detail. It is to be understood that an identical circuit is also used for translator No. 2. If translator No. 1 is idle, a negative potential (FIG. 38) is applied through the now closed break contact 38–43–DL2–4 to lead 131; and when the stepping switch 35–TR–ARC–4 is in its 1, 3, 5, 7 or 9 positions, this negative potential is applied through the now closed make contact 35–34–DLS–8 and the now closed break contact 35–34–DDC–7 to the cold cathode tube 35–TDX to cause operation of that tube. When the tube 35–TDX operates, it conducts current which reduces the available potential on the lead 131 by increasing the voltage drop across the resistance in the translator circuit thereby making this particular translator appear busy to any other shift register attempting to make a connection thereto. The operation of the tube 35–TDX also provides an operating circuit for the relay 35–TSX.

When relay 35–TSX operates, it opens the break contact 35–TSX–4 thereby releasing the stepping switch magnet 35–TR causing the stepping switch to stop stepping, and it closes the make contact 35–TSX–2 completing a path from ground through the winding of the relay 35–TX to a source of negative potential thereby causing the relay 35–TX to operate. Operation of the relay 35–TX closes the make contact 35–TX–6 which is connected across terminals 2 to 7 of the cold cathode tube 35–TDX thereby short circuiting those terminals and extinguishing the starter gap of the tube to prolong its life. The contact 35–TX–10 connected across the 2 and 5 terminals of the tube 35–TDX is closed by the operation of the relay 35–TX thereby shorting those terminals and placing a positive potential on lead 131 to prevent other registers from connecting to this translator. The contact 35–TX–2 also is closed by the operation of the relay 35–TX thereby completing a path from ground through that contact; the stepping switch 35–TR–ARC–5, positions 1, 3, 5, 7 or 9; lead 130; the now closed break contacts 37–43–DL2–2; and the windings of the relays 37–TY and 37–DE to a source of negative potential (FIG. 37) to operate the relays 37–TY and 37–DE in the translator. A connection is also established from ground (FIG. 35) through the now closed make contact 35–TX–4; the stepper switch 35–TR–ARC–6, positions 1, 3, 5, 7 or 9; the windings of the relays 35–TR1A and 35–TR1B to a source of negative potential (FIG. 35) to operate the relays 35–TR1A and 35–TR1B. These relays 35–TR1A and 35–TR1B are connecting relays for connecting the translator No. 1 to the shift register.

When the connection to the translator is made by the operation of the relay 35–TX, the transmission leads from the eighth position of the shift register to the punch magnets 4–LPR–1 through 4–LPR–5 are opened by opening the break contacts 32–35–TX–5, 7, 9, 11 and 12. The five characters of the mnemonic code stored in the last five positions of the shift register then are read by the code reading circuit in the translator when the relays 35–TR1A and 35–TR1B are operated. When a C relay in any one of the levels of any position of the shift register is operated, its No. 6 make contact (FIG. 36) is closed. A path is then established from ground (FIG. 36) through this No. 6 make contact of an operated C relay, one of the closed make contacts 36–35–TR1A–1 to 20 or 36–35–TR1B–1 to 5, and the winding of the code reading relay associated with the level and position of the shift register containing the operated C relay to a source of negative potential to operate that translator code reading relay. In order to simplify the drawings, the code reading relays for only the eighth position of the shift register have been shown since an identical circuit is provided for each of the last five positions of the shift register. The relays 39–1A, 39–1B, 39–1C, 39–1D, and 39–1E are the code reading relays in translator No. 1 for the character stored in the eighth position of the shift register. These relays are connected to the shift register through the leads 143 to 147 and the now closed make contacts 36–35–TR1A–1 to 5, respectively, to the make contacts 36–28–C18–6, 36–C28–6, 36–C38–6, 36–C48–6 and 36–C58–6 in the shift register.

The five characters supplied from the shift register to the translator by means of these code reading relays signify the city and service in the mnemonic code formed. The operation of these code reading relays for each of the five positions of the shift register allows the translator to determine the stored mnemonic code, and the corresponding DDD telephone number is generated and supplied to the punch magnets in the send unit. Each of the five different code reading relay circuits such as that shown in FIG. 39 has associated therewith a code reading fan circuit for determining the particular character read by the code reading relay circuit. Only the code reading fan circuit associated with the relays 39–1A to 39–1E is shown in FIG. 40.

Each code reading fan circuit has as many different outputs as there are possible characters to be decoded. Thus, there are twenty-six outputs corresponding to the twenty-six letters of the alphabet. Each of the different possible permutations of operated and unoperated C relays in each position of the shift register provides a different path through the fan circuit associated with each position. This can best be understood by using a specific example as an illustration. If the letter "A" is stored in the eighth position of the shift register the relays 28–C18 and C28 are operated and the relays C38, C48 and C58 are released. Thus a path is completed from ground (FIG. 36) through the now closed make contacts 36–28–C18–6 and 36–C28–6, the now closed make contacts 36–35–TR1A–1 and 36–35–TR1A–2, leads 143 and 144, the windings of the relay 39–1A and 39–1B to a source of negative battery (FIG. 39) thereby operating the relays 39–1A and 39–1B. At the same time the relays 39–1C, 39–1D and 39–1E are in their released condition.

The operation of the relays 39–1A and 39–1B then completes a path from ground through the now closed break contact 41–43–DL2–10; the now closed make contact 41–37–DE–10, the now closed make contacts 41–39–1A–1 and 41–39–1B–1; and the now closed break contacts 41–39–1C–1, 41–39–1E–8, and 41–39–1D–3, to the "A" terminal thereby presenting ground on the "A" terminal of the code reading fan circuit for the first row (eighth position of the shift register) as shown in FIG. 40. The "A" terminal is the only terminal in this code reading fan circuit which has ground applied to it for the permutation of the relays 39–A to 39–1E just described for decoding the letter "A." Four other rows of fan circuits corresponding to the 4, 5, 6 and 7 positions of the shift register are provided with similar code reading relays 2A to 5A through 2E to 5E for decoding the respective characters of the mnemonic code stored in those positions of the shift register. All of the fan circuits are identical to the one shown in FIG. 40 with the exception that the fan circuits for the eighth, sixth and fourth positions of the shift register use the "X" wiring option shown in FIG. 40, and the fan circuits associated with the seventh and fifth positions use the "Y" wiring option shown in FIG. 40. The reason for these two different wiring options will become apparent from the description hereinafter given for a specific example utilized to illustrate the principle of the operation of the fan circuits.

(7) *City and service code recognition*

In each translator one city relay "CY" is assigned for each different city code to be recognized in the translator. Each city code is determined by the first three letters of the mnemonic code which are stored in the eighth, seventh and sixth positions of the shift register, respectively. The fan circuit row No. 1 is utilized to decode the first city code character stored in the eighth position, the fan circuit row No. 2 is utilized to decode the second character of the city code stored in the seventh position of the shift register, and the fan circuit row No. 3 decodes the third character of the city code stored in the sixth position of the shift register.

Referring now to FIG. 38, assume that the first character of the city code which was decoded by the code reading fan circuit of FIG. 40 is the letter "A." Further assume that the second character of the city code stored in the shift register is a "W" and that the third character is a "T." The first two characters "A" and "W" read by the code reading relay circuit, relays 39–1A to 39–1E for the "A" and similar relays associated with the seventh level of the shift register for the "W," cause a path to be completed from ground through now closed break contacts 38–39–1C–1, 38–39–1D–3, 38–39–1E–8; the now closed make contacts 38–39–1A–1 and 38–39–1B–1; the winding of a city relay 38–CY; the now closed make contacts 38–2A–1, 38–2B–1 and 38–2E–8; and the now closed break contacts 38–2C–1, and 38–2D–2; to a source of negative potential which is obtained from the fan reading circuit of the second row which uses the "Y" wiring option. Thus the city relay 38–CY is operated closing the make contact 38–CY–2. Recognition of a "T" in the sixth position of the shift register (row No. 3 of the fan circuit) then completes a path from ground through the now closed break contacts 38–3A–1, 38–3B–3, 38–3C–6, and the now closed make contacts 38–3E–7 and 38–CY–2 to one side of the winding of the telephone number dialing relay 38–D1.

The next two characters of the mnemonic code signify the particular service which is desired at the city which was designated by the first three characters of the mnemonic code. These next two characters stored in the shift register positions 4 and 5, are read by decoding circuits similar to that shown in FIG. 39 to operate through code reading fan circuits similar to that shown in FIG. 40 to thereby provide an operating path for a specific service relay "S" to be operated in conjunction with the city relay CY previously described. Assume for the purposes of this illustration that the service desired is represented by the characters "R," "R." The first "R" is decoded by a group of code reading relays 4A through 4E and the second "R" is decoded by a group of code reading relays 5A through 5E. These relays operate contacts in code reading fan circuits row No. 4 and row No. 5 to provide an operate path for the service relay 38–S. This path extends from a source of negative potential (using the "Y" wiring option shown in FIG. 40 for row No. 5) through the now closed break contacts 38–4A–1, 38–4C–7 and 38–4E–7; the now closed make contacts 38–4B–5 and 38–4D–7; the winding of the relay 38–S; the now closed break contacts 38–5A–1, 38–5C–7 and 38–5E–7; to ground and the now closed make contacts 38–5B–5 and 38–5D–7 (obtained by using the "X" wiring option in the code reading fan circuit row No. 5). The permutations of the contacts operated by the 4A through 4E and 5A through 5E contacts to decode the character "R" are readily apparent from examination of the similar contacts 1A to 1E in the fan circuit for row No. 1 shown in FIG. 40. The service relay 38–S is then operated thereby closing the make contact 38–S–1 completing the path from ground through the winding of the relay 38–D1 to a source of negative battery through the now closed break contact 38–43–DL–2–15.

A different D relay such as the relay 38–D1 is energized for each different DDD telephone number which the translator is capable of generating. Thus a large number of different city and service relays may be connected to the five rows of the code reading fan circuits for decoding all of the different possible combinations which are used in the communication system of which this message switching and preparation center is a part. The particular sample shown is in no way to be construed as limiting the invention since a large number of different mnemonic code combinations can be used to operate different city relays "CY," different service relays "S" and other different associated dialing relays "D."

In some instances it may be desirable to assign some services to an individual DDD telephone number and have one common number for all remaining services directed to that same city. Since each assigned DDD number must be generated by operation of a particular D relay such as the D relay 38–D1; it follows that the common DDD number must also be generated by a particular D relay. For the particular city selected by the relay 38–CY there is a common dialing relay 38–DX which is associated with that city. The common relay 38–DX is operated by the operation of the city relay 38–CY alone, provided no other D relay associated with that city code is operated. Thus, an operating path for the relay 38–DX is provided from ground through the code reading fan circuit of FIG. 40 on a path previously described, the now closed make contact 38–CY–1 and the now closed break contacts 38–D1–1 to 38–D$_n$–1, the winding of the relay 38–DX to a source of negative potential. If any one of the D relays associated with the city relay 38–CX is operated, one of the No. 1 break contacts of the afore-mentioned D relays will be opened thereby preventing energization of the relay 38–DX.

(8) *Translator identification*

Figure 42:
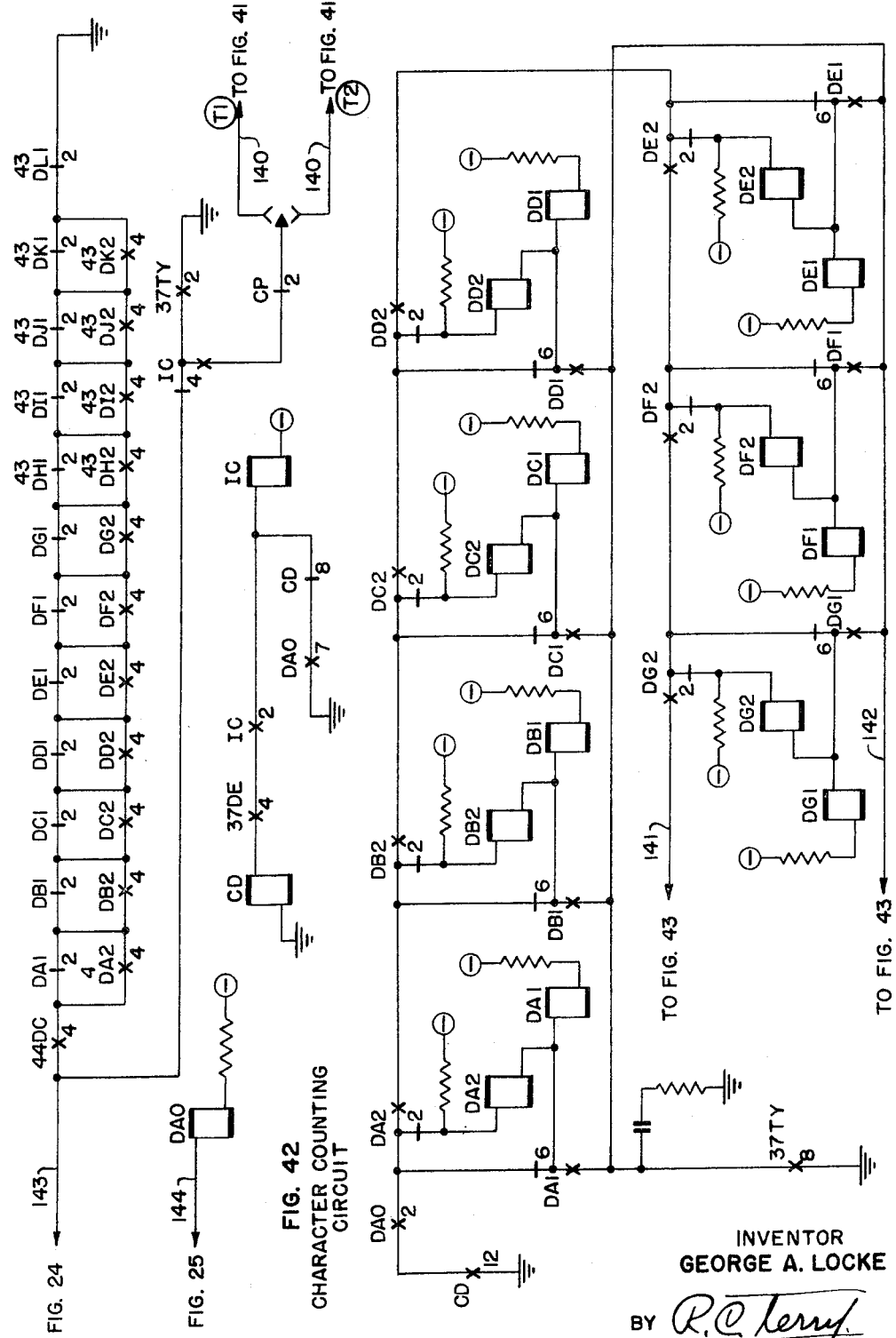

Once a translation order is set up by the operation of the appropriate city relay "CY" and service relay "S" the number generation cycle cannot start until the translator identification character is sent to the send unit reperforator magnets. The operation of the relay 37–TY (the first relay operated in the translator) closes the make contact 42–37–TY–2 thereby completing a path from ground (FIG. 42) through that contact, the now closed break contact 42–IC–4, line 143, the now closed make contacts 24–35–TR1B–13 and 24–14–SR1–7, the winding of the distributor clutch magnet 24–DCM to a source of negative potential (FIG. 24). This path causes energization of the distributor clutch magnet 24–DCM which starts the distributor of the receive unit transmitter. The operation of the distributor in the receive unit transmitter in turn, through the operation of the distributor contacts 2, 3 and 4 (FIG. 22) completes a path from ground (FIG. 22) through those distributor contacts, the now closed make contact 22–26–LTC–2 of the relay 26–LTC (which was operated when the operation of the relay 34–DLS closed the contact 26–34–DLS–16), the make contact 22–21–TLP–2 (operated in synchronism with the distributor auxiliary contact 21–24–DIST–AUX–1 in a manner described hereinafter), and the line "j" to the line "i"; from the line "i" over a path previously described through the winding of the clutch magnet 4–CM to a source of positive potential (FIG. 4). The distributor auxiliary make contact 21–24–DIST–AUX–1 of the distributor closes in the start interval and opens in the stop interval of each character generated by the translator. When the distributor auxiliary contact is open, the relay 21–TLP is released thereby opening the make contact 22–21–TLP–2 to deenergize the send unit reperforator clutch magnet 4–CM during each stop interval. When the distributor auxiliary contact 21–24–DIST–AUX–1 is closed, the relays 21–TLP and 42–DA0 are operated through a path established from ground (FIG. 21), contact 21–24–DIST–AUX–1, the winding of the relay 21–TLP, the now closed make contact 21–14–SR1A–5, line 124, the now closed make contact 25–35–TR1B–12, line 144, and the winding of the relay 42–DA0 to a source of negative potential (FIG. 42). It is obvious that these relays 21–TLP and 42–DA0 are operated when the distributor auxiliary contact 21–24–DIST–AUX–1 closes and that they are released when this contact opens.

The first operation of the relay 42–DA0 causes operation of the identification character relay 42–IC by completing a path from ground through the now closed make contact 42–DA0–7, the now closed break contact 42–CD–8, and the winding of the relay 42–IC to a source of negative potential. The operation of the relay 42–IC opens the break contact 42–IC–4 thereby opening the operate circuit for the distributor clutch magnet 24–DCM limiting the distributor to one operation for the identification character supplied from the translator.

During the one rotation interval just described, a path is established from ground (FIG. 42) through the now closed make contacts 42–37–TY–2 and 42–IC–4, the now closed break contact 42–CD–2, line 140 to the "LTRS" diode card in the DDD number generator of the translator. The connection between the break contact 42–CD–2 and line 140 is left open for translator No. 1 and is connected or completed for translator No. 2. If this connection is left open, no signals are supplied from the translator to the selector magnets 4–LPR–1 through 4–LPR–7 and the send unit reperforator records or punches a "BLANK."

On translator No. 2 the T2 strap connects this ground potential to the "LTRS" diode card and the reperforator punches the "LTRS" character in the tape at the send unit. The path for this "LTRS" character is from ground in FIG. 42 over the previously described path to line 140, then through the five diodes in FIG. 41 connected in parallel to the lead 140 to the respective leads 133 through 137 which are connected respectively to the leads a' through e'. These leads are connected through the now closed break contacts 4–29–TXT–6 through 10 to the respective leads a through e over a path previously described to energize the selector magnets 4–LPR1 through 4–LPR5 of the send unit reperforator.

From the foregoing it may be seen that every bid for a translator causes the identification character of the particular translator selected to be punched on the tape by the reperforator at the outgoing send unit. Thus, translator No. 1 is marked with a "BLANK" and translator No. 2 is marked with a "LTRS" character. Then, in the event that trouble occurs, the translator which was used in processing the message may be readily identified by the character recorded on the tape in the send unit.

(9) *Character counting circuit*

The operation of the relay 41–IC prepares the counting relay 42–CD to operate when the distributor auxiliary contact 21–24–DIST–AUX–1 opens and releases the relay 42–DA0. When this occurs at the end of the identification character, a path is provided from ground through the winding of the relay 42–CD, the now closed make contacts 42–37–DE–4 and 42–IC–2, the winding of the relay 42–IC to a source of negative potential. During the time that the relay 52–DA0 was operated, ground was applied to both sides of the winding of the relay 42–C preventing it from operating.

The direct distance dialing number is normally set up in the number generator circuit of the translator prior to the completion of the identification character marking interval. However, this number cannot be delivered until the counting relay 42–CD operates at the end of the identification character. Also it is necessary to start the character counting circuit in order to deliver the DDD number in the proper sequence. The character counting circuit therefore must be considered next in the description of the operation of the translator circuit. It should be noted that the character counting circuit follows the operation of the distributor auxiliary contact 21–24–DIST–AUX–1 and coordinates the DDD number information with the rotation of the reperforator in the send unit. It should be remembered at this time that the distributor auxiliary contact drives the reperforator in the send unit as well as the counting circuit to be described.

Operation of the make relay 42–CD closes the make contact 44–42–CD–1 so that the operation of any D relay may now operated the relay 44–DC. Assume that the relay 38–D1 has been operated as previously described. Then a path is completed from ground through the now closed make contacts 44–38–D1–12 and 44–42–CD–1, the winding of the relay 44–DC, and the now closed break contacts 44–DL2–10 to a source of negative potential to operate the relay 44–DC.

When the relay 44–DC is operated, it starts the character counting circuit for the number generation cycle. The character counting circuit limits the number generation cycle to 12 characters as will be apparent from the following description. When the relay 44–DC is operated, it closes the make contact 42–44–DC–4 completing a path from ground through the now closed break contacts 42–43–DL1–2, 42–43–DK1–2, 42–43–DJ1–2, 42–43–DH1–2, 42–DG1–2, 42–DF1–2, 42–DE1–2, 42–DD1–2, 42–DC1–2, 42–DB1–2, 42–DA1–2, the now closed make contact 42–44–DC–4 and line 143 over a previously described path to the distributor clutch magnet 24–DCM. The distributor auxiliary contact 21–24–DIST–AUX–1 closes in the start interval and operates the relay 42–DA0 as previously described.

Operation of the relay 42–DA0 completes a path from ground through the now closed make contacts 42–CD–12 and 42–DA0–2, the now closed break contact 42–DA1–6, the winding of the relay 42–DA1 to a source of negative potential thereby operating the relay 42–DA1. Operation of the relay 42–DA1 opens the break contact 42–DA1–2 thereby disabling the distributor clutch magnet 24–DCM. The distributor auxiliary contacts open in the stop interval of this first character and release the relay 42–DA0 as previously described. When the relay 42–DA0 is released, a path is completed from ground through the now closed make contact 42–37–TY–8, the now closed make contact 42–DA1–6, the winding of the relay 42–DA2 to a source of negative potential thereby causing the operation of the relay 42–DA2, marking the end of the first character. The operation of the relay 42–DA2 closes the make contact 42–DA2–4 reclosing the lead to the distributor clutch magnet 24–DCM to start the second rotation. Relay 42–DA0 is again operated in the start interval of the second character and in turn causes the operation of the relay 42–DB1 over a path from ground through the now closed make contacts 42–CD–12, 42–DA0–2, and 42–DA2–2, the now closed break contact 42–DB1–6, and the winding of the relay 42–DB1 to a source of negative potential. When the relay DB1 operates, it opens the break contact 42–DB1–2 again opening the energizing lead for the distributor clutch magnet 24–DCM. In the stop interval of the second character the auxiliary contact 21–24–DIST–AUX–1 opens and releases the relay 42–DA0. The released relay 42–DA0 with the relays 42–DA1, 42–DA2, and 42–DB1 operated causes the relay 42–DB2 to operate the marking of the end of the second character.

The counting relays 42–DA1 through 42–DG1, 42–DA2 through 42–DG2, 43–DH1 to 43–DL1 and 43–DH2 to 43–DK2 continue to mark the beginning and end of each character in the manner outlined above so that the relay 43–DL1 operates at the beginning of the twelfth character. At the end of this twelfth character, however, the relay 43–DL2 operates in the same manner as before, but it does not reclose the energizing lead to the distributor clutch magnet 24–DCM. The distributor is therefore limited to twelve operations. The operation of the relay 43–DL2 indicates that the twelfth and last character has been counted and causes the release of the translator as will be discussed later.

(10) *The ten digit DDD number generator*

The ten digit DDD number refers to the ten digits of dialing which must be supplied to the telephone company for routing the connection from the send unit to the desired station. For causing shifting of the teletypewriter machine involved, however, the ten digits comprising the DDD number must be preceded by a "FIGS" character combination and followed by a "LTRS" character combination. Thus a total of twelve characters must be generated for each DDD number.

The DDD numbers associated with each D relay such as 38–D1 are set up in diode cards each of which is wired with a different number corresponding to the particular D relay with which it is associated. These cards are divided into sections comprised of seven diodes for each each of the ten DDD numbers and five diodes for the "FIGS" character and the "LTRS" character. The cathodes of the five diodes for supplying the "FIGS" character to the send unit reperforator are connected in common to the lead "FIGS" shown in FIG. 41. The anodes of these diodes are connected to the leads 133, 134, 136 137 and 138. The cathodes of the "LTRS" diodes are connected in common to the lead "LTRS" of FIG. 41, and the anodes are connected to the respective leads 133, 134, 135, 136 and 137. Each of the ten numbers of the DDD number to be generated is determined by the use of from two to seven diodes, the cathodes of which are connected in common to the particular number lead N1 to N10 (FIG. 41) with which they are associated. The anodes of two of the diodes associated with each of the leads N1 to N10 always are connected to the leads 138 and 139. Permutative connections of the remaining five diodes associated with each of the ten leads N1 to N10 then are made from the leads N1 to N10 to respective ones of the leads 133 to 137. For example, the first diode may be connected from the lead N1 to the lead 133 with the remaining four diodes being unconnected, or the second and third diodes may be connected between lead N1 and the leads 134 and 135 with the remaining three diodes being unconnected, and so forth. Since these connections may be varied depending upon the particular number to be generated, the diodes used in forming the permutative combinations are shown in FIG. 41 with the connections between the diodes and the respective leads N1 to N10 and 133 through 137 merely indicated by broken lines terminated in arrows on each side of each of the diodes.

As stated previously a different diode card is associated with each D relay and each DDD number which may be generated by the circuit. Only one of these diode cards is shown in FIG. 41 and this card is connected through the leads N1 to N10 to the make contacts 44–38–D1–1 to 10 of the dialing relay 38–D1. Assume that the relay 38–D1 has been operated by receipt of the city and service code previously described. This is the only D relay which is operated for this particular city and service code, so that only the make contacts 44–38–D1–1 to 10 are closed to the diode card shown in FIG. 41. All of the other diode cards associated with all of the other D relays have similar make contacts which are open at the time that these contacts are closed.

Figure 4C:
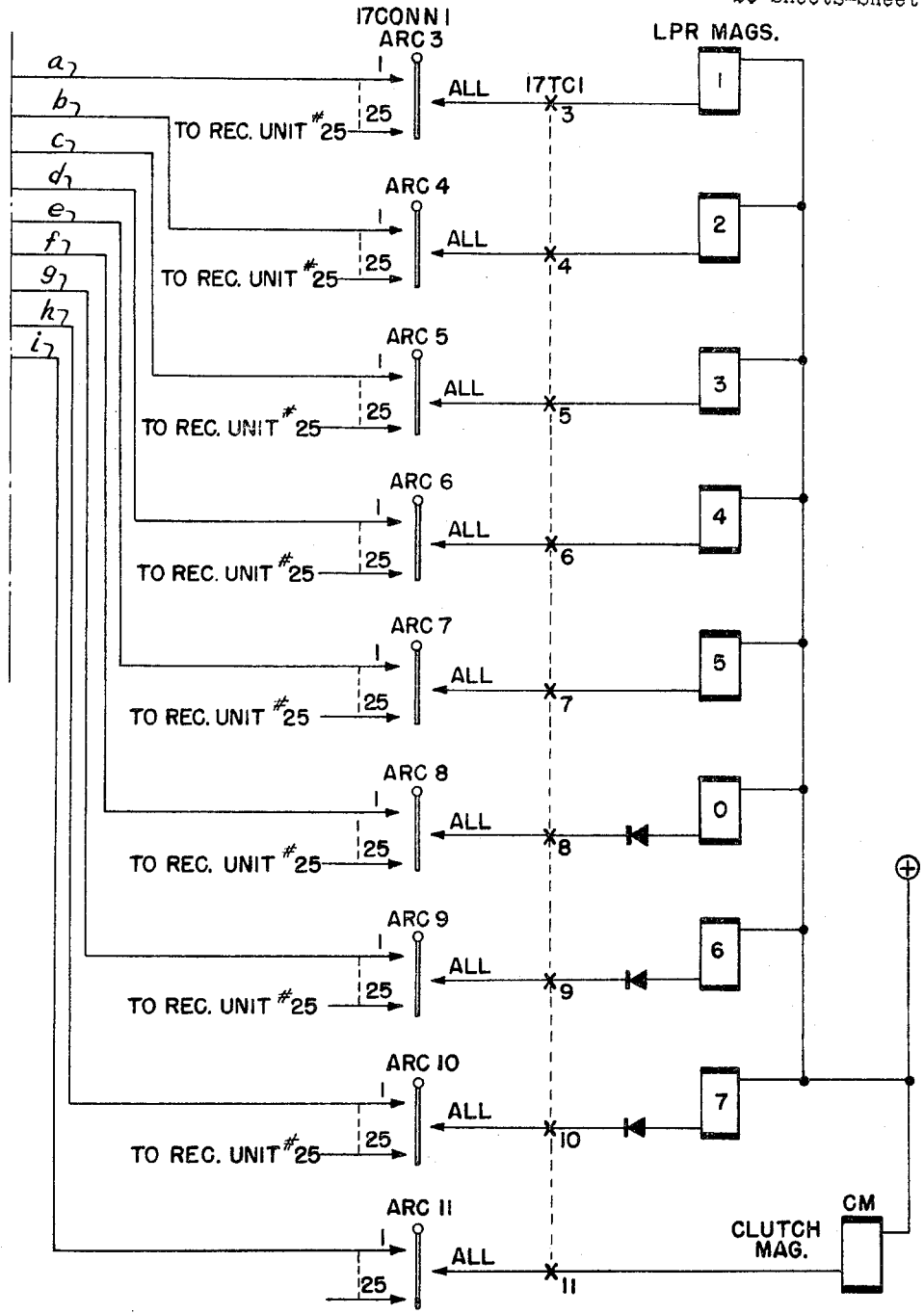

Referring now to the description of the counting circuit previously explained in detail; when the relay 42–CD operates to mark the beginning of the first character, a path is established from ground (FIG. 44) through the now closed break contact 44–42–DA2–10 and the now closed make contact 44–42-CD–10 to apply ground on the figure lead to the cathodes of the diodes connected to the "FIGS" leads. The anodes of these diodes are connected to the leads 133, 134, 136, 137, 138. A path then is established from ground (FIG. 44) through these diodes, leads 133, 134, 136, 137, 138, the now closed make contacts 32–35–TR1B–6, 7, 9, 10, 11, to leads a', b', d', e', f'; then over a path previously described and through the punch selector magnets 4–LPR1, 4–LPR2, 4–LPR4, 4–LPR5 and 4–LPR0 to a source of positive potential (FIG. 4C). Thus the "FIGS" character with a control perforation in the "0" level is perforated in the tape at the start of the DDD number generation. At the end of the first character the relay 42–DA2 operates and opens the break contact 44–42–DA2–10 thereby opening the circuit to the "FIGS" diode assembly. The operation of the relay 42-DA2 at the end of the first character in the counting circuit then provides a path from ground (FIG. 44) through the now closed make contact 44–42–DA2–10, the now closed break contact 44–42–DB2–10 and the now closed make contact 44–38–D1–1 to apply ground on the lead N1 to the diode assembly connected to the lead N1. This ground then is applied to the leads f' and h' and permutative ones of the leads a' to e' and causes energization, over previously described paths, of the punch selector magnets 4–LPR0 and 4–LPR7 and energization of permutative ones of the selector magnets 4–LPR1 through 4–LPR5 which represent the first digit of the ten digit DDD number. At the end of this first digit (second character) the relay 42-DB2 is operated thereby opening the break contact 44–42–DB2–10 removing ground from the lead N1 and closing the make contact 44–42–DB2–10 thereby establishing a path from ground through the now closed make contacts 44–42–DA2–10 and 44–42–DB2–10, the now closed break contact 44–42–DC2–10 and the now closed make contact 44–38–D1–2 to the N2 lead. The second digit of the DDD number then is perforated at the send unit reperforator.

The above process continues rapidly so that ground is applied successively to the leads N1 to N10 for ten successive operations of the character counting circuit previously described. This process is the same regardless of which of the D relays is operated. At the end of the tenth digit (eleventh character in the counting circuit), the relay 43–DK2 is operated. On the next character (the twelfth character) ground is established through the now closed No. 10 make contacts of the relays 42–DA2 through 42–DG2 and 43–DH2 through 43–DK2 to apply ground to the lead "LTRS" and the "LTRS" diode assembly which then causes the "LTRS" character to be perforated in the tape at the send unit. At the start of this "LTRS" character, the relay 43–DL1 operates and opens the break contact 42–43–DL1–2 as previously described thereby opening the lead to the distributor clutch magnet 24–DCM so that no further operations can take place. It should be noted that the diode assemblies are connected so that for all ten digits of the DDD number which are generated, additional control levels "0" and "7" are punched. A "0" control level is punched with the "FIGS" character and no control levels are punched with the "LTRS" character.

(11) *Release of the translator*

When the translator has completed the transmission of the DDD number and the final "LTRS" character, the relay 43–DL2 is operated as the end of the "LTRS" character as previously discussed. When the relay 43–DL2 is operated a path is completed from ground (FIG. 34) through the now closed make contacts 34–43–DL2–11 and 34–35–TR1B–14, and the winding of the relay 34–DDC to a source of negative potential thereby causing operaiton of the relay 34–DDC. The relay 34–DDC closes its make contact 34–DDC–6 and locks up to the operating circuit of the relay 34–DLS and remains operated until the shift storage, in moving forward, removes this operating circuit at which time the relay 34–DDC released. At the time that the relay 34–DDC locks operated through the operating circuit for the relay 34–DLS, the break contact 34–DDC–6 is opened and the relay 34–DLS is released.

Operation of the relay 34–DDC also opens the break contacts 35–34–DDC–5 and 35–34–DDC–7 to effect the release of the relay 35–BR and to extinguish the cold cathode tube 35–TDX. The release of the relay 34–DLS opens the make contacts 35–34–DLS–6 and 35–34–DLS–8 to hold open the energizing paths to the relay 35–BR and the cold cathode tube 35–TDX.

When the cold cathode tube 35–TDX ceases to conduct, the relay 35–TSX is released and, in releasing, opens the make contact 35–TSX–2 to effect the release of the relay 35–TX. Release of the relay 35–TX opens the make contacts 35–TX–2 and 35–TX–4 to break the circuit connections between the translator and the shift register. Opening of the contact 35–TX–4 releases the releases the relays 35–TR1–A and 35–TR1–B to complete the disconnection of the translator from the shift register. The break contacts 32–35–TX–5, 7, 9, 11 and 12 are reclosed to allow the information stored in the shift register to be supplied to the send unit.

Release of the relay 34–DLS recloses the break contact 23–34–DLS–5 which then completes the path from ground (FIG. 23) through the previously described circuit in FIG. 23 to operate the transmitter clutch magnet 23–TCM. The resumption of the operation of the transmitter clutch magnet 23–TCM allows the further reading of characters into the shift register storage from the receive unit and in doing so shifts the mnemonic code presently in storage out of storage from the eighth position of the shift register to the send unit reperforator over circuit paths previously described. In this manner the stored mnemonic code is sent to the send unit reperforator following the DDD telephone number with which it is associated. At the same time, the next mnemonic code is supplied to the shift register and if it ends in the designator code "U–A–SPACE" or "U–A–CR," it is treated in the manner as explained in the preceding paragraphs concerning the operation of the system following the receipt of such a designator code. This operation continues until an end-of-address code is read.

(12) *Operation of the receive unit when the designator code "U–A–CR" is received*

When the mnemonic code "U–A–CR" is received in the shift register, the relay 34–DLC in the shift register operates momentarily to effect the change of the character "CR" to the character "SPACE" in the shift register as has been previously described. Frequently in preparing the tape for transmission in the system with which this switching and message preparation center is used it may be necessary to have a large number of mnemonic addresses which extend beyond a single line of page copy, and therefore it is necessary that one or more of the mnemonic codes end with the designation "U–A–CR." Because of the change from "CR" to "SPACE" in the shift register, it is necessary to reinsert this "CR" character into the message supplied to the send unit in order that the copy received at the distant station will be the same as that transmitted from the originating station. During the momentary operation of the relay 34–DLC, a path from ground (FIG. 21) is completed through the now closed make contact 21–34–DLC–5, the now closed make contact 21–14–SR1A–1, the now closed break contact 21–W–6, the winding of the relay 21–W to a source of negative potential (FIG. 21) to effect operation of the relay 21–W. The relay 21–Z is prevented from operation during the energization of the relay 21–W by ground potential applied to both ends of its winding through the now closed break contacts 21–W–6 and 21–Z–9.

When the relay "W" operates its locks to ground through the now closed make contact 21–W–6 and completes a path from ground through the winding of the relay 21–Z, the now closed break contact 21–Z–9, the now closed make contact 21–W–2, the now closed break contact 21–26–LTC–4, and the distributor auxiliary make contact 21–24–DIST–AUX–1 to ground. As long as the distributor auxiliary contact is closed the relay "Z" is prevented from operation by the shunting ground applied to its lower winding. When the distributor auxiliary make contact 21–24–DIST–AUX–1 opens, the relay "Z" operates by the path completed from ground through the now closed make contact 21–W–6, the winding of the relay 21–Z to a source of negative potential (FIG. 21). The operation of the relay 21–Z further opens the operating path for the transmitter clutch magnet 23–TCM by opening the break contact 23–21–Z–10.

Upon release of the relay 34–DLS in the shift register at the end of the transmission of the DDD number of the send unit reperforator, a path is completed from ground (FIG. 12B) through the now closed break contact 12–34–DLS–7, the now closed make contact 12–14–SR1–14, line 117, the now closed make contacts 24–21–Z–12 and 24–21–W–12, the winding of the distributor clutch magnet 24–DCM to a source of negative potential (FIG. 24) to operate the distributor clutch magnet 24–DCM. Operation of the distributor clutch magnet causes pulsing of the relays 22–DAC and 22–DAC1 from the distributor contacts 2, 3, and 4 shown in FIG. 22. The path for operation of the relays 22–DAC and 22–DAC1 is then from ground (FIG. 22) through the distributor make contacts 2, 3 and 4, the now closed break contact 23–26–LTC–2 (of the relay 26–LTC which was released by the opening of the make contact 26–34–DLS–16), the now closed make contact 22–21–Z–11, the windings of the relays to a source of negative potential (FIG. 22).

The leads from the transmitter sensing contacts 1 through 5 (FIG. 4) are opened by the operation of the relay 21–Z which opens the break contacts 4–21–Z–1, 2, 3, 4 and 5 thereby preventing operation of the code reading relays 4–RD1 to 4–RD5 by the transmitter reading contacts in the receive unit. At the same time the lead 122 and the lead to the code sensing relay 4–RD4 are connected to ground through the now closed make contact 4–21–Z–4.

When the shift register relay 34–DLS releases, the distributor clutch magnet 24–DCM is operated through the contacts of the operated relays 21–W and 21–Z as previously explained. This operation in turn closes the distributor auxiliary contact 21–24–DIST–AUX–1 which causes the release of the relay 21–W by applying ground potential to the upper end of its winding thereby shunting the relay. When the relay 21–W is released, the operate path for the distributor clutch magnet 24–DCM is opened by the opening of the make contact 24–21–W–12. This limits the operation of the distributor to one character under the control of the relays 21–W and 21–Z.

The relays 25–DA and 25–DA1 in the shift register circuit are pulsed through the 2, 3, and 4 distributor make contacts of FIG. 22, the now open break contact 22–26–LTC–2, the now closed make contact 22–21–Z–11, the now closed make contact 22–14–SR1 and line 126. The operation of the relays 25–DA and 25–DA1 then causes the code set up in the code reading relays 25–R1 to 25–R5 and 25–R1A to 25–R5A to be read into the shift register in position No. 1. Thus the character "CR" is read into the register due to the operation of the relay 21–Z which applied ground to the lead 122 (FIG. 4) leaving the leads 119, 120, 121 and 123 opened. When the distributor auxiliary contact opens at the end of this character, the relay 21–Z is released since the operate path which was established from ground through the distributor auxiliary contact, the now closed break contact 21–26–LTC–4, the now closed make contact 21–Z–6 and the now closed break contact 21–W–6 to the winding of the relay 21–Z is broken. Release of the relay 21–Z returns the circuit to normal to begin the service of the next menmonic code in the manner discussed above under Section 4 entitled "Sending the Nenmonic Code to the Shift Register."

(13) *Deletion and storage of "LTRS" characters in the Shift Register*

As stated previously in the discussion of the sample tapes shown in FIGS. 2 and 3, the operator may use the "LTRS" character to erase errors during the preparation of the original message tape. Since it is essential that the mnemonic code characters appear in the shift register in proper sequence, the "LTRS" character is prevented from entering the register by an arrangement of the relays in that circuit as previously described.

With the "LTRS" character deleted in the shift register, it is essential that the sending unit reperforator be prevented from pulsing during the sensing and reading of the "LTRS" character in the receive unit transmitter. When the "LTRS" character is sensed, with the shift register connected, the relay 4–LRD is operated. The operate path for this relay is from ground (FIG. 4) through the fifth transmitter reading make contact, the normally closed break contact 4–21–Z–5, the now closed make contact 4–14–SR1A–7, the now closed break contacts 4–10–TA8–6 and 4–9–TA4–10, the windings of the relays 4–LRD and 4–LRA to a source of positive potential. When the relay 4–LRD is operated, it opens the break contact 22–4–LRD–3 to thereby prevent operation of the relays 22–DAC and 22–DAC1 by the transmitter auxiliary contact 22–23–TRANS–AUX–1 thus preventing operation of the send unit reperforator clutch magnet during the time that the "LTRS" character is being deleted from the message by the operation of the shift register circuit.

Although it is usually desirable to delete the "LTRS" character in the shift register, it is frequently the practice to start the message with the start-of-message code "CR, LF" followed by some channel identifying characters which may include one or more numbers. Because the shift register does not recognize the "LTRS" character all characters following the first "FIGS" character would be supplied to the send unit in upper case. The first occasion for the shift to lower case would then be when the translator inserts the "LTRS" character following the DDD number. In most situations the channel identifying codes are followed by the sequence "CR, LF, LTRS." In order to permit the majority of the mnemonic codes to be printed at the distant receiving page printer in lower case, the "LTRS" character following a "CR, LF" combination is permitted to enter the shift register.

With the operation of the relay 12–EOS at the end of the generation of the start-of-message code the signals on the lead LF are transferred to the relay 12–LF over a path extending from the lead LF through the make contact 12–CR–8, the now closed make contact 12–EOS–10, the now closed break contacts 12–LR–1 and 12–LF–6, and the winding of the relay 12–LF to a source of negative potential over line 111. When the "CR" character is read, the relay 12–CR is operated as previously described and the make contact 12–CR–8 is closed. If the next character is "LF" ground potential is applied to the lead LF and the relay 12–LF is operated through the path described above. When the relay 12–LF operates, it locks to ground through its now closed make contact 12–LF–6 and the now closed break contact 12–EMTR–3. At the time that the relay 12–LF locks to ground it completes an operating path for the relay 12–LR which extends from ground through the now closed break contact 12–EMTR–3, the now closed make contact 12–LF–6, line 112, and the winding of the relay 12–LR to a source of negative potential. If a character other than "LTRS" follows this sequence, the relay 12–EMTR is operated by the closure of the make contact 12–22–DAC–1 since it is not inhibited by a signal on its inhibit winding. The operation of the relay 12–EMTR opens the break contact 12–EMTR–3 thereby releasing the relays 12–LF and 12–LR. If the character following the "CR, LF" combination is "LTRS," ground is applied on the lead RL through the line 108, the now closed make contact 12–LR–3, and the now closed break contacts 12–CR–3 (the relay 12–CR having been released by the operation of the relay 12–LF) and 12–CT2–3 to the inhibit winding of the 12–EMTR thereby preventing that relay from operating.

It should be noted at this time that the operation of the relay 12–EOS opened the break contact 19–12–EOS–4 in the energizing path for the stepping switch relay 12–EMCL so that the stepping switch 19–EMCL is not energized by the code combination "CR, LF, LTRS" when it is received after the initial start-of-message combination. With the relays 4–LRA and 12LR operated at the same time, a path is completed across the now opened make contact 27–34–EOA1–10 on lines 128 and 129 through the now closed make contacts 31–14–SR1A–12, 31–4–LRA–1, 31–12–LR–12 and 31–14–SR1A–11 to place a short or shunt across the contact 27–34–EOA1–10. This permits the "LTRS" character to be recorded in the shift register. At the time that the ground pulse is applied to the lead LTR the relay 12–LF is shunted through the closed make contacts 12–LF–2 and 12–LR–9 and it releases. When the ground potential on the lead LTR is completed at the end of the character, the relay 12–LR also releases.

(14) *Recognition of end-of-address code "FIGS, M, LTRS"*

In the reading of the end-of-address code it is again necessary for the receive unit to anticipate the stopping of the receive unit transmitter in order that the shift register may contain only the proper characters. The end-of-address code characters "FIGS, M" are read by the decoding relays 4–RD1 to 4–RD5, 9–TA1 to 9–TA4, and 10–TA5 to 10–TA8 in a manner similar to the decoding of other characters such as "CR, LF, LTRS" etc. previously described. When the "FIGS" character is read by the transmitter read contacts shown in FIG. 4, ground is applied to the lead FIG to operate the relay 12–TF through the closed break contact 12–TF–6. When the relay 12–TF operates, it locks to ground through its own now closed make contact 12–TF–6, the now closed break contacts 12–FH–8, 12–FM–8 and 12–EMTR–3. At the same time, the operation of the relay 12–TF opens the inhibit paths of the leads CH1 and N to the relay 12–EMTR by opening the break contacts 12–TF–2 and 12–TF–5. The make contacts 22–12–TF–3 also are closed by the relay 12–TF to prepare a path from the 2, 3 and 4 make contacts of the distributor (shown in FIG. 22) to operate the relays 22–DAC and 22–DAC1 when it is necessary to read the last character sensed under taut-tape conditions. The make contact 24–12–TF–4 also is closed to prepare a path to the distributor clutch magnet 24–DCM when it is necessary to read the last character sensed under taut-tape conditions.

If the next character read by the transmitter read contacts of FIG. 4 is the character "M," ground potential is applied from the previously described decoder circuits to the lead M through the now closed break contact 12–29–TX8–11, the now closed make contact 12–TF–11, the now closed break contact 12–FM–6, the winding of the relay 12–FM to a source of negative potential (FIG. 12) to operate the relay 12–FM. In operating, the relay 12–FM locks to ground through its now closed make contact 12–FM–6, the now closed make contact 12–14–SR1A–4 and the now closed break contact 12–34–EOA1–12. When the relay 12–FM operates, it opens the transmitter clutch magnet circuit by opening the break contact 23–12–FM–1 thereby causing the transmitter to stop on the proper character. At the same time, operation of the relay 12–FM transfers the lock path to ground of the relay 12–TF to the lead N by closing the making contact 12–FM–8 and opening the break contact 12–FM–8. When the ground pulse is removed from the lead M, the relay 12–TF releases. The break contacts 12–FM–12 is also opened by operation of the relay 12–FM in order to prevent false operation of the relay 12–TN and 12–TN1 from signals appearing on the lead N.

The reason for anticipating the end-of-address in order to stop the transmitter reading of the tape in the receive unit is so that the shift register may be cleared of the last stored mnemonic code prior to transmission of the message text from the receive unit to the send unit reperforator magnets. When the characters "FIGS-M" are read the character "FIG" is stored in the second position and the character "M" is stored in the first position of the register. With these characters stored in the first and second positions of the register, a path is established from ground (FIG. 34) through the now closed break contacts 34–28–C11–3 and 34–C21–3; the now closed make contacts 34–C31–3 and 34–C41–3, 34–C51–3, 34–28–C12–3 and 34–C22–3; the now closed break contact 34–C32–3; the now closed make contacts 34–C42–3 and 34–C52–3; and the winding of the end-of-address relay 34–EOA1 to a source of negative potential to operate the end-of-address relay 34–EOA1. This relay then locks to ground through its own now closed make contact 34–EOA1–6 and the now closed make contact 34–14–SRX–6.

Operation of the relay 34–EOA1 then opens the break contact 23–34–EOA1–9 to further open the operating circuit for the receiving unit transmitter clutch magnet 23–TCM. It also opens the break contact 12–34–EOA1–12 to indicate the end-of-address to the receive unit, and the opening of this contact releases the relay 12–FM. At the same time a path is completed from ground (FIG. 24) through the now closed make contact 24–14–SRX–11; the now closed break contacts 24–33–LC1–2, 24–33–LB1–2 and 24–33–LA1–2; the now closed make contacts 24–34–EOA1–8, and 24–14–SR1–17, and the winding of the distributor clutch magnet 24–DCM to a source of negative potential to permit operation of the distributor by energizing the distributor clutch magnet 24–DCM.

In order to insure that only "BLANKs" are allowed to enter the shift register, the marking lead B' to the shift register is opened by opening the break contacts 27–34–EOA1, 2, 3, 4 and 5 and by closing the make contacts 27–34–EOA1–1, 2, 3, 4 and 5. The closure of this latter set of contacts then provides an operating path for the first position A relays in each level of the shift register storage. The subsequent operation of the relay 24–DA in turn operates the relays 27–AG1 to 27–AG5 and 27–AG1A to 27–AG5A to apply ground to the lead A' of all the storage elements as had been previously described.

Normally the relay 25–DA is pulsed from the transmitter auxiliary contact 22–23–TRANS–AUX–1 on lead 126. During the period following the operation of the relay 34–EOA1 the transmitter clutch magnet has been deenergized and leaves the transmitter auxiliary contact 22–23–TRANS–AUX–1 open. At the same time, the make contact 25–34–EOA1–11 is closed by the operation of the relay 34–EOA1 to complete a path from ground through the 2, 3 and 4 distributor contacts of FIG. 22, the now closed break contact 22–26–LTC–2, the now closed make contact 22–14–SR1A–2, line 127, the now closed make contact 25–34–EOA1–11, and the windings of the relays 25–DA and 25–DA1 to a source of negative potential (FIG. 25) to cause the DA relay to be pulsed from the distributor 2, 3 and 4 contacts of FIG. 22. Thus with the relay 34–EOA1 operated and the distributor operating, "BLANKs" are fed into storage, shifting out any part of a mnemonic code stored in the shift register from the eighth level. This mnemonic code is supplied to the send unit reperforator magnets 4–LPR1 through 4–LPR5 over a path previously described. At the same time, the end-of-address code "FIGS–M" is advanced from the shift register.

When the characters "FIGS–M" reach the seventh and sixth positions of storage, respectively, a path is established from ground through the now closed break contacts 34–28–C16–3 and 34–C26–3; the now closed make contacts 34–C36–3, 34–C46–3, 34–C56–3, 34–28–C17–3, 34–C27–3; the now closed break contact 34–C37–3; the now closed make contacts 34–C47–3 and 34–C57–3; and the winding of the end-of-address relay 34–EOA2 to a source of negative potential to operate the relay 34–EOA2. Operation of the relay 34–EOA2 also establishes a path from ground through the now closed break contacts 32–33–LA2–2 and 4 and the now closed make contacts 32–34–EOA2–4 and 6 to the leads g' and h' which then cause energization of the reperforator punch magnets 4–LPR6 and 4–LPR7 in the send unit reperforator over paths previously described. Thus the No. 6 and No. 7 control perforations are perforated in the send unit tape along with the "LF" character then being sent from the eighth position of the shift register. Although it has not been previously mentioned, this "LF" character is included in the format of the incoming tape (refer to FIG. 2) and precedes the end-of-address code "FIGS, M."

In the subsequent discussion it must be remembered that each operation and release of the relay 25–DA causes the shift storage to advance the characters stored in the shift register one position. Following the operation of the relay 34–EOA2, the next operation of the relay 24–DA causes a path to be established from ground (FIG. 33) through the now closed make contacts 33–25–DA–2 and 33–34–EOA2–2, the now closed break contact 33–LA1–6, and the winding of the relay LA1 to a source of negative potential (FIG. 33). At the same time, the relay 33–LA2 is shunted which prevents it from operating. When relay 33–LA1 operates it locks to ground through its own now closed make contact 33–LA1–6 and the now closed make contact 33–34–EOA2–3. The distributor clutch magnet lead is opened by the operation of the relay 33–LA1 which opens the break contact 24–33–LA1–2.

The relay 25–DA is released at the end of the character by the rotation of the distributor cam as previously discussed and removes the shunt from the relay 33–LA2 since the make contact 33–25–DA–2 is opened therefore causing the relay 33–LA2 to be operated through a path extending from ground through the now closed make contacts 33–34–EOA2–3 and 33–LA1–6, and the winding of the relay 33–LA2 to a source of negative potential. The operation of the relay 33–LA2 then opens the break contacts 32–33–LA2–2 and 4 to remove the ground from the leads G' and H' thereby removing the ground from the punch magnets 4–LPR6 and 7. At the same time, the energizing lead for the distributor clutch magnet 24–DCM is reclosed by the closure of the make contact 24–33–LA2–6.

It is to be noted that the operation of the distributor is now under the control of the counting relays 33–LA1 through 33–LA2. In the discussion just concluded one count has been made and the end-of-address code is in the eighth and seventh positions of the shift register. The distributor contacts 2, 3 and 4 of FIG. 22 again operate the relay 25–DA which in turn operates the relay 33–LB1 through a path extending from ground, the now closed make contacts 33–25–DA–2, 33–34–EOA2–2 and 33–LA2–8; the now closed break contact 33–LB1–6; and the winding of the relay 33–LB1 to a source of negative potential. The relay 33–LB1 locks to ground through its own now closed make contact 33–LB1–6 and the now closed make contact 33–34–EOA2–3. The break contact 24–33–LB1–2 in the energizing lead for the distributor clutch magnet 24–DCM is opened thereby deenergizing the clutch magnet 24–DCM. When the relay 25–DA is released at the end of the character, the relay 33–LB2 is operated which again closes the lead to the distributor clutch magnet 24–DCM by closing the make contact 24–33–LB2–6. In a similar manner the distributor again operates the relay 25–DA which in turn operates the relay 33–LC1. The relay 33–LC1 locks to ground and opens the distributor clutch magnet lead to disable the clutch magnet 24–DCM. The subsequent release of the relay 24–DA removes the shunt from the counting relay 23–LC2 permitting its operation. At the same time the character "M" of the end-of-address code is shifted out of the shift register and is supplied to the send unit reperforator magnets 4–LPR1 through 4–LPR5.

When the last counting relay 33–LC2 is operated, it closes the make contact 32–33–LC2–12 which then establishes a path from ground (FIG. 32) through that contact, the now closed make contact 32–14–SRX–1, line 130, the now closed make contact 32–14–SR1–18 and the winding of the shift register release relay 30–TXA to a source of negative potential (FIG. 30) to operate the relay 30–TXA. At this point, the distributor is stopped, the third and last count has been made, the end-of-address characters "FIGS, M" have been transmitted to the send unit reperforator and the shift register storage contains only "BLANKs."

Operation of the relay 30–TXA causes the disconnecting relay 29–TXT to operate through a path established from ground through the now closed make contact 29–30–TXA–2 and the now closed break contact 29–12–FH–10, the winding of the relay 29–TXT to a source of negative potential. The relay 29–TXT then locks to ground through the now closed break contact 29–12–FH–10, its own now closed make contact 29–TXT–5 and the now closed break contact 29–6–EMTA1–11.

When the relay 29–TXT operates, the break contacts 14–29–TXT–1 and 14–29–TXT–2 are opened thereby releasing the relay 14–BY and interrupting the conduction path for the cold cathode tube 14–DT. When the cold cathode tube 14–DT ceases to conduct, the relay 14–TST is released. Release of the relay 14–TST opens the make contact 14–TST–3 thereby deenergizing the relay 14–TC. When the relay 14–TC is deenergized, the make contacts 14–TC–4 and 14–TC–6 are opened thereby effecting the release of the relays 14–SRX, 14–SR1 to SR4 and 14–SR1A to SR4A. The release of the relay 14–SRX causes the release of all other relays in the shift register and returns the register to its idle condition.

(15) Transmission of the message text to the send unit

The operation of the relay 30–TXA further opens the operate path for the transmitter clutch magnet 23–TCM by opening the break contact 23–30–TXA–6. At the same time the relay 8–CL is released by the opening of the break contact 8–30–TXA–4. During the period of time which occurs between the release of the relay 8–CL and the operation of the relay 29–TXT, the make contact 16–30–TXA–12 is closed to provide temporary closure of the path from the source of negative battery (FIG. 16) through that contact and the now closed break contact 16–6–EMTA1–4 to the stepping switch 16–17–CONN1–ARC1, position 1, to maintain the negative potential at position No. 1 of that stepping switch in order to avoid the possibility of releasing the send unit during this period. When the relay 29–TXT operates, the make contact 16–29–TXT–12 is closed to further close this lead to the send unit.

In addition to effecting the release of the shift register, the operation of the relay 29–TXT also opens the decoder leads LF, CR, N, CH1, CH2 and SP to prevent false relay operation while the circuit is in the text condition by opening the break contacts 11–29–TXT–3 and 4. The operating path to the send unit reperforator magnets 4–LPR1 through 4–LPR5 is transferred from the shift register directly to the transmitter reading contacts 1 through 5 of the receive unit No. 1 (FIG. 4) by opening the break contacts 4–29–TXT–6, 7, 8, 9 and 10 and by closing the make contacts 4–29–TXT–6, 7, 8, 9 and 10 which then connects the leads *a* through *e* directly from the transmitter reading contacts (FIG. 4A) to the stepping switch 4–17–CONN1–ARCs 3, 4, 5, 6 and 7, position No. 1.

The release of the relay 8–CL further opens the operate paths for the relay 14–BY and the relay 14–TST by opening the make contacts 14–8–CL–7 and 14–8–CL–8. At the time that the relay 14–SRX in the shift register releases (as has been previously described) the make contact 32–14–SRX–1 is opened thereby breaking the energization path for the relay 30–TXA causing that relay to release. Release of the relay 30–TXA recloses the operate path of the transmitter clutch magnet by closing the break contact 23–30–TXA–6 since the break contact 23–20–SRC–6 is now closed due to the release of the relay 20–SRC by the opening of the make contact 20–14–SR1–24 upon the release of the relay 14–SR1 in the shaft register. Transmission of the message text from the receive unit to the send unit reperforator begins. It should be noted that this text transmission begins with the "LTRS" character which is the last character of the end-of-address code and which was not utilized in recognizing the end-of-address in the shift register.

(16) Recognition of the end-of-address code

The decoding of the line switching end-of-address code "N, N, N, N," is accomplished in a manner similar to the decoding of other characters previously described. When an "N" is received ground is applied to the lead N from the decoder circuit during the period that the transmitter auxiliary contact 22–23–TRANS–AUX–1 is closed. Ground is applied to this lead completing an operate path for the relay 12–TN from ground through the now closed break contacts 12–FM–12 and 12–TN1–2, the winding of the relay 12–TN, and the now closed break contact 12–TN3–12 to a source of negative potential (FIG. 12). At the same time the relay 12–EMTR is inhibited through the path from the lead N, the now closed make contact 12–FM–12; the lead 103, the now closed make contacts 12–TF–5, 12–LR–3, 12–CR–3 and 12–CT2–3; the inhibit winding of the relay 12–EMTR to a source of negative potential (FIG. 12). This inhibiting of the relay 12–EMTR is repeated for each subsequent "N" received. The relay 12–TN1 is prevented from operating by the ground potential on the lead N until the transmitter auxiliary contact 22–23–TRANS–AUX–1 opens at the end of the character and the ground is removed. The relay 12–TN1 then operates through a path extending from a source of negative battery (FIG. 12) through the now closed break contact 12–TN3–12, the winding of the relay 12–TN, the now closed make contact 12–TN–6, the now closed break contact 12–TN2–8, the winding of the relay 12–TN1, and the now closed break contact 12–EMTR–3 to ground (FIG. 12). With both the relays 12–TN and 12–TN1 operated, a path is prepared to operate the relay 12–TN2 when the second "N" pulse applies ground to the lead N. The relay 12–TN–2 then is operated over a path from lead N through the now closed break contact 12–FM–12, the now closed make contacts 12–TN1–2 and 12–TN–2, the now closed break contact 12–TN2–6 and the winding of the relay 12–TN2 to a source of negative potential (FIG. 12). When the relay 12–TN2 operates, it transfers the hold path of the relay 12–TN1 directly to the source of negative potential by closing the make contact 12–TN2–8. At the same time the hold path of the relay 12–TN is transferred to the ground pulse on the lead N by opening the break contact 12–TN2–8 and closing the make contact 12–TN2–12. The relay 12–TN2 locks operated to ground through its own make contact 12–TN2–6, the now closed make contact 12–TN1–10, and the now closed break contact 12–EMTR–3.

Upon removal of the ground pulse from the lead N when the transmitter auxiliary contact opens at the end of the character, the relay 12–TN is released. The third "N" pulse again applies ground to the lead N which operates the relay 12–TN3 over a path from the lead N through the now closed break contact 12–FM–12, the now closed make contact 12–TN1–2, the now closed break contact 12–TN–2, the now closed make contact 12–TN2–5, line 100, the now closed break contact 12–TN3–6, and the winding of the relay 12–TN3 to a source of negative potential (FIG. 12). When the relay 12–TN3 operates it releases the relay 12–TN1 by opening the break contact 12–TN3–12. At the same time it locks the operate path for the relay 12–TN2 to the lead N ground pulse by closing the make contact 12–TN3–5. The relay 12–TN3 then locks to ground through its own now closed make contact 12–TN3–6 and the now closed break contacts 12–EMTA–6 and 12–EMTR–3.

When the relay 12–TN3 operates, a path is completed from ground (FIG. 24) through the now closed break contacts 24–23–TSA–4 and 24–12–EMTA–9, the now closed make contact 24–12–TN3–8, the winding of the distributor clutch magnet 24–DCM to a source of negative potential (FIG. 24) to operate the distributor clutch market 24–DCM. The energization of the distributor clutch magnet is necessary in order to prepare the system to supply the last character of the message to the send unit reperforator. Upon receive of the last character the tape available contact in FIG. 23 opens thereby disabling the transmitter clutch magnet which in turn causes the transmitter auxiliary contact 22–23–TRANS–AUX–1 to be opened, and it is possible that the last character may not be transmitted to the send unit reperforator since the relays 22–DAC and 22–DAC1 are disabled by the opening of the transmitter auxiliary contact. If this occurs before the last character is supplied to the send unit reperforator, the relay 23–TSA is released and a path is completed for energizing the relays 22–DAC and 22–DAC1 from ground (FIG. 22) the distributor auxiliary contacts 2, 3 and 4 of FIG. 22, the now closed break contact 22–26–LTC–2, the now closed make contact 22–12–TN3–3, the now closed break contact 22–23–TSA–6 and the windings of the relays 22–DAC and 22–DAC1 to a source of negative potential (FIG. 22) to cause the energization of these relays which then cause the last character to be perforated by the send unit reperforator magnets 4–LPR1 through 4–LPR5 in a manner previously described. When the third "N" of the end-of-message code is received control perforations are added in the 0 and 6 levels by the punch magnets 4–LPR0 and 4–LPR6, which are energized at the time the third "N" is supplied to the punch magnets 4–LPR1 through 4–LPR5. This is accomplished over a path extending from ground (FIG. 4) through the now closed break contact 4–12–EOS–5, the now closed make contacts 4–22–DAC1–2 and 4–26–DLSA–4, the now closed break contact 4–ZS–3, the now closed make contacts 4–9–TA2–7 and 4–10–TA8–11, the now closed break contact 4–12–TN–10 and the now closed make contacts 4–12–TN2–2 and 4–12–TN2–3 to the leads $f$ and $g$ and over previously described paths to the send unit punch magnets 4–LPR0 and 4–LPR6 to energize these magnets at the time the third "N" is received by the send unit reperforator. Upon removal of the ground from the lead N at the end of the third "N" pulse the relay 12–T–2 releases, further preparing an operate path for the relay 12–EMTA.

When the fourth "N" character is received a ground pulse is again applied to the lead N, thus extending ground from the lead N through the now closed break contacts 12–FM–12, 12–TN1–2, 12–TN–6 and 12–TN2–7; line 101; the now closed make contact 12–TN3–10; the now closed break contact 12–EMTA–5, the winding of the slow release relay 12–EMTA to a source of negative potential (FIG. 12) to operate the relay 12–EMTA. The relay 12–EMTA then locks to ground through its own now closed make contact 12–EMTA–12 and the now closed make contact 12–16–CON–2. The hold path for the relay 11–TN3 is transferred to the lead N by the operation of the relay 12–EMTA which closes the break contact 12–EMTA–6 and opens the make contact 12–EMTA–6. At the same time, the "last character" operating path for the distributor clutch magnet 24–DCM is opened by the opening of the break contact 24–12–EMTA–9 thereby causing the release of the distributor following the completion of this last "N" character.

When the relay 12–EMTA operates, it closes the make contact 6–12–EMTA–2 thereby completing a path from ground (FIG. 6) through that contact and the winding of the relay 6–EMTA1 to a source of negative potential (FIG. 6) to operate the relay 6–EMTA1. When the relay 6–EMTA1 operates, the break contact 16–6–EMTA1–2 is opened thereby releasing the connect relay 16–CON at the end of the fourth "N" character since the make contact 16–12–TN3–7 of the relay 12–TN3 is open at that time. At the same time, the break contact 16–6–EMTA1–4 is opened to open the operate path for the cold cathode tube 16–DX. This in turn releases the relay 16–TST1 which in turn effects the release of the relay 17–TC1 by opening the make contact 17–16–TST1–2. The bid lead to the sending unit is further opened by the opening of the break contact 15–6–EMTA1–7, and the operating path for the transmitter clutch magnet 23–TCM is opened by opening the break contact 23–6–EMTA1–8. The relay 12–EOS is released upon operation of the relay 6–EMTA1 which opens the break contact 12–6–EMTA1–10, and the relay 29–TXT is released when the break contact 29–6–EMTA–11 is opened by the operation of the relay 6–EMTA1.

From the foregoing it is seen that the operation of the relay 6–EMTA1 effects the disconnection of the send unit from the receive unit and releases the remainder of the relays in the receive unit to prepare the system for the receipt of another message. The message processing cycle is therefore completed.

In the event that the message was supplied to the system from a private line source and was terminated with the end-of-message code "FIGS–H," it is necessary for the system to insert the line switching end-of-message code "N, N, N, N," after the conventional "FIGS–H" end-of message code is received. The decoding of the characters "FIGS" and "H" is accomplished by the decoding relays RD and TA in a manner similar to that previously described for the decoding of other characters. When the "FIGS" character is received, ground potential is applied to the lead FIG in a manner similar to that previously described in conjunction with the receipt of the ends-of-address code of "FIGS–M." This ground potential then causes the operation of the relay 12–TF has has been previously described. When the next character "H" is received, ground potential is applied through the decoder circuit to the lead H and a path is extended from the lead H through the now closed make contact 12–TF–10, the now closed break contact 12–FH–6, and the winding of the relay 12–FH to a source of negative potential to operate the relay 12–FH. At the same time, the relay 12–EMTR is inhibited by the application of the ground potential on lead H through the now closed make contact 12–TF–10, the now closed break contact 12–CR–11, and lead 109 to the inhibit winding of the relay 12–EMTR.

When the relay 12–FH is operated, it locks to ground through its own now closed make contact 12–FH–6 and the now closed make contact 12–16–CON–2. At the same time, the holding path of the relay 12–TF is transferred to the lead H by closure of the make contact 12–FH–8 and opening of the break contact 12–FH–8. At this time, the operate path for the transmitter clutch magnet 23–TCM is opened by the operation of the relay 12–FH which opens the break contact 23–12–FH–1 and the relay 29–TXT is released by opening the break contact 29–12–FH–10.

An energization path for the stepping switch magnet 19–EMCL also is provided by operation of the relay 12–FH which completes a path from ground (FIG. 19) through the now closed make contact 19–18–CON1–4, the now closed break contact 19–8–CL–11, the now closed make contact 19–12–FH–3, the now closed off normal and interrupt contacts 19–EMCL O. N.–2 and 19–EMCL INT–1, and the winding of the relay 19–EMCL to a source of negative potential (FIG. 19). The energization of the stepping switch relay 19–EMCL over this path causes the stepping switch to step to step 1. Control of the stepping switch magnet 19–EMCL now is extended from ground through the stepping switch 19–EMCL–ARC–9, position Nos. 1 through 6, the now closed make contact 19–7–EM–12 (which was closed by the operation of the relay 7–EM upon closure of the make contact 7–12–FH–9), the interrupt contact 19–EMCL INT–1, and the winding of the relay 19–EMCL to a source of negative potential. The stepping switch 19–EMCL is self-interrupted through the first six steps by means of its operation through this path.

When the stepping switch 19–EMCL reaches position No. 7 its operation is transferred from a self-interrupted operation to operation under control of the distributor auxiliary contact 21–24–DIST–AUX–1 over a path extending from ground (FIG. 21) through the auxiliary distributor contact; the stepping switch 19–EMCL–ARC–10, position Nos. 7 through 15; the now closed make contact 19–7–EM–8; and the winding of the stepping switch magnet 19–EMCL to a source of negative potential (FIG. 19). Operation of the relay 7–EM also closes the make contacts 19–7–EM–4 and 19–7–EM–2 which extend ground potential to ARCs 1, 2, 3, 4, 5, 6 and 7 of the stepping switch 19–EMCL in permutative combinations of the different position Nos. 7 to 15 for supplying the code combinations "LTRS," "CR," "LF" three times and "N" four times to the send unit selector magnets 4–LPR as the stepping switch steps through position Nos. 7 through 15, respectively. When the stepping switch reaches position No. 14 (the third "N" generated), control perforation signals are supplied over the stepping switch 19–EMCL–ARCs 6 and 7 to cause control perforations in the 0 to 6 levels to be perforated by the send unit reperforator magnets 4–LPR0 and 4–LPR6.

The paths from the stepping switch 19–EMCL–ARCs 1 through 7 which cause operation of different permutative combinations of the punch selector magnets 4–LPR have been previously explained in detail in conjunction with the description of the generation of the start-of-message signal. During the time that the stepping switch 19–EMCL passes over the position Nos. 7 through 15, a path is extended from ground through the distributor contacts 2, 3 and 4; the now closed break contact 22–6–LTC–11; the now closed make contact 22–7–EM–11; the stepping switch 22–19–EMCL–ARC–12, position Nos. 7 through 15; lead *j* and over a previously described path to operate the reperforator clutch magnet 4–CM. Thus, it is apparent that the end-of-message code is generated by the stepper switch 19–EMCL under control of the receive unit distributor which also synchronizes the operation of the send unit reperforator with the operation of the stepping switch 19–EMCL.

When the stepping switch reaches position No. 16 it is again self-interrupting through 19–EMCL–ARC–9, position Nos. 16 to 25 and rapidly steps to the normal or "home" position. As the stepping switch 19–EMCL passes over position No. 25, ground is applied through the stepping switch 24–19–EMCL–ARC–11 position No. 25, lead 118, the now closed make contact 12–FH–7 and the now closed break contact 12–EMTA–5 to operate the relays 12–EMTA and 6–EMTA1 as previously described in conjunction with the explanation of the operation of the circuit following receipt of the standard line switching end-of-message code combination "N, N, N, N." The functions of these relays in releasing the system for subsequent receipt and processing of a new message have been described previously. In addition, the release of the relay 12–FH following the operation of the relay 6–EMTA1 releases the relay 7–EM by opening the make contact 7–12–FH–9.

As may be seen from the foregoing, the communications center prepares all messages which are supplied to it for handling by line switching apparatus as described in the previously mentioned copending application. This is accomplished by inserting the proper DDD telephone numbers where they are needed and by providing the proper end-of-message code combinatons if such a combination did not exist in the message as it was supplied to the message switching and preparation center of this invention.

No alarm circuits have been shown or described in conjunction with this invention for indicating malfunction of any part of the apparatus, power supply failure, improper message formats received by the system, etc. since such alarm circuits readily may be added to the disclosed system by those skilled in the art without departing from the scope of this invention.

If any particular send unit, translator, or shift register must be taken out of service for repair purposes or other reasons, a busy indication can be supplied to any unit which seeks to connect to such a removed piece of equipment by operating a busy contact, such as the busy contacts 14–BX–2, 3 and 4 which are shown in conjunction with the shift register circuit No. 1. When these contacts are operated or opened, no receive unit will attempt a connection with that particular shift register; and similar busy contacts may be added to the translator circuits and the send unit circuits if so desired.

Although a particular, specific embodiment of the invention is shown in the drawings and is described in the foregoing specification, the invention is by no means limited to that specific embodiment but may be modified by those skilled in the art without departing from the spirit and scope of the invention.

What is claimed is:

1. In a message switching and preparation center
  (a) at least one output means for receiving a message transmitted thereto for subsequent retransmission,
  (b) at least one input means for transmitting a message through said center to said output means, said message including at least one address code of a predetermined type therein,
  (c) storage means for temporarily storing said address code as said address code is transmitted from said input means, and
  (d) means responsive to said address code of said predetermined type stored in said storage means for inserting at least one additional code character into the message received by said output means, said additional code character being determined by the particular address code of said predetermined type stored in said storage means.

2. In a message switching and preparation center
  (a) at least one send unit for receiving a message transmitted thereto for subsequent retransmission to an outgoing line,
  (b) at least one receive unit for supplying said message through said center to said send unit, said message containing an address code therein,
  (c) storage means for temporarily storing said address code as it is transmitted from said receive unit,
  (d) means for preventing said address code from being received by said send unit while it is being transmitted to said storage means,
  (e) means operated upon receipt of the complete address code by said storage means for supplying control signals, determined by the particular address code stored in said storage means, to said send unit where said signals are recorded as a part of said message, and
  (f) means for causing said address code to be supplied from said storage means to said send unit after said control signals.

3. A message switching and preparation center including
  (a) at least one output means for receiving a message transmitted thereto for subsequent retransmission,
  (b) at least one input means for transmitting a message through said center to said output means, said message including address codes and at least one address code of a predetermined type therein,
  (c) storage means for temporarily storing each of said address codes as said address codes are transmitted from said input means,
  (d) means for preventing an address code from being supplied from said input means to said output means at the time said address code is supplied to said storage means,
  (e) means responsive to said address codes of said predetermined type stored in said storage means for supplying additional signals to said output means where said additional signals are inserted as a part of said message, each of said additional signals being determined by the particular address code of said predetermined type stored in said storage means, and
  (f) means for causing each of said address codes to be supplied from said storage means to said output means following the additional signals, if any, associated respectively with each of said address codes.

4. A message switching and preparation center including
  (a) a plurality of output means for receiving a message transmitted thereto,
  (b) a plurality of input means for transmitting messages through said center to said output means,
  (c) means for interconnecting any one of said input means with any idle one of said output means,
  (d) a plurality of storage means for temporarily storing portions of said messages therein as said messages are transmitted from said input means,
  (e) means for interconnecting any idle one of said storage means with any one of said input means, and
  (f) means responsive to at least one of said stored portions of each of said messages for inserting additional material into said messages transmitted to said output means, said material varying in accordance with each different stored portion of said message.

5. A message switching and preparation center including
   (a) a plurality of output means for receiving a message transmitted thereto,
   (b) a plurality of input means for transmitting messages through said center to said output means,
   (c) means for interconnecting any one of said input means with any idle one of said output means,
   (d) a plurality of storage means for temporarily storing predetermined portions of said messages therein as said messages are transmitted from said input means,
   (e) means for interconnecting any idle one of said storage means with any one of said input means,
   (f) means for preventing said output means from receiving said portions of said predetermined messages at the time said portions are transmitted from said input means to said storage means,
   (g) means responsive to at least one of said stored portions of each of said messages for inserting additional material into said messages transmitted to said output means, said material varying in accordance with each different stored portion of said message, and
   (h) means for causing said stored portions to be supplied from said storage means to said output means.

6. A telegraph message switching and preparation center including
   (a) a plurality of send units each having a tape recorder reperforator therein for receiving messages supplied to said send units,
   (b) a plurality of receive units each having a tape reader therein for supplying messages through said center to said send units,
   (c) means for interconnecting any receive unit, having a message available, with any one of said send units which is not connected to another one of said plurality of receive units,
   (d) a plurality of storage means for temporarily storing predetermined portions of said messages as said messages are supplied from said tape readers in said receive units,
   (e) means for interconnecting any receive unit having a message available with any one of said storage means which is not connected to another one of said plurality of receive units,
   (f) means for preventing said send unit from receiving said predetermined portions of said messages at the time said portions are supplied from said tape readers to said storage means,
   (g) means responsive to at least one of said stored portions of each of said messages for inserting additional signals into said messages transmitted to said send units, said additional signals varying respectively with each different stored portion, and
   (h) means for supplying said stored portions of said messages from said storage means to said send unit.

7. A telegraph message switching and preparation center according to claim 6 wherein said plurality of storage means are a plurality of shift registers.

8. A telegraph message switching and preparation center including
   (a) at least one send unit having a tape reperforator therein for receiving and recording a message supplied to said send unit,
   (b) at least one receive unit having a tape reader therein for supplying a message previously recorded on tape through said center to said send unit, said message being in the form of permutative code combinations and having at least one address portion,
   (c) means for interconnecting a receive unit having a message available with an idle send unit,
   (d) at least one shift register for temporarily storing said address portions of said message as said message is read by said tape reader in said receive unit,
   (e) means for interconnecting a receive unit having a message available with an idle shift register,
   (f) means for preventing said address portions of said message from being supplied to said connected send unit when said address portions of said message are read by said tape reader,
   (g) at least one translating means responsive to different predetermined address portions of said message for supplying different additional permutative code combinations to said tape reperforator in said send unit, said different additional code combinations being determined by said different predetermined address portions, respectively, and
   (h) means for supplying said stored address portions of said message to said connected send unit from connected shift register prior to the remainder of said message supplied from said receive unit to the send unit connected thereto.

9. A telegraph message switching and preparation system for processing telegraph messages having first and second types of addresses, said messages and said addresses being in the form of permutation code combinations, said system including
   (a) a plurality of send units each having a tape reperforator therein for receiving and recording messages transmitted thereto for subsequent retransmission,
   (b) a plurality of receive units each having a tape reader therein for transmitting messages previously received and recorded on perforated tape through said system to said send units,
   (c) a plurality of shift registers for temporarily storing said addresses of said messages as said addresses are read by said tape readers,
   (d) means responsive to an indication that a message is available in one of said receive units for interconnecting said one of said receive units with an idle one of said send units and with an idle one of said shift registers,
   (e) means for preventing an address of said available message from being transmitted to said one of said send units at the time the address is read by said tape reader in said one of said receive units,
   (f) means responsive to addresses of said first type only for temporarily stopping said tape reader in said one receive unit when a complete address of said first type is stored in said one shift register,
   (g) a plurality of translating means for generating different additional permutation code combinations for each different address of said first type,
   (h) further means responsive to storage of a complete address of said first type in said one shift register for interconnecting said one shift register with an idle one of said translating means,
   (i) means responsive to interconnection of said one shift register and said one translating means for causing said one translating means to generate the additional permutation code combination corresponding to the address stored in said one shift register and to transmit said additional code combination to said one send unit,
   (j) means operated upon completion of the transmission of said additional code combination to said one send unit for causing said stored address to be transmitted from said one shift register to said one send unit and for causing said tape reader to resume reading, and
   (k) means responsive to code combinations in said message indicating the end of said addresses for causing the remainder of the message to be transmitted directly from said receive unit to said send unit after the last one of said addresses has been transmitted from said one shift register to said send unit.

10. A system according to claim 9 wherein said telegraph messages are encoded in permutation code combinations having $n$ levels, where $n$ is a positive integer, and having means responsive to said end-of-address indication to cause control signals in additional levels to be added to some of said $n$ level permutation code combinations transmitted to said send units.

11. A system according to claim 9 wherein addresses of said second type are transmitted from said shift registers without the insertion of additional code combinations and without stopping said tape reader.

12. In a telegraph message switching and preparation center
    (a) output means for recording and retransmitting a message transmitted thereto,
    (b) input means for transmitting a message to said output means, each character of said message being encoded in a permutation code having $n$ levels, where $n$ is a positive integer, and
    (c) means responsive to a predetermined combination of characters in said message for adding a signal in an additional level to the normal $n$ levels of a predetermined character transmitted to said output means.

References Cited by the Examiner

UNITED STATES PATENTS

| | | | |
|---|---|---|---|
| 2,447,533 | 8/1948 | Retallack | 179—7.1 |
| 2,486,302 | 10/1949 | Locke | 178—3 |
| 2,678,968 | 5/1954 | Gooderham | 179—7 |
| 2,986,723 | 5/1961 | Darwin et al. | 340—147 |
| 2,989,592 | 6/1961 | Slemmer | 179—7.1 |
| 3,013,111 | 12/1961 | Haight et al. | 178—2 |
| 3,025,341 | 3/1962 | Wright et al. | 178—3 |
| 3,077,579 | 2/1963 | Greene et al. | 340—147 |
| 3,139,483 | 6/1964 | Demant et al. | 178—4 |

NEIL C. READ, *Primary Examiner.*

ROBERT H. ROSE, *Examiner.*

A. J. DUNN, T. A. ROBINSON, *Assistant Examiners.*

UNITED STATES PATENT OFFICE
CERTIFICATE OF CORRECTION

Patent No. 3,268,649                                                August 23, 1966

George A. Locke

It is hereby certified that error appears in the above numbered patent requiring correction and that the said Letters Patent should read as corrected below.

Column 6, line 34, for "shaft" read -- shift --; column 7, line 47 and column 9, line 62, for "receiver", each occurrence, read -- receive --; column 10, line 50, for "with" read -- which --; column 12, line 30, for "position" read -- positions --; column 13, line 25, for "BIDIC-8" read -- BIDI-8 --; line 53, strike out "and"; column 14, line 59, for "24-10-EMCL INT-3" read -- 24-19-EMCL INT-3 --; line 62, for "19-1MCL" read -- 19-EMCL --; column 16, line 72, for "new" read -- now --; column 17, line 26, for "24-DA" read -- 25-DA --; column 19, line 9, for "low" read -- now --; column 20, line 67, for "and" read -- the --; column 21, line 8, for "proced-" read -- preced- --; column 23, lines 33 and 64, for "relay", each occurrence, read -- relays --; column 24, line 16, for "45-DLC-6" read -- 34-DLC-6 --; line 22, for "35-45-DLS-6" read -- 35-34-DLS-6 --; column 26, line 12, for "relay" read -- relays --; line 27, for "39-A" read -- 39-1A --; column 27, line 3, after "38-3C-6" insert -- and 38-3D-6 --; column 29, line 20, for "41-IC" read -- 42-IC --; line 28, for "52-DAO" read -- 42-DAO --; line 29, for "42-C" read -- 42-CD --; line 50, for "operated" read -- operate --; column 30, line 58, strike out "each"; column 31, line 37, for "leads" read -- lead --; column 32, line 33, for "operaiton" read -- operation --; line 55, strike out "releases the"; column 33, line 34, for "its" read -- it --; line 52, for "of" read -- to --; column 35, line 9, for "menmonic" read -- mnemonic --; column 36, lines 24 and 25, for "12-29-TX8-11" read -- 12-29TXT-11 --; line 38, for "making" read -- make --; line 41, for "contacts" read -- contact --; line 43, for "relay" read -- relays --; column 39, line 51, for "shaft" read -- shift --; column 40, line 55, for "market" read -- magnet --; line 58, for "receive" read -- receipt --; column 41, line 20, for "12-T-2" read -- 12-TN2 --; line 33, for "11-TN3" read -- 12-TN3 --; column 42, line 7, for "ends-of-address" read -- end-of-address --; line 9, for "has" read -- as --; column 43, line 43, for "combinatons" read -- combinations --; column 45, line 19, for "portions of said predetermined" read -- predetermined portions of said --; line 34, strike out "reperforator"; column 46, line 21, after "from" insert -- said --.

Signed and sealed this 5th day of September 1967.

(SEAL)
Attest:

ERNEST W. SWIDER                                        EDWARD J. BRENNER
Attesting Officer                                      Commissioner of Patents